(12) United States Patent
Isenhour et al.

(10) Patent No.: US 8,702,318 B2
(45) Date of Patent: Apr. 22, 2014

(54) DENSE FIBER OPTIC CONNECTOR ASSEMBLIES AND RELATED CONNECTORS AND CABLES SUITABLE FOR ESTABLISHING OPTICAL CONNECTIONS FOR OPTICAL BACKPLANES IN EQUIPMENT RACKS

(71) Applicant: Corning Cable Systems LLC, Hickory, NC (US)

(72) Inventors: Micah Colen Isenhour, Lincolnton, NC (US); Dennis Michael Knecht, Hickory, NC (US); James Phillip Luther, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 13/951,916

(22) Filed: Jul. 26, 2013

(65) Prior Publication Data
US 2013/0308908 A1 Nov. 21, 2013

Related U.S. Application Data

(63) Continuation of application No. PCT/US2012/023622, filed on Feb. 2, 2012.

(60) Provisional application No. 61/438,847, filed on Feb. 2, 2011.

(51) Int. Cl.
*G02B 6/38* (2006.01)

(52) U.S. Cl.
USPC .................. 385/61; 385/60; 385/66; 385/70; 385/71; 385/72

(58) Field of Classification Search
USPC ............ 385/53, 55, 58, 60, 61, 66, 70, 71, 72
See application file for complete search history.

(56) References Cited

U.S. PATENT DOCUMENTS

| | | | |
|---|---|---|---|
| 4,711,518 A | 12/1987 | Shank et al. | 350/96.2 |
| 6,585,423 B1 * | 7/2003 | Vergeest | 385/60 |
| 6,863,444 B2 * | 3/2005 | Anderson et al. | 385/53 |

(Continued)

FOREIGN PATENT DOCUMENTS

| | | | | |
|---|---|---|---|---|
| JP | 7318761 A | 12/1995 | | G02B 6/38 |
| JP | 2009229506 A | 10/2009 | | G02B 6/40 |

(Continued)

OTHER PUBLICATIONS

PCT Search Report, Application No. PCT/US2012/023622, Sep. 3, 2012, 4 pages.

*Primary Examiner* — Jennifer Doan

(57) ABSTRACT

Dense fiber optic connector assemblies and related connectors and cables suitable for establishing optical connections for optical backplanes in equipment racks are disclosed. In one embodiment, a fiber optic connector is provided. The fiber optic connector is configured to be directly optically connected in an optical backplane. The fiber optic connector is comprised of at least one fiber optic connector body, at least one fiber optic ferrule in the at least one fiber optic connector body. The fiber optic ferrule is configured to support a fiber count and to optically align fiber openings with lenses disposed on the fiber optic connector body. The dense fiber optic connectors may be optical backplane fiber optic connectors or blade fiber optic connectors.

29 Claims, 49 Drawing Sheets

(56) References Cited

U.S. PATENT DOCUMENTS

| | | | |
|---|---|---|---|
| 6,945,701 B2 * | 9/2005 | Trezza et al. | 385/53 |
| 7,217,040 B2 | 5/2007 | Crews et al. | 385/62 |
| 7,991,252 B2 | 8/2011 | Cheng et al. | 385/25 |
| 2003/0002802 A1 | 1/2003 | Trezza et al. | 385/53 |
| 2009/0110347 A1 | 4/2009 | Jacobsson | 385/16 |
| 2009/0269019 A1 | 10/2009 | Andrus et al. | 385/135 |
| 2011/0008004 A1 | 1/2011 | Liao et al. | 385/74 |

FOREIGN PATENT DOCUMENTS

| | | | |
|---|---|---|---|
| WO | 03/014943 A2 | 2/2003 | G06F 13/00 |
| WO | 2006/108024 A1 | 10/2006 | G02B 6/38 |
| WO | 2009/030360 A1 | 3/2009 | G02B 6/38 |

* cited by examiner

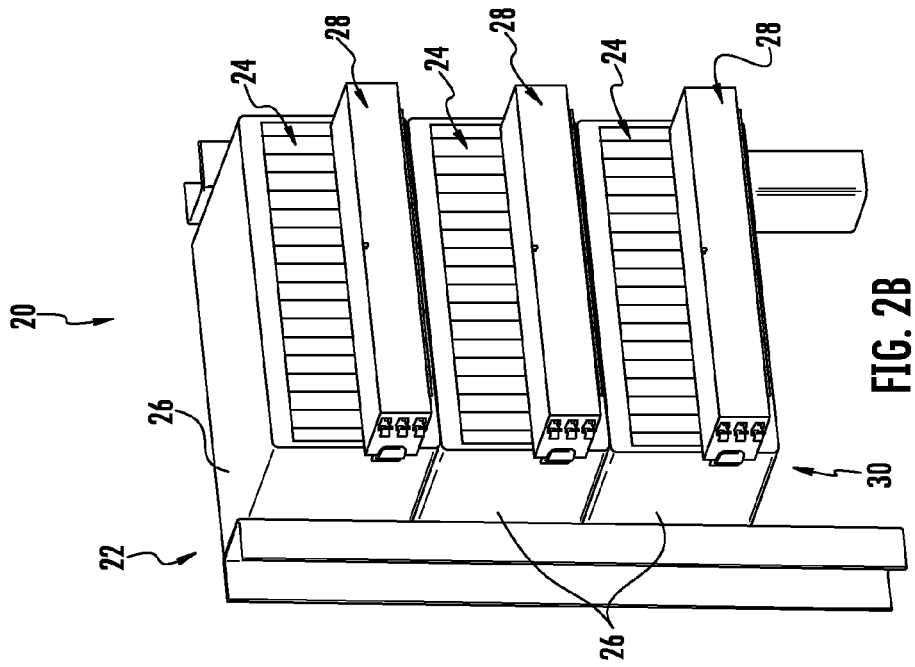
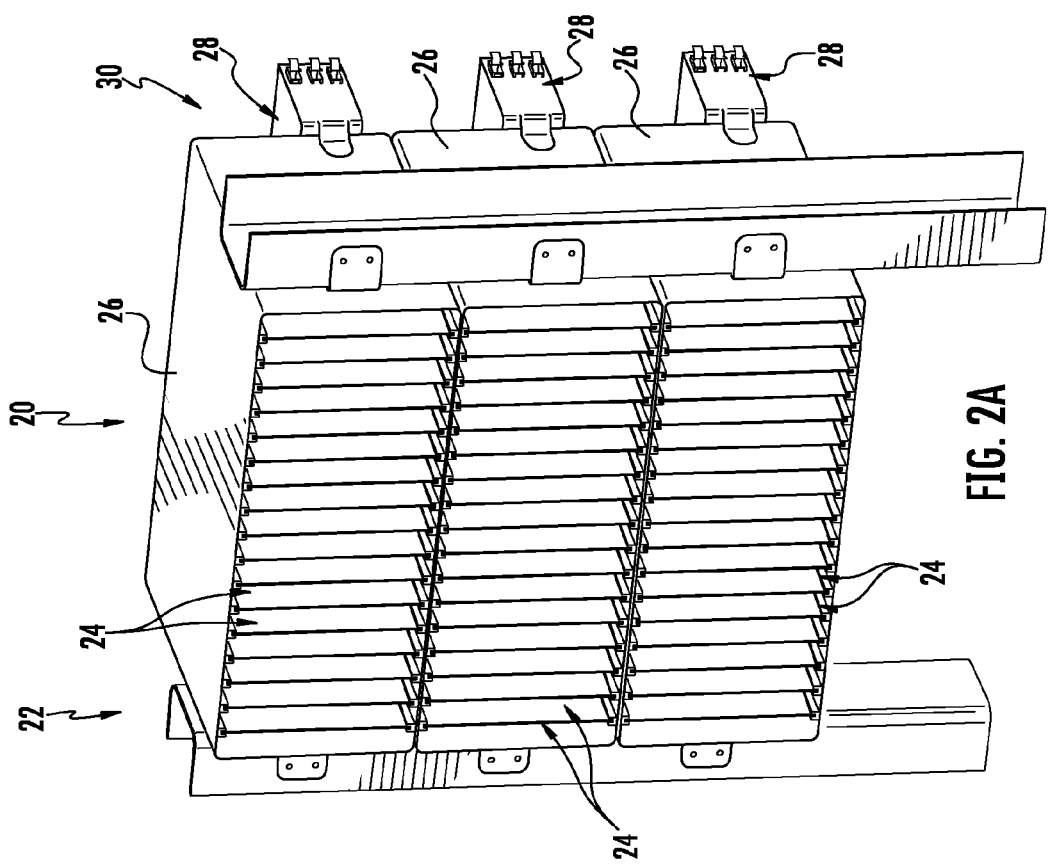

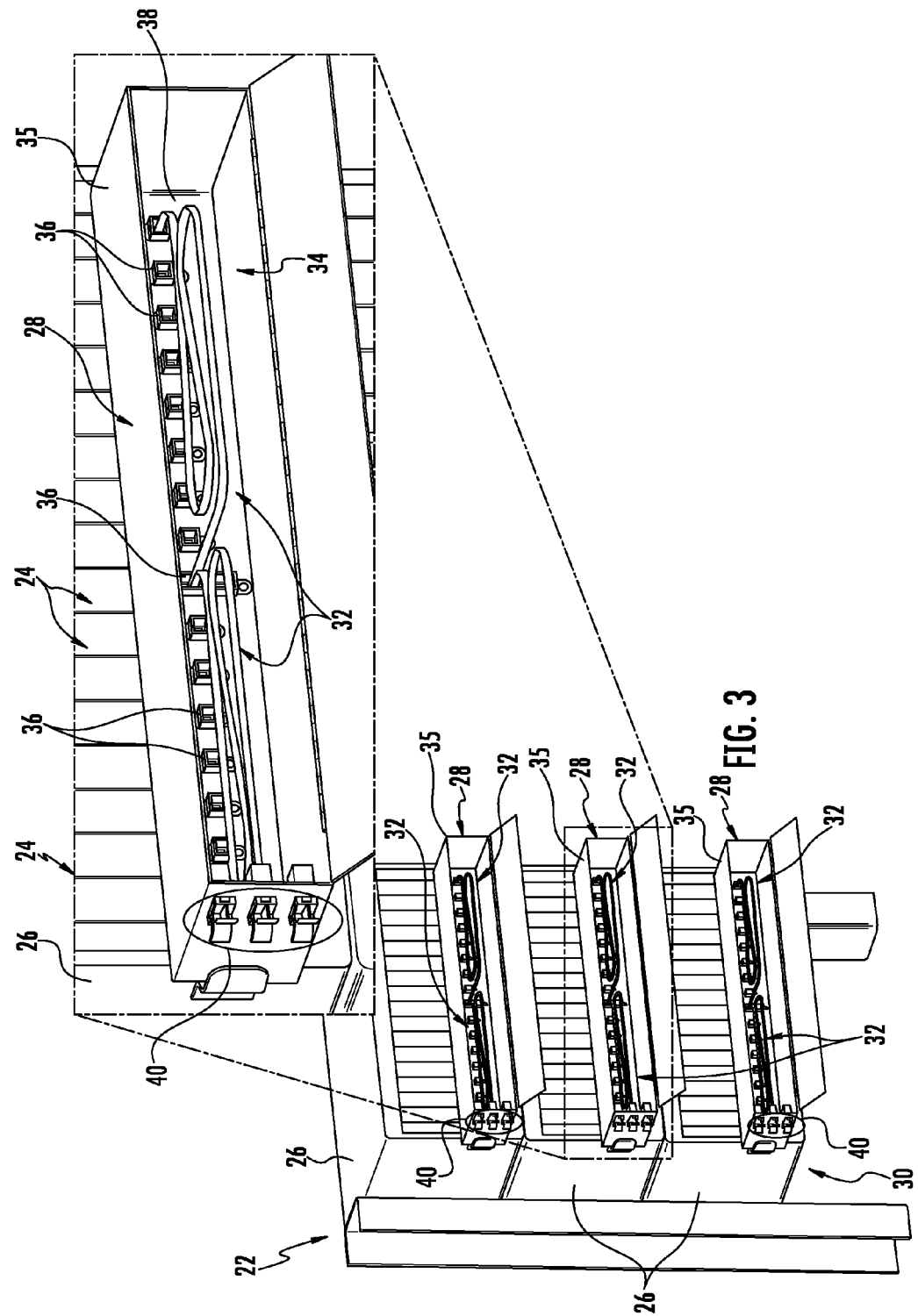

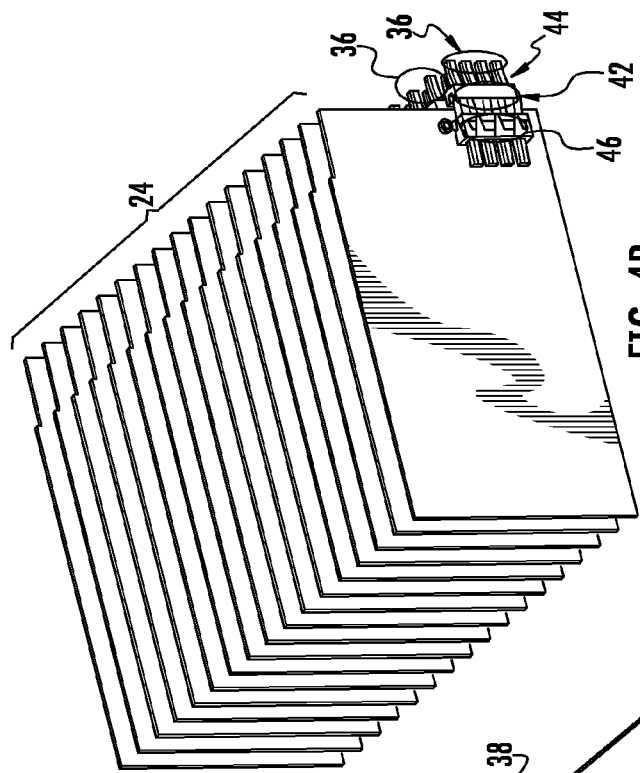
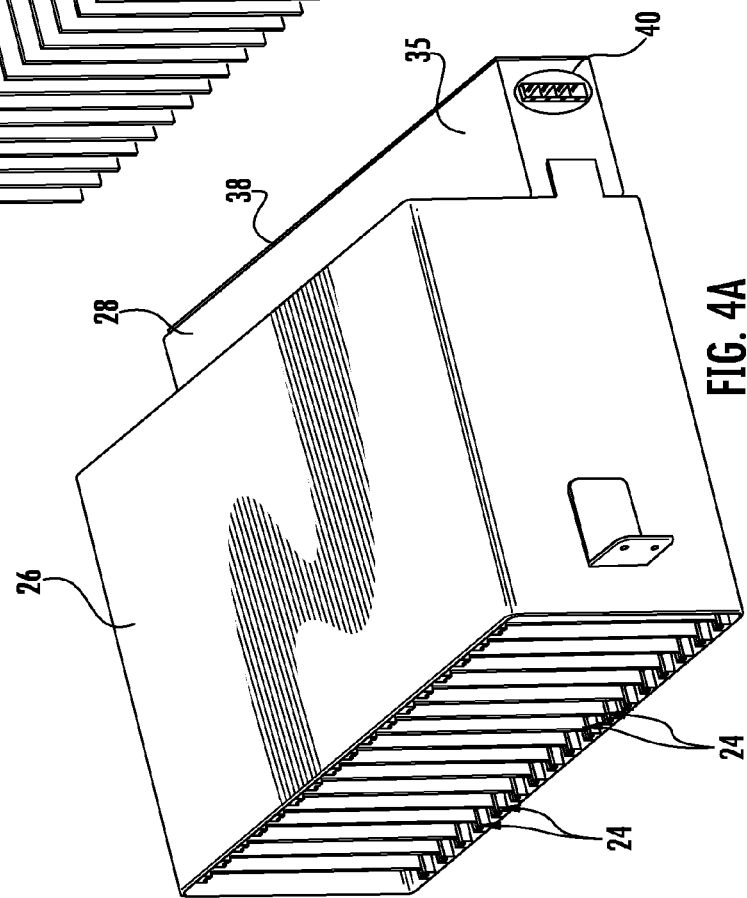
FIG. 4B
FIG. 4A

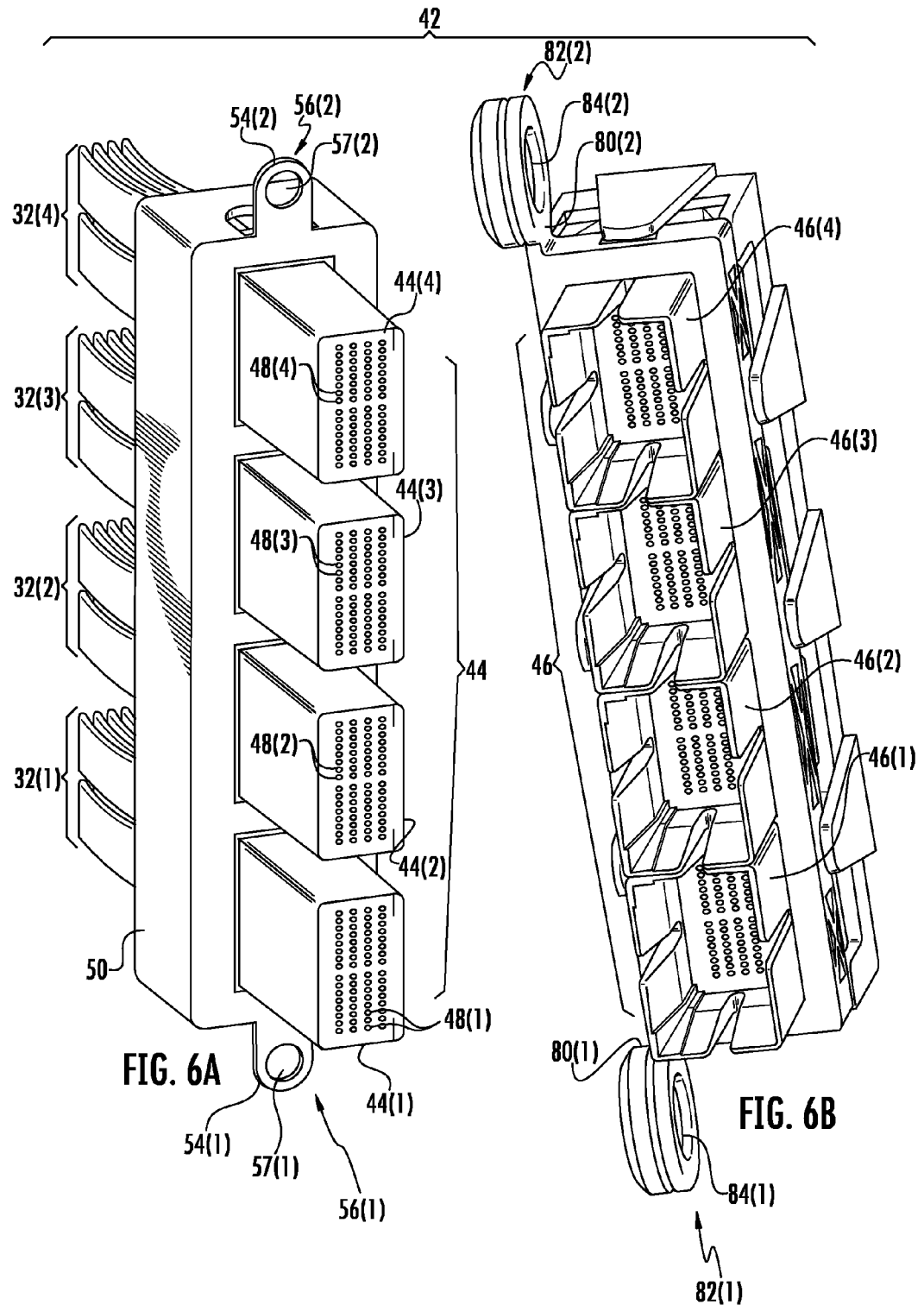

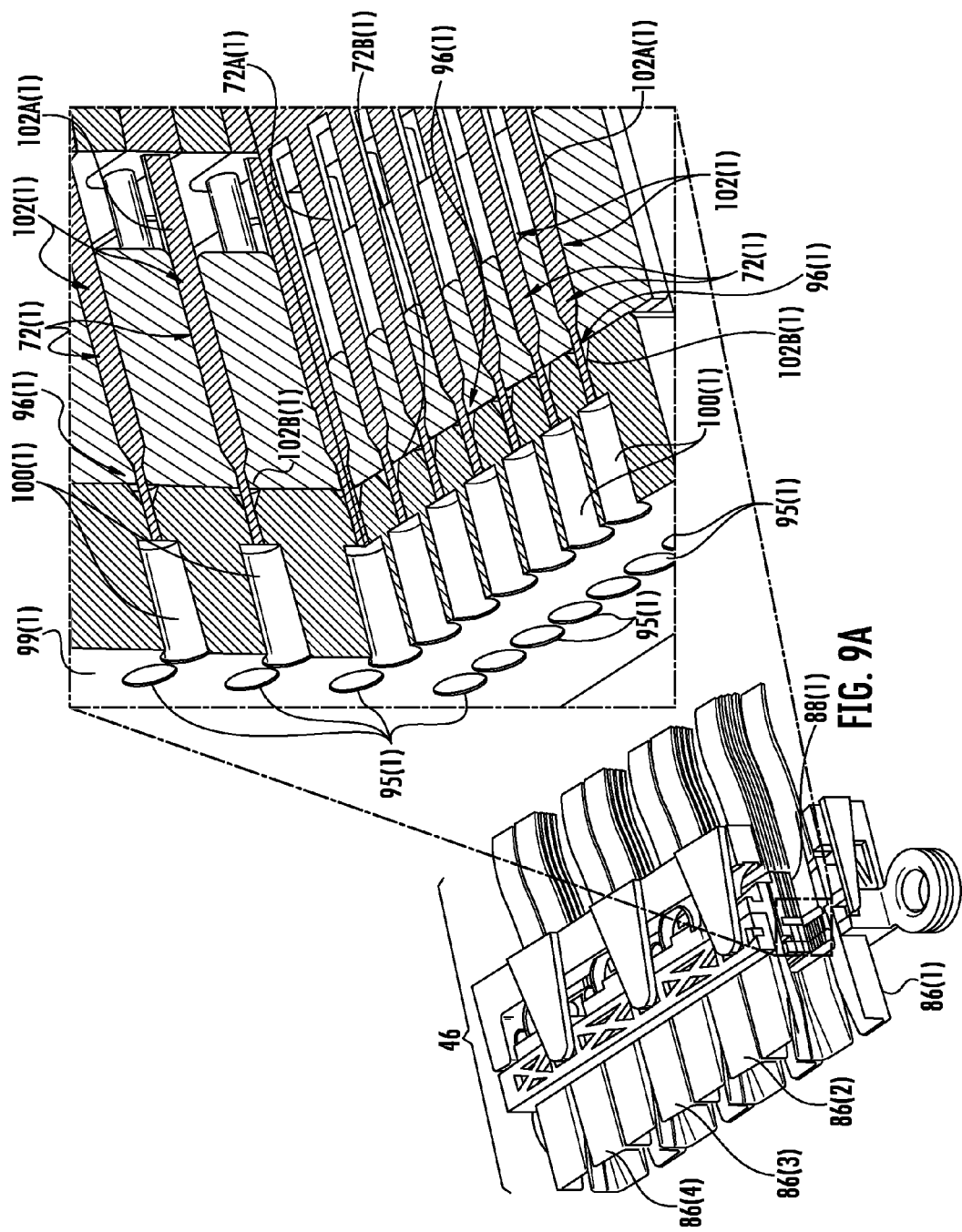

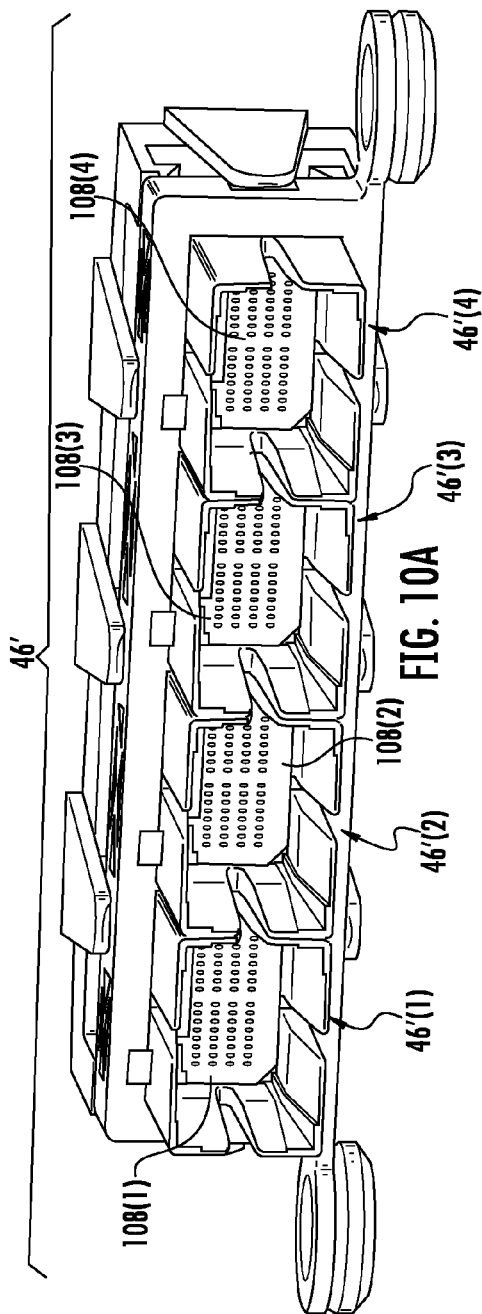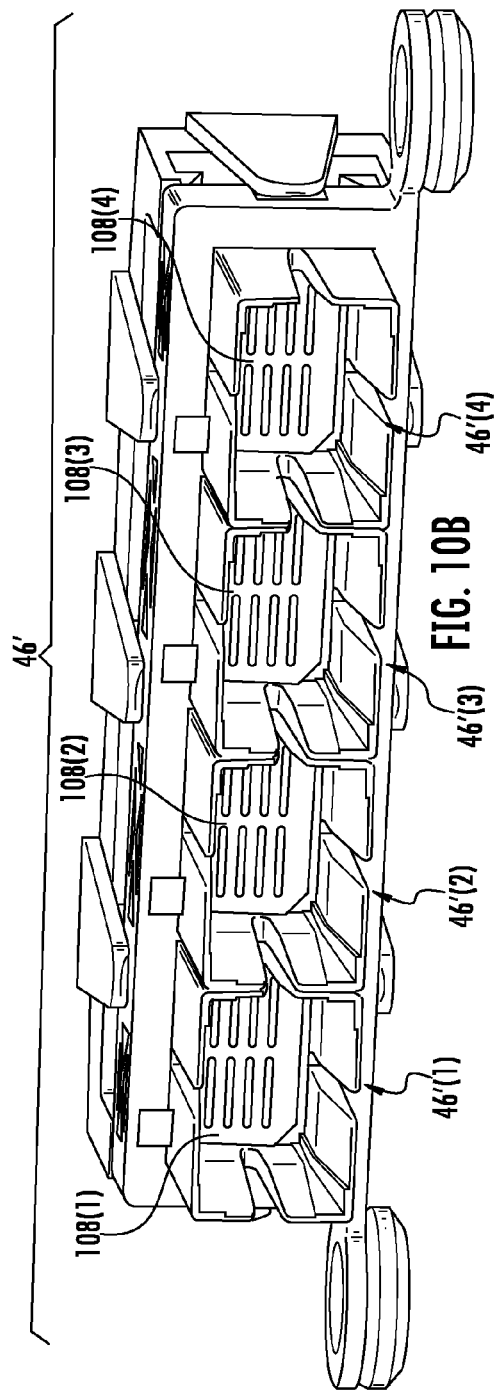

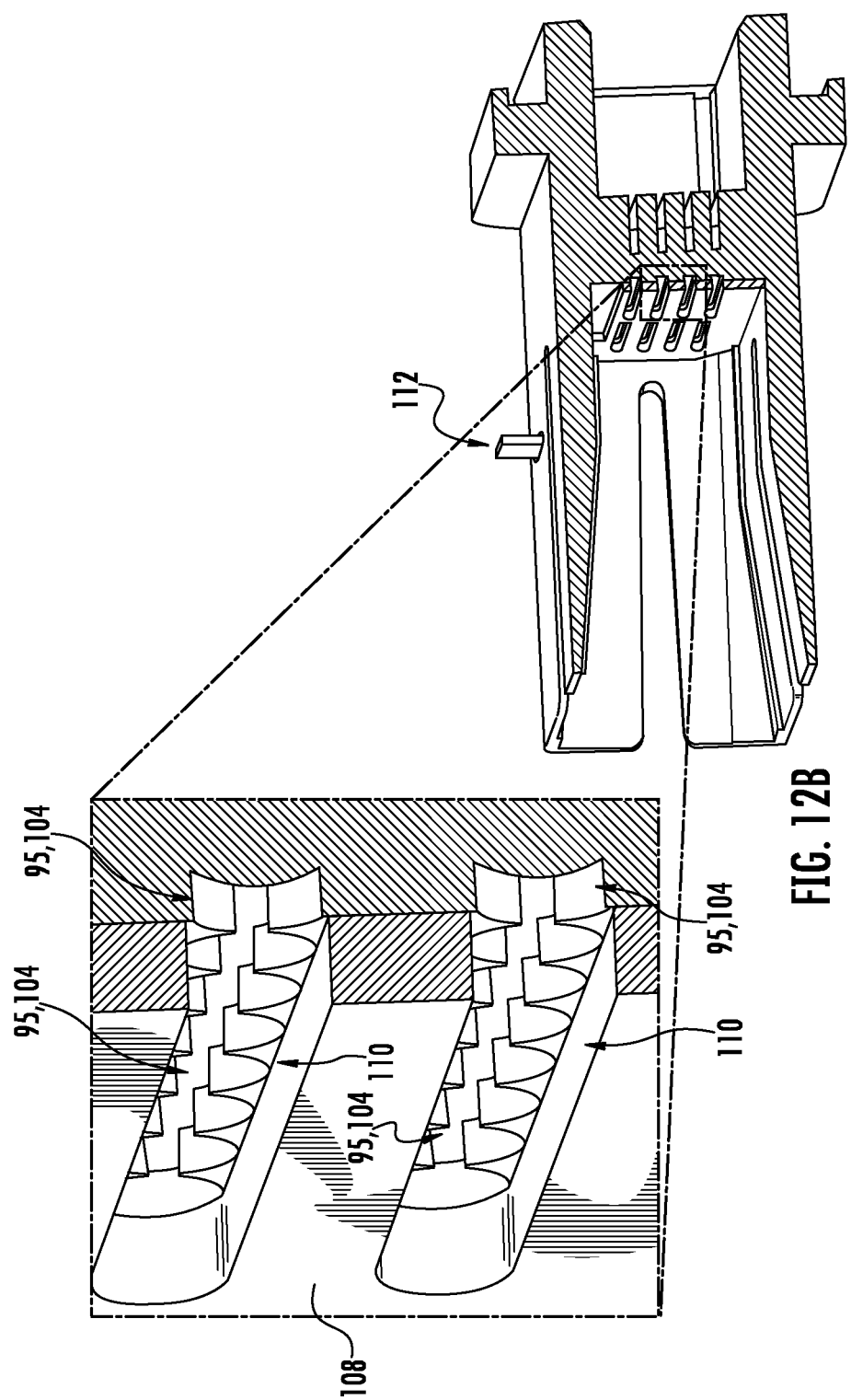

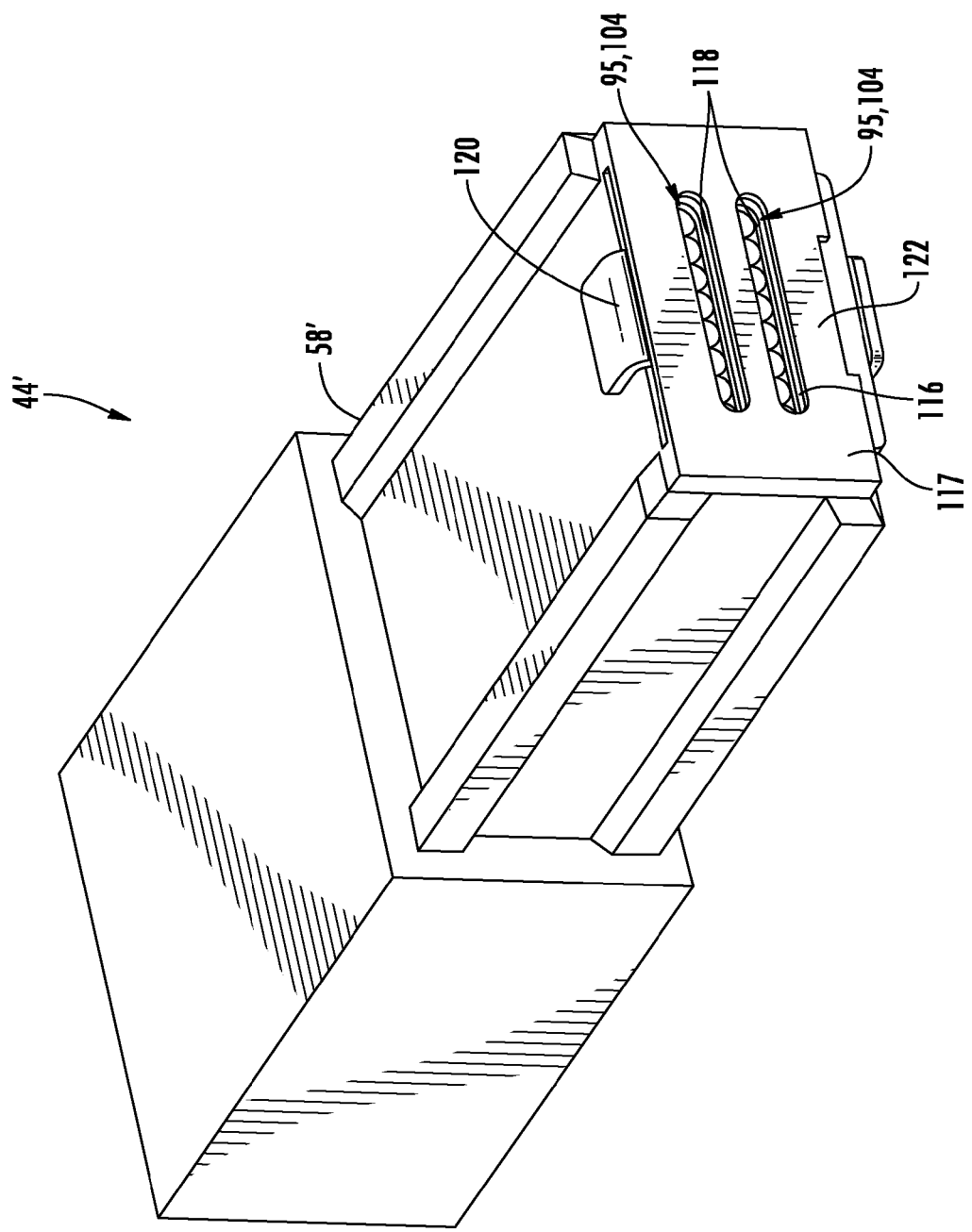

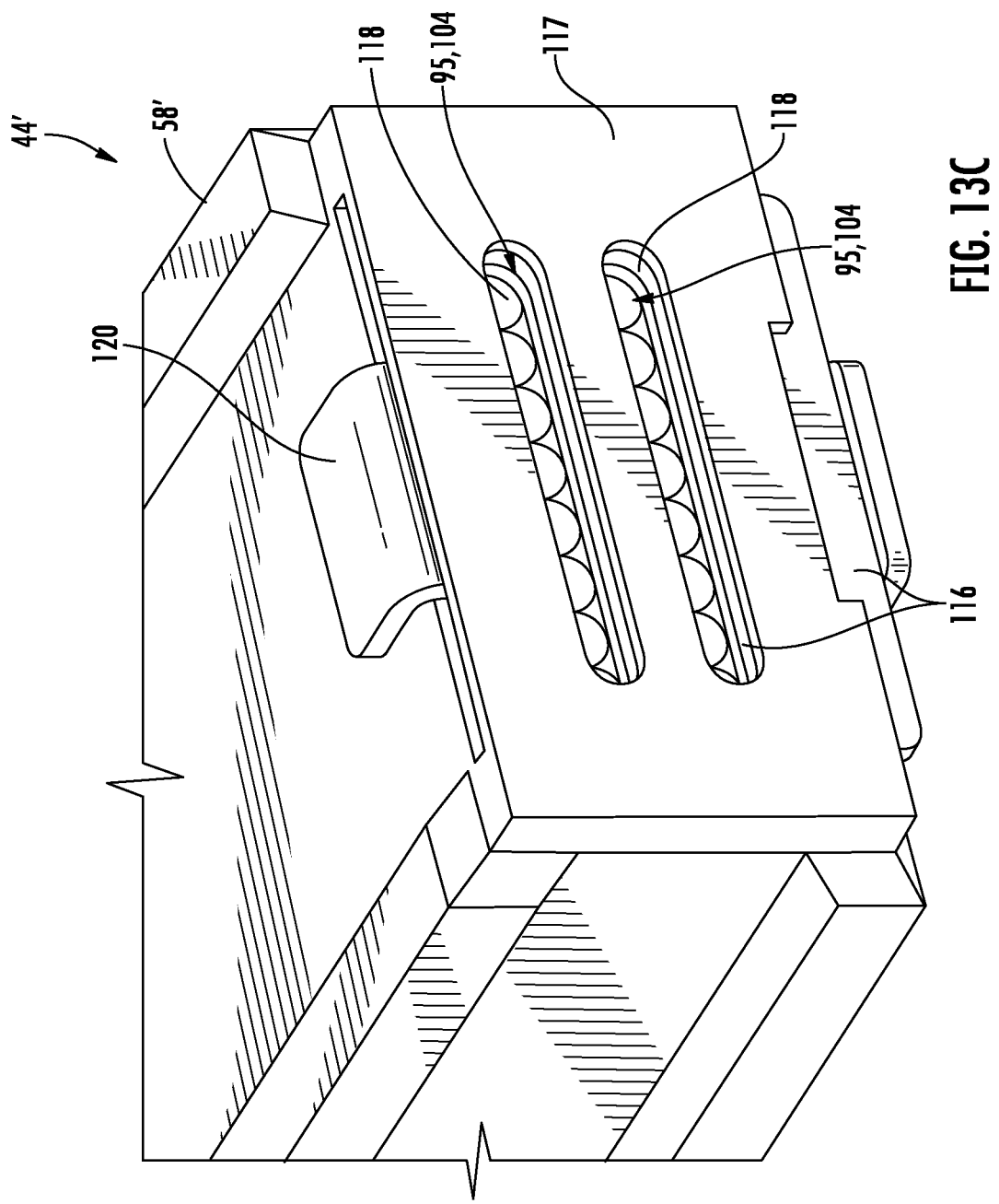

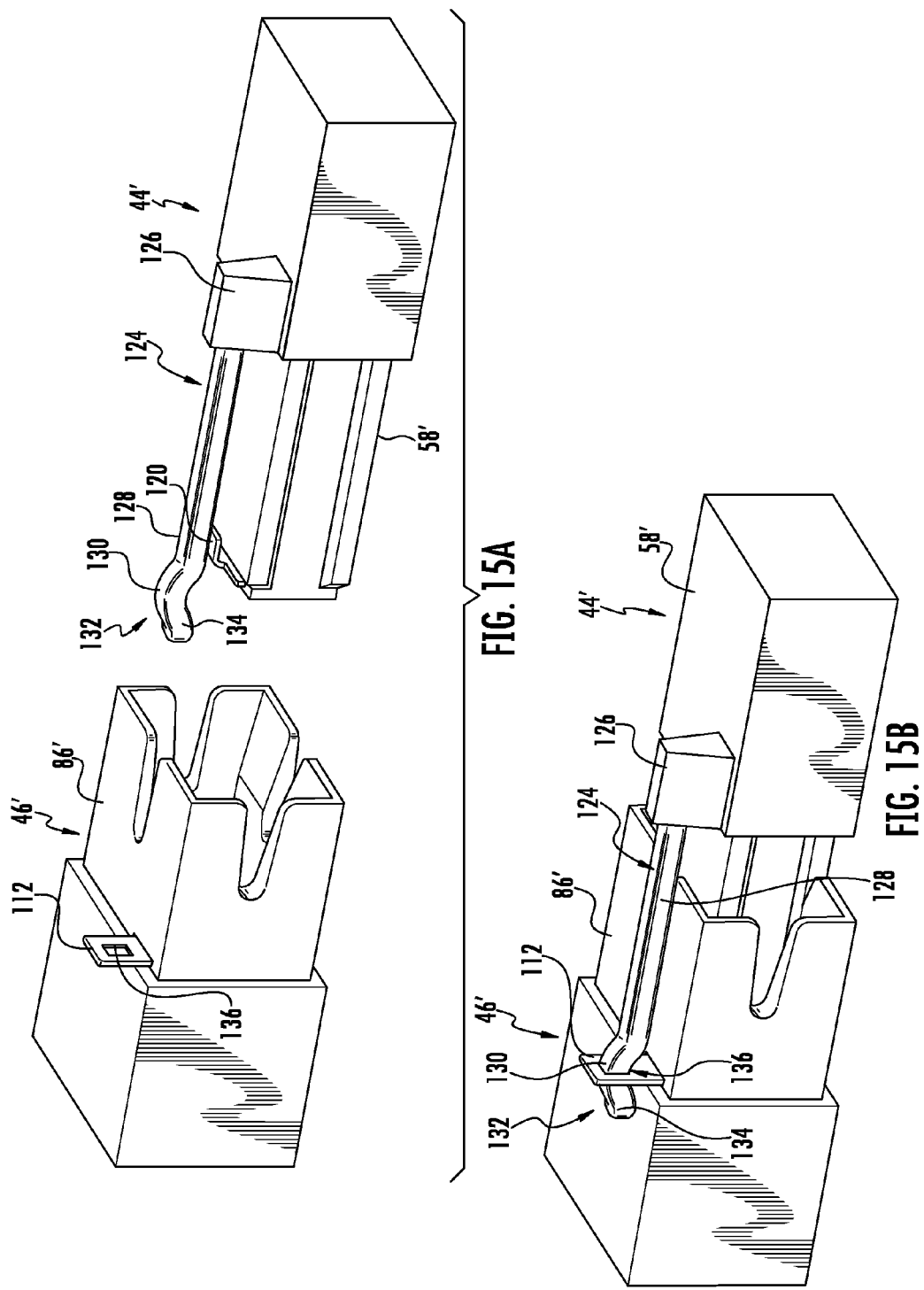

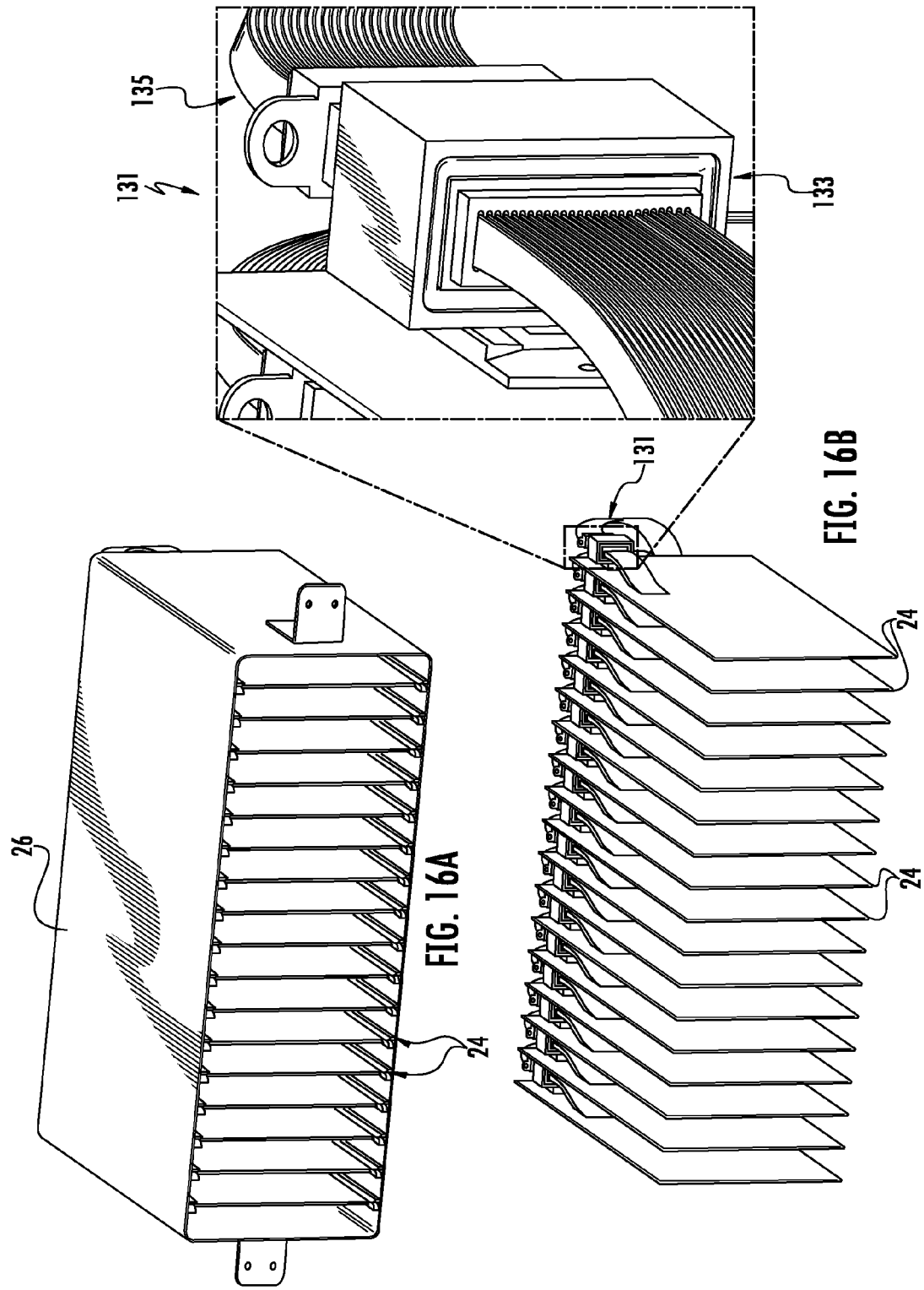

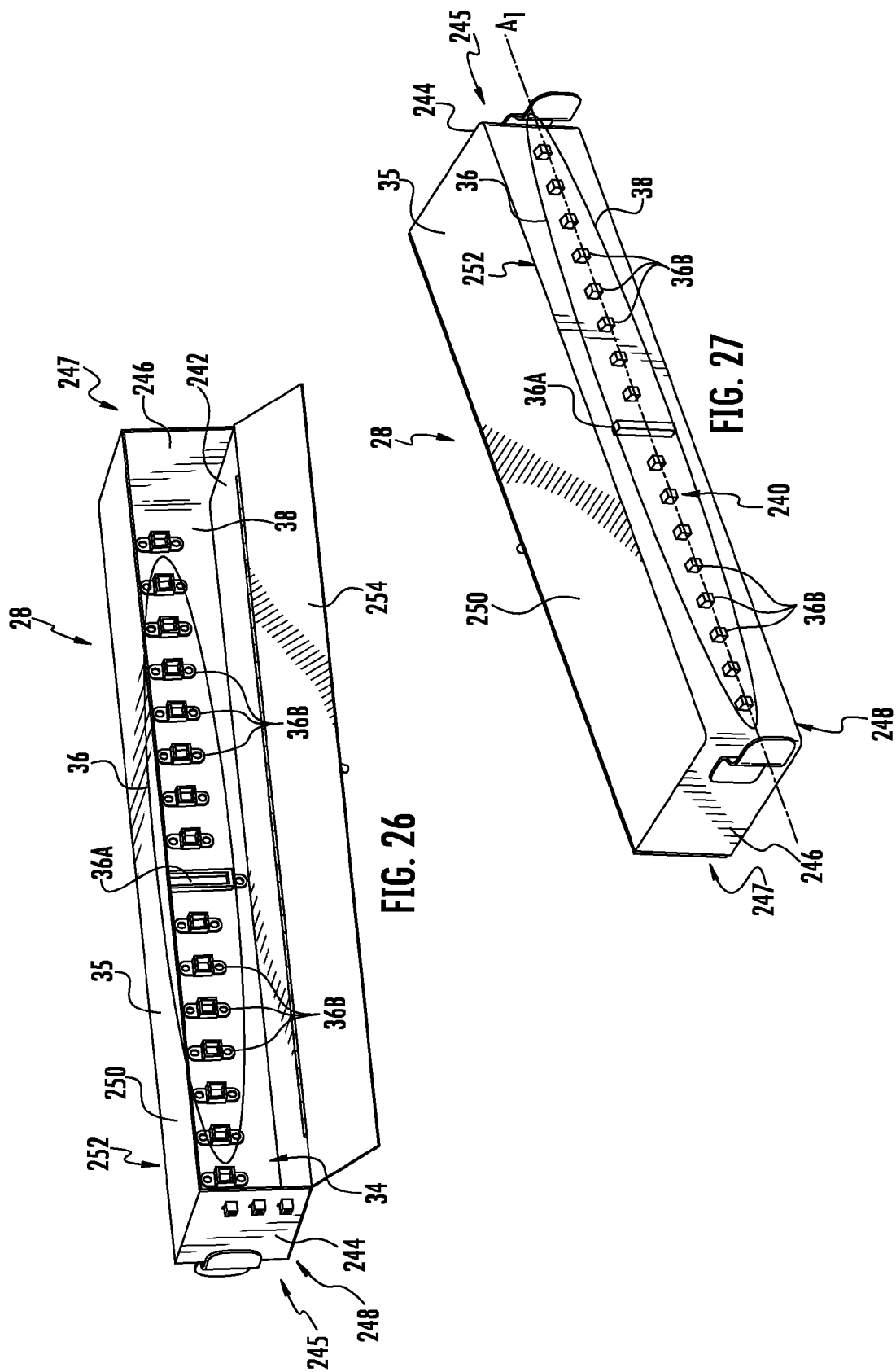

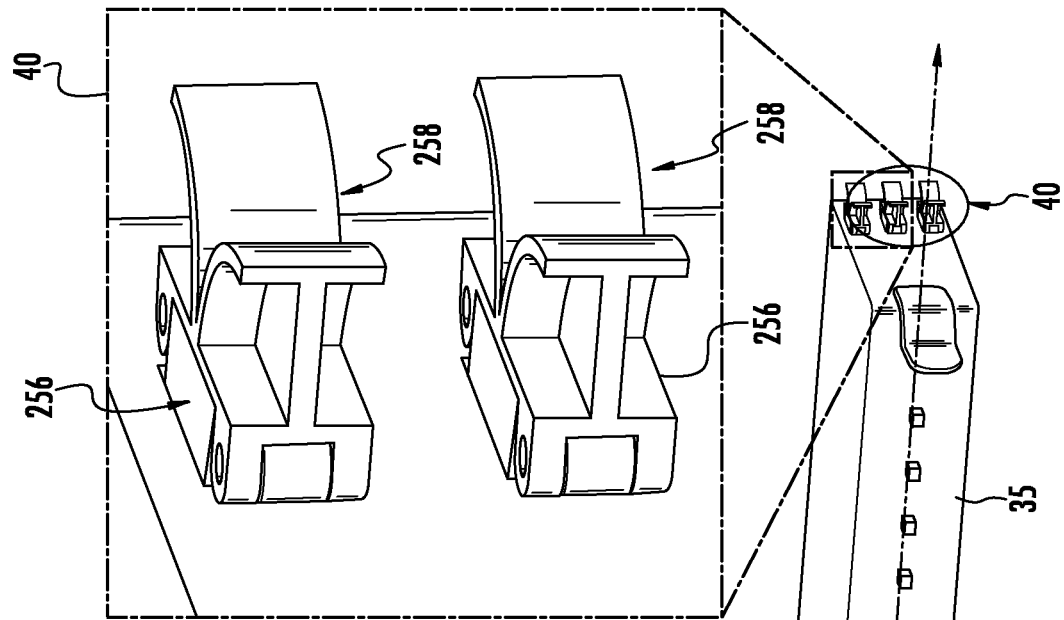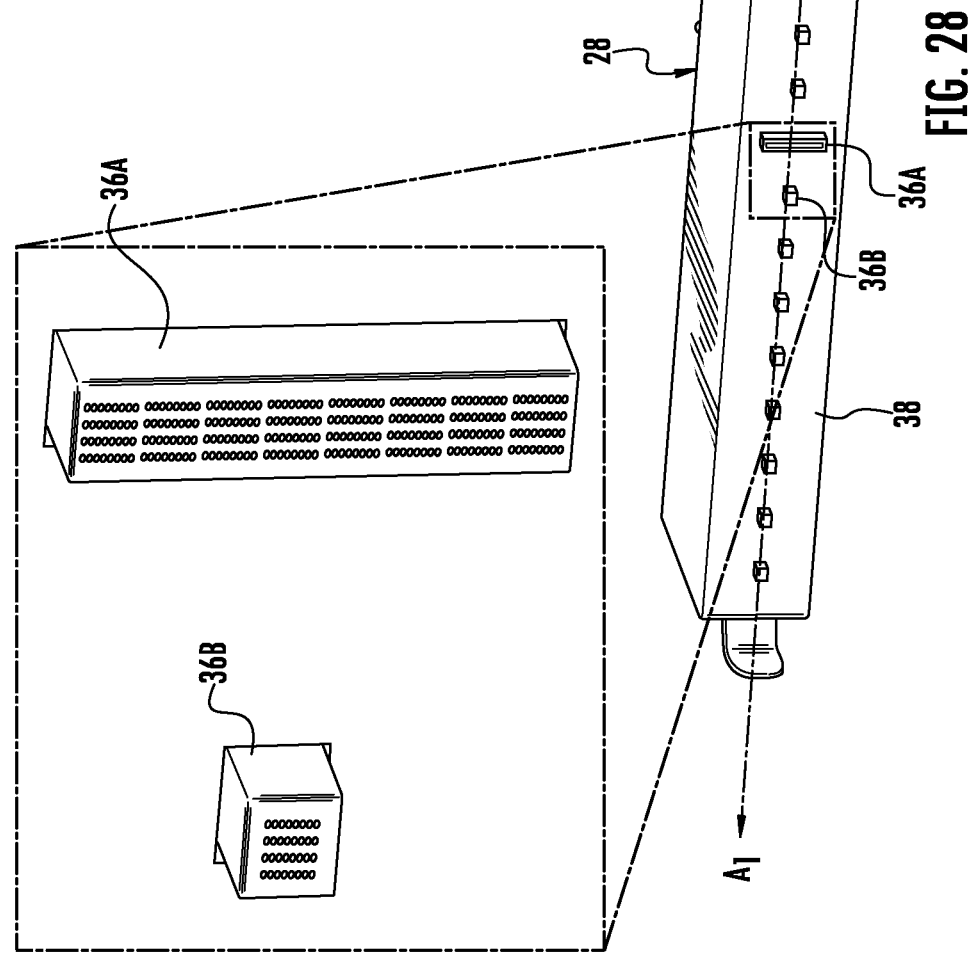
FIG. 28

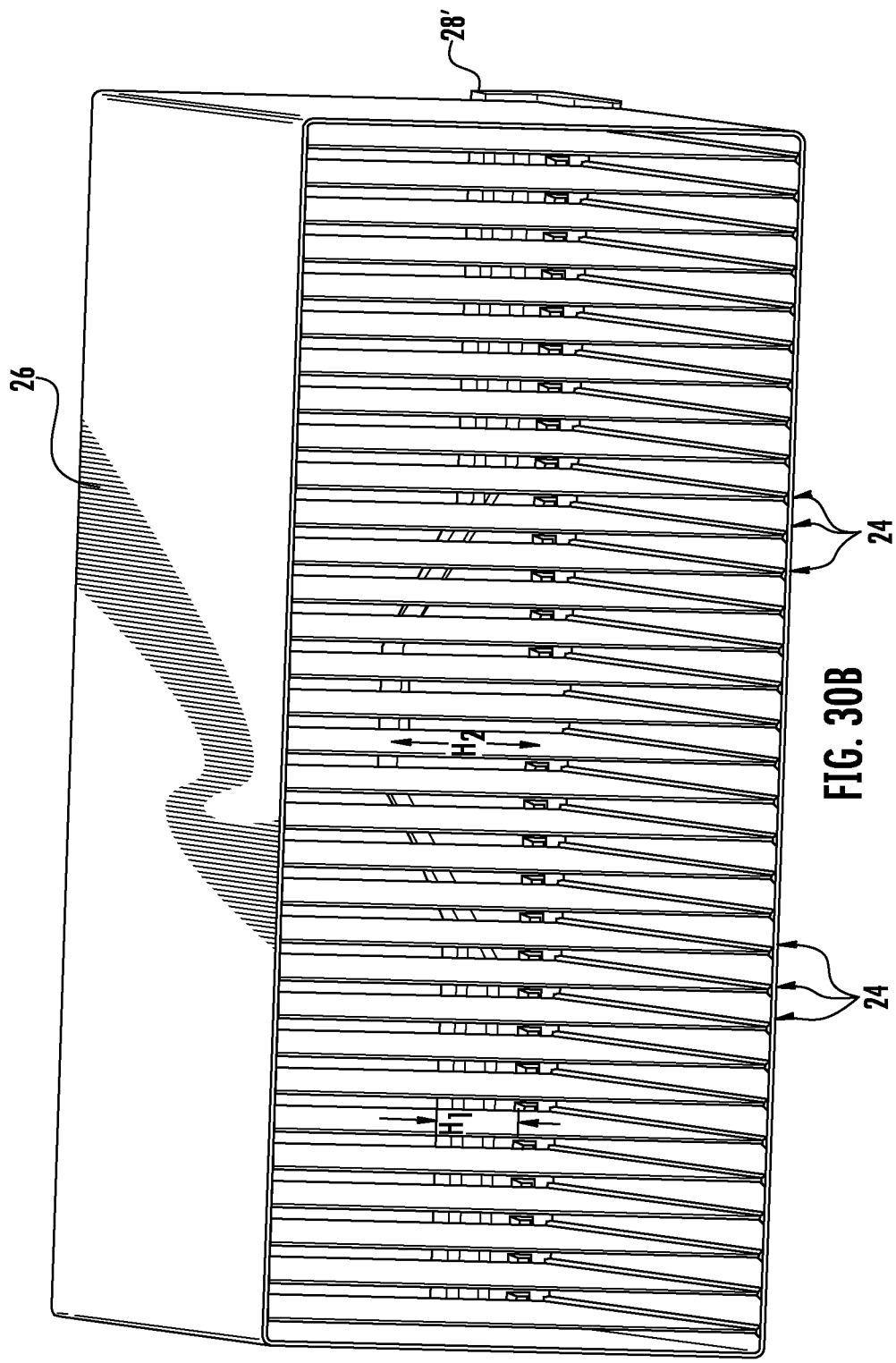

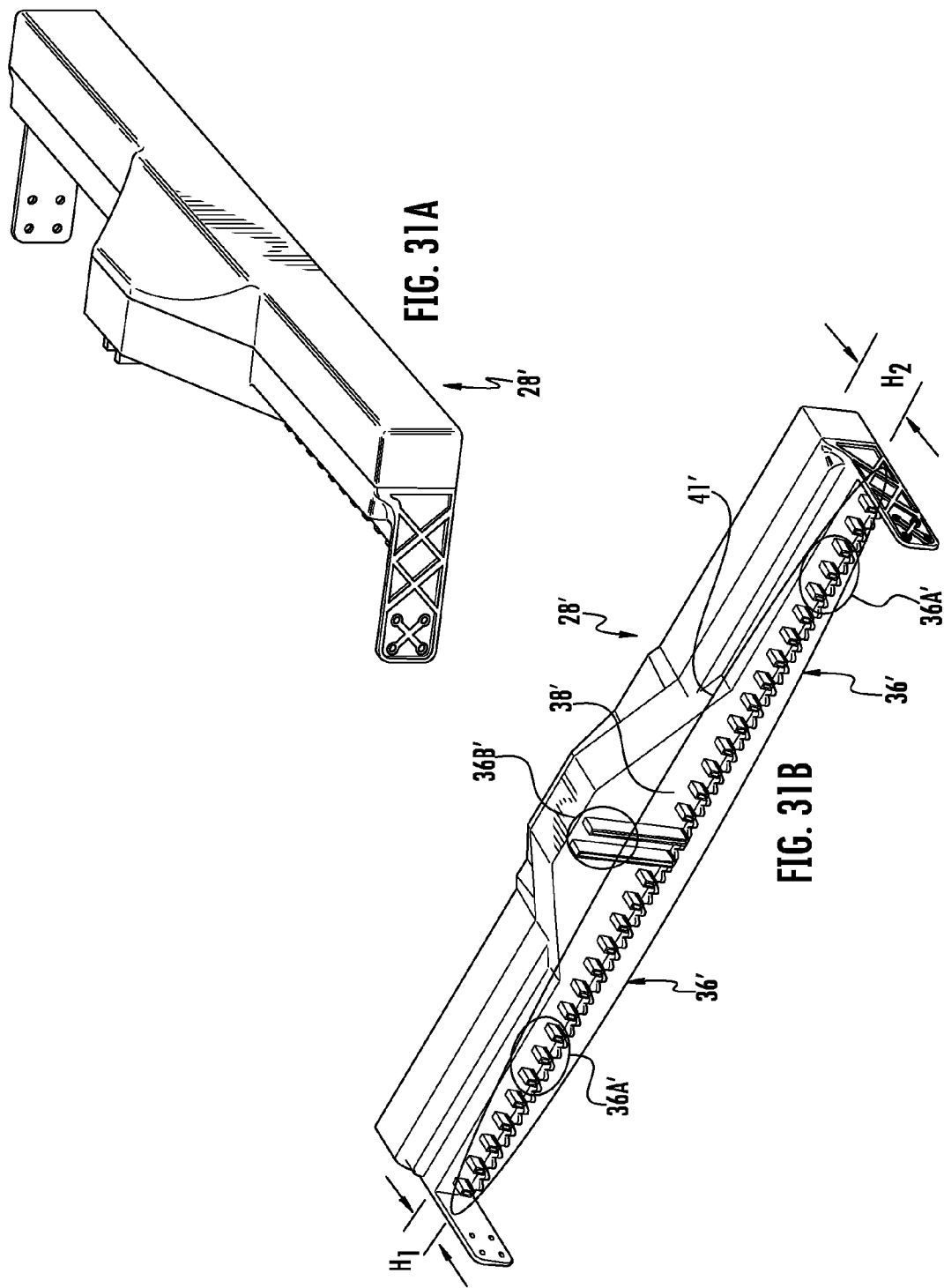

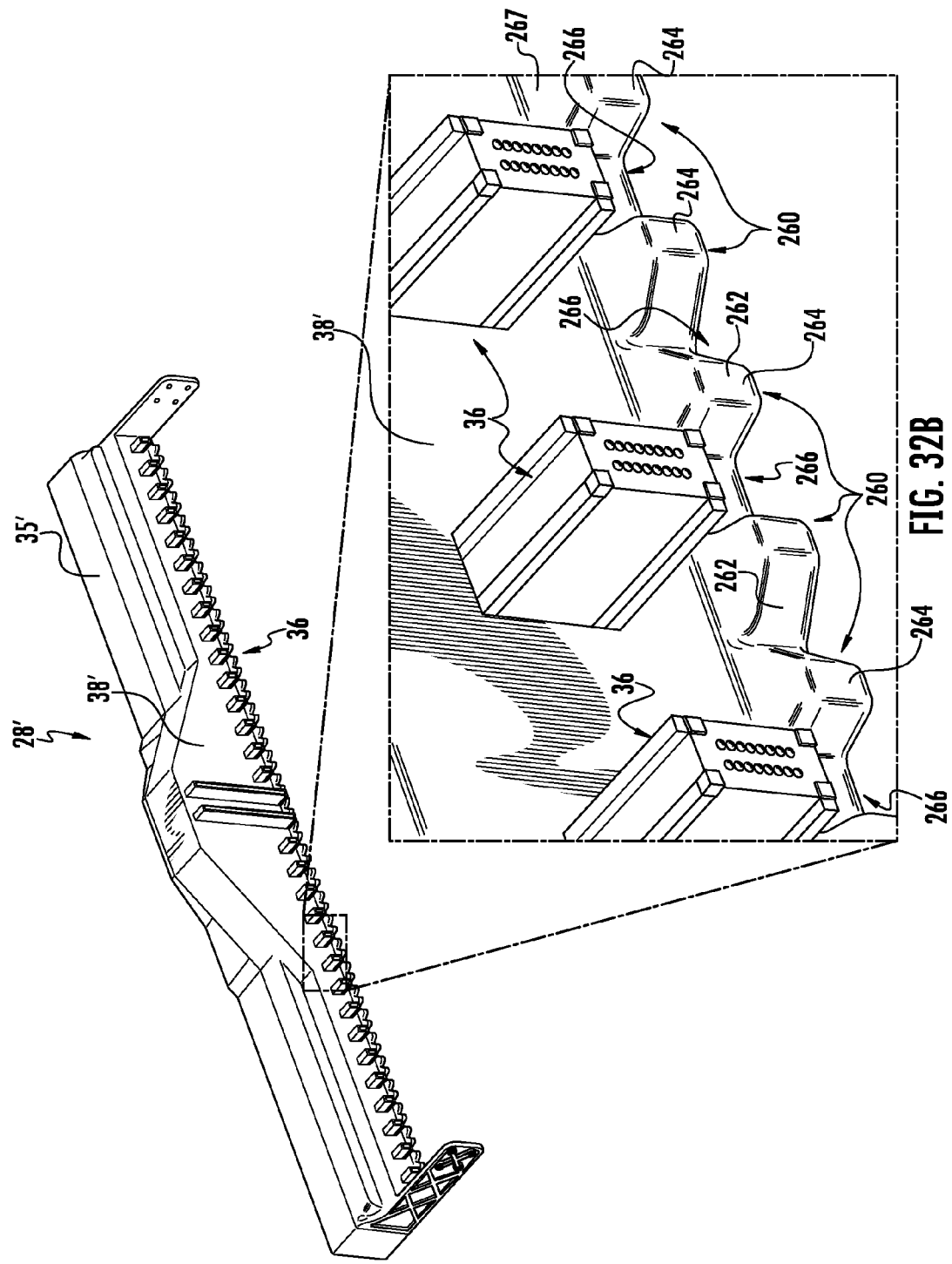

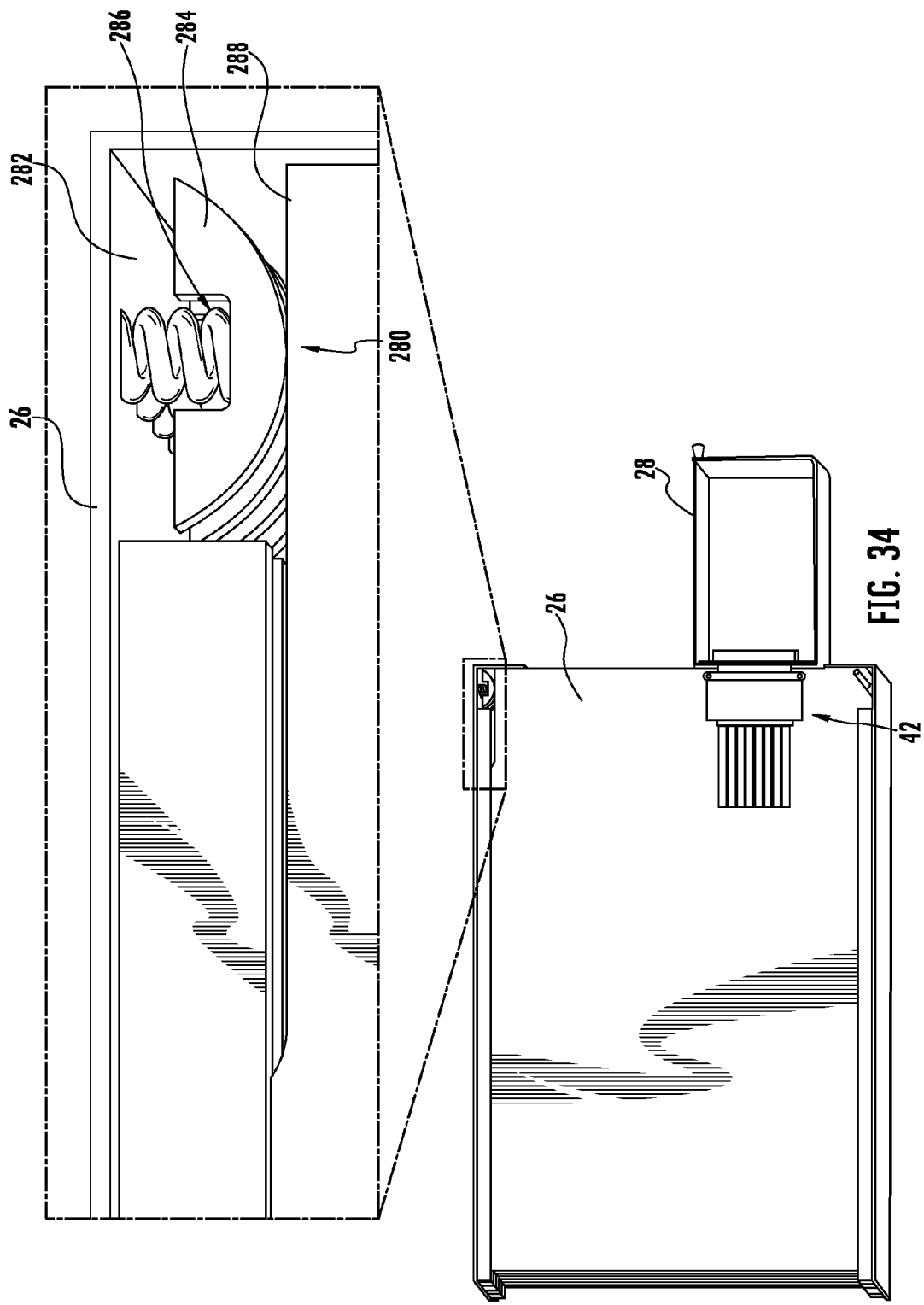

DENSE FIBER OPTIC CONNECTOR ASSEMBLIES AND RELATED CONNECTORS AND CABLES SUITABLE FOR ESTABLISHING OPTICAL CONNECTIONS FOR OPTICAL BACKPLANES IN EQUIPMENT RACKS

PRIORITY APPLICATIONS

This application is a continuation of International Application No. PCT/US12/23622 filed Feb. 2, 2012, which claims the benefit of priority to U.S. Application No. 61/438,847, filed Feb. 2, 2011, both applications being incorporated herein by reference.

RELATED APPLICATIONS

The present application is related to PCT Patent Application PCT/US12/23635 filed on Feb. 2, 2012 and entitled "OPTICAL BACKPLANE EXTENSION MODULES, AND RELATED ASSEMBLIES SUITABLE FOR ESTABLISHING OPTICAL CONNECTIONS TO INFORMATION PROCESSING MODULES DISPOSED IN EQUIPMENT RACKS," which is incorporated herein by reference in its entirety.

The present application is also related to PCT Patent Application PCT/US12/23626 filed on Feb. 2, 2012 and entitled "DENSE SHUTTERED FIBER OPTIC CONNECTORS AND ASSEMBLIES SUITABLE FOR ESTABLISHING OPTICAL CONNECTIONS FOR OPTICAL BACKPLANES IN EQUIPMENT RACKS," which is incorporated herein by reference in its entirety.

BACKGROUND

1. Field of the Disclosure

The technology of the disclosure relates to dense fiber optic connectors, and related fiber optic components, housings, and modules for facilitating optical connections for information processing modules (e.g., a server blade) disposed in an equipment rack.

2. Technical Background

A data center is a facility used to remotely house computer systems and associated components. These systems may be used for a variety of purposes. Examples include telecommunications such as telecommunications and storage systems applications, server farms for web page accesses, remote storage, such as for backup storage purposes, and providing access to Enterprise applications. To provide for efficient management of these computer systems, data centers include equipment racks, such as the equipment rack 10 illustrated in FIG. 1. For example, the equipment rack 10 in FIG. 1 is comprised of rails 12A, 12B extending in a vertical direction and spaced a distance apart to support a plurality of modular housings 14 disposed between the rails 12A, 12B in vertical space for efficient use of data center space. The modular housings 14 are configured to support information processing devices 16, such as computer servers and data storage devices, as examples, in the form of cards 18, also referred to as "blades 18." The blades 18 may be printed circuit boards (PCBs) containing computer-based components and electrical traces for connections between components. The modular housings 14 may also include a backplane (not shown) connected to power and other data transfer devices which are coupled to the information processing devices 16 when installed in the modular housing 14 and connected to the backplane.

As the demand for access to remote applications and data storage increases, it will be desirable to find ways to increase computational power and data throughput of data center computer devices. It will be desirable to find ways to increase computational power and data throughput of data center computer devices without necessarily having to increase floor space of data centers.

SUMMARY OF THE DETAILED DESCRIPTION

Embodiments disclosed herein include dense fiber optic connector assemblies and related connectors and fiber optic cables suitable for establishing optical connections for optical backplanes in equipment racks. In this regard in one embodiment, a fiber optic connector is provided. The fiber optic connector may be configured to be directly optically connected in an optical backplane. The fiber optic connector is comprised of at least one fiber optic connector body, at least one fiber optic ferrule in the at least one fiber optic connector body. The fiber optic ferrule is configured to support a fiber count and to optically align fiber openings with lenses disposed on the fiber optic connector body. The fiber optic connectors may be optical backplane fiber optic connectors or blade fiber optic connectors.

In another embodiment, a fiber optic connector for establishing direct optical connections for optical backplanes is provided. The fiber optic connector comprises at least one fiber optic connector body configured to be directly optically connected in an optical backplane. The at least one fiber optic connector body comprises a first end, a second end, an opening disposed on the first end accessing an internal chamber disposed between the first end and the second end, a fiber lead-in structure comprised of a plurality of fiber lead-ins disposed adjacent the second end, and a plurality of lenses disposed in the second end, each of the plurality of lenses optically aligned with a fiber lead-in among the plurality of fiber lead-ins for optical transmission between the plurality of fiber lead-ins and the plurality of lenses. The fiber optic connector also comprises at least one fiber optic ferrule. The at least one fiber optic ferrule comprises a first end, a second end, an opening disposed on the first end accessing an internal chamber disposed between the first end and the second end, and a plurality of fiber openings disposed in the second end. The at least one fiber optic ferrule is disposed through the opening of the at least one fiber optic connector body optically aligning the plurality of fiber openings of the at least one fiber optic ferrule with the plurality of lenses disposed in the at least one fiber optic connector body.

In another embodiment, a fiber optic connector assembly for establishing direct optical connections for optical backplanes is provided. The fiber optic connector assembly comprises at least one backplane fiber optic connector configured to be directly optically connected in an optical backplane. The backplane fiber optic connector comprises at least one backplane fiber optic connector body having a first end, a second end, an opening disposed on the first end accessing an internal chamber disposed between the first end and the second end, a fiber lead-in structure comprised of a plurality of fiber lead-ins disposed adjacent the second end, and a plurality of lenses disposed in the second end, each of the plurality of lenses optically aligned with a fiber lead-in among the plurality of fiber lead-ins for optical transmission between the plurality of fiber lead-ins and the plurality of lenses. The backplane fiber optic connector also comprises at least one backplane fiber optic ferrule having a first end, a second end, an opening disposed on the first end accessing an internal chamber disposed between the first end and the second end, and a plurality of fiber openings disposed in the second end. The at least one backplane fiber optic ferrule is disposed through the opening of the at least one backplane fiber optic connector body optically aligning the plurality of fiber openings of the at least one backplane fiber optic ferrule with the plurality of lenses disposed in the at least one backplane fiber optic connector body.

This fiber optic connector assembly also comprises at least one blade fiber optic connector configured to be directly optically connected in the optical backplane. The blade fiber optic connector comprises at least one blade fiber optic connector body having a first end, a second end, an opening disposed on the first end accessing an internal chamber disposed between the first end and the second end, a fiber lead-in structure comprised of a plurality of fiber lead-ins disposed adjacent the second end, and a plurality of lenses disposed in the second end, each of the plurality of lenses optically aligned with a fiber lead-in among the plurality of fiber lead-ins for optical transmission between the plurality of fiber lead-ins and the plurality of lenses. The blade fiber optic connector also comprises at least one blade fiber optic ferrule having a first end, a second end, an opening disposed on the first end accessing an internal chamber disposed between the first end and the second end, and a plurality of fiber openings disposed in the second end. The at least one blade fiber optic ferrule is disposed through the opening of the at least one blade fiber optic connector body optically aligning the plurality of fiber openings of the at least one blade fiber optic ferrule with the plurality of lenses disposed in the at least one blade fiber optic connector body.

In another embodiment, a method of making a fiber optic component using a projected fiber guide mold is provided. The method includes the steps of providing a mold body and injecting a material to form the fiber optic component. The mold body has a plurality of fiber lead-in mold tips disposed in row and column disposed in the mold body. The plurality of fiber lead-in mold tips each comprise a square-shaped member having a first end disposed adjacent the mold body and a second end, the square-shaped member configured to provide a molded fiber lead-in for a coated portion of an end portion of an optical fiber.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE FIGURES

FIG. 2A is a front perspective view of exemplary information processing modules disposed in rack module housings disposed in an equipment rack, with optical backplane extension modules directly optically connected to information processing modules in the rear of the rack module housings;

FIG. 2B is a rear perspective view of the optical backplane extension modules in FIG. 2A optically connected in the rear of the rack module housings to the information processing modules;

FIG. 3 is a rear perspective view of the optical backplane extension modules in FIG. 2B optically connected in the rear of the rack module housings to information processing modules, with the doors of the optical backplane extension modules open to show the interior routing and cable management space in the optical backplane extension modules;

FIG. 4A is a right side perspective view of the optical backplane extension module in FIG. 2B optically connected to the information processing modules in the rear of a rack module housing;

FIG. 4B is a right side perspective view of the information processing modules in FIG. 4A with rack module housing removed, and illustrating an exemplary dense fiber optic connector assembly facilitating direct optical connections to the information processing modules through the optical backplane extension module in FIGS. 2A-3;

FIG. 6A is a close-up perspective view of the backplane fiber optic plugs in FIG. 5;

FIG. 6B is a close-up perspective view of the blade fiber optic receptacles in FIG. 5;

FIG. 9A is a perspective quarter cut view of an exemplary dense fiber optic connector assembly configured to support GRIN lenses that may be employed in the blade fiber optic receptacles in FIGS. 5, 6B, and 8;

FIGS. 10A and 10B are right side perspective views of the shuttered fiber optic receptacles that can be employed as the blade fiber optic receptacles in FIGS. 5, 6B, and 8 with the slideable shutters disposed in open and closed positions, respectively;

FIGS. 12A and 12B are side cross-sectional views of the shuttered fiber optic receptacles in FIGS. 11A, and 11B, respectively, illustrating the slideable shutter disposed in closed and open positions, respectively;

FIG. 13B is a rear perspective view of the shuttered fiber optic plug in FIG. 13A, with an actuation mechanism of the slideable shutter actuated to dispose the slideable shutter in an open position;

FIG. 13C is a close-up view of the slideable shutter actuated to dispose the slideable shutter in an open position in FIG. 13B;

FIG. 15A is a side perspective view of the shuttered fiber optic receptacle in FIGS. 11A and 11B with the actuation members unactuated to place the slideable shutters in closed positions before the shuttered fiber optic receptacle receipt of the fiber optic plug body in FIGS. 13A-14;

FIG. 15B is a side perspective view of the shuttered fiber optic receptacle in FIGS. 11A and 11B with the actuation members actuated to place the slideable shutters in open positions as the shuttered fiber optic receptacle receives and is mated with the fiber optic plug body in FIGS. 13A-14;

FIG. 16A is a right side perspective view of the front of a rack module housing with information processing modules disposed therein;

FIG. 16B is a right side perspective view of the information processing modules in FIG. 16A without the rack module housing illustrated, and illustrating another exemplary dense fiber optic connector assembly to facilitate optical connections to the information processing modules through the optical backplane extension module in FIGS. 2A-3;

FIGS. 26 and 27 are front and rear perspective views, respectively, of the optical backplane extension module in FIGS. 2A-3;

FIG. 28 is a rear perspective view of the optical backplane extension module in FIGS. 27A and 27B illustrating a close-up view of the backplane fiber optic plugs disposed in the rear of the optical backplane extension module and interconnection fiber optic adapters disposed through interconnection ports in the side of the optical backplane extension module;

FIGS. 30A and 30B are rear and front perspective views, respectively, of exemplary information processing modules disposed in rack module housings, with another exemplary optical backplane extension module disposed in the rear of the rack module housing and optically connected to the information processing modules in the rear of the rack module housings using a dense fiber optic connector assembly;

FIGS. 31A and 31B are front and rear perspective views, respectively, of the optical backplane extension module in FIGS. 30A and 30B;

FIG. 32B is a close-up perspective view of backplane fiber optic plugs disposed between alignment members in the optical backplane extension module in FIGS. 30A and 30B;

FIG. 34 is a side perspective view and close-up view of spring-loaded biasing members configured to push information processing modules down against the bias wheels in FIG. 33 to securely align the information processing modules in the rack module housing.

DETAILED DESCRIPTION

Figure 1:
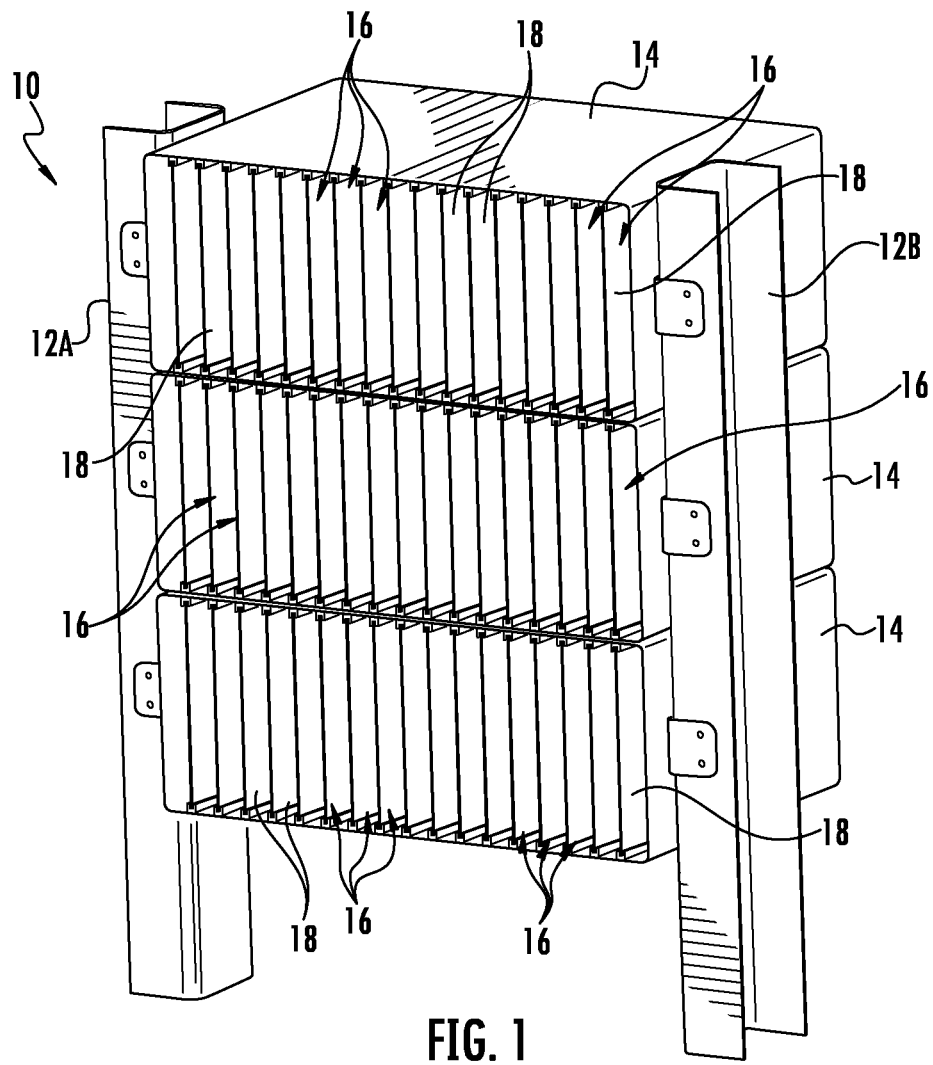
FIG. 1 is a front perspective view of an exemplary equipment rack supporting rack module housings each supporting a plurality of information processing modules.

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed herein include dense fiber optic connector assemblies and related connectors and fiber optic cables suitable for establishing optical connections for optical backplanes in equipment racks and the like. In this regard in one embodiment, a fiber optic connector is provided. The fiber optic connector configured to be directly optically connected in an optical backplane. The fiber optic connector is comprised of at least one fiber optic connector body, at least one fiber optic ferrule in the at least one fiber optic connector body. The fiber optic ferrule is configured to support a fiber count and to optically align fiber openings with lenses disposed on the fiber optic connector body. The fiber optic connectors may be optical backplane fiber optic connectors or blade fiber optic connectors.

In this regard, FIGS. 2A and 2B illustrate a data center 20 illustrating front and rear perspective views, respectively of an exemplary equipment rack 22. Although only one equipment rack 22 is illustrated in FIGS. 2A and 2B, it is understood that a plurality of equipment racks 22 may be present at the data center 20. The equipment rack 22 is configured to support information processing modules 24 in rack module housings 26 disposed in the equipment rack 22. For example, the information processing modules 24 may include computer servers, switches, and computer storage devices, and which may be referred to as server blades and storage blades, respectively. As will be discussed in greater detail below, the present disclosure provides fiber optic connectors, connector assemblies, cables, housings, and other related fiber optic components and methods that may be employed to connect and interconnect the information processing modules 24 to increase the data throughput of information process modules 24 thus increasing the throughput of the data center 20. Benefits of optical fiber include extremely wide bandwidth and low noise operation, and thus higher data throughput as a result.

With continuing reference to FIGS. 2A and 2B, because fiber optic components are used to connect and interconnect the information processing modules 24, fiber optic cables are employed. It may be needed or desired to provide fiber optic cable management and neat storage and routing to avoid complexity in maintaining the data center 20 and to avoid or minimizing interfering with air flow between the information processing modules 24 disposing in the rack module housings 26. In this regard, as will be discussed in more detail below, optical backplane extension modules 28 can be provided. As illustrated in FIG. 3, the optical backplane extension modules 28 are configured to be attached to the rear side 30 of the equipment rack 22 and a rack module housing 26 to manage and route fiber optic cables 32 extending from fiber optic connections to the information processing modules 24.

As illustrated in FIG. 3 generally and described later in this disclosure, the optical backplane extension modules 28 each comprise an interior space 34 defined by an extension module housing 35 for maintaining and routing of the fiber optic cables 32. As illustrated in the close-up view of the optical backplane extension module 28 in FIG. 3, the optical backplane extension modules 28 also support a plurality of backplane fiber optic connectors 36 attached to the fiber optic cables 32. The optical backplane extension module 28 supports disposing the backplane fiber optic connectors 36 through a rear side 38 of the extension module housing 35 to form an optical backplane. The optical backplane is configured to be directly optically connected to complementary fiber optic connectors disposed in information processing modules 24 to establish fiber optic connections when the optical backplane extension modules 28 are installed. By "directly connected," it is meant that there is not intermediate cabling used to make the connection. One connector is directly connected to another connector. The fiber optic connections can be intraconnections between information processing modules 24 within the same rack module housing 26 and thus the same optical backplane extension module 28. However, in one embodiment, the optical backplane extension modules 28 also contain optical interconnection ports 40 to allow interconnections between optical backplane extension modules 28 and/or direction to information processing modules 24.

Figure 4C:
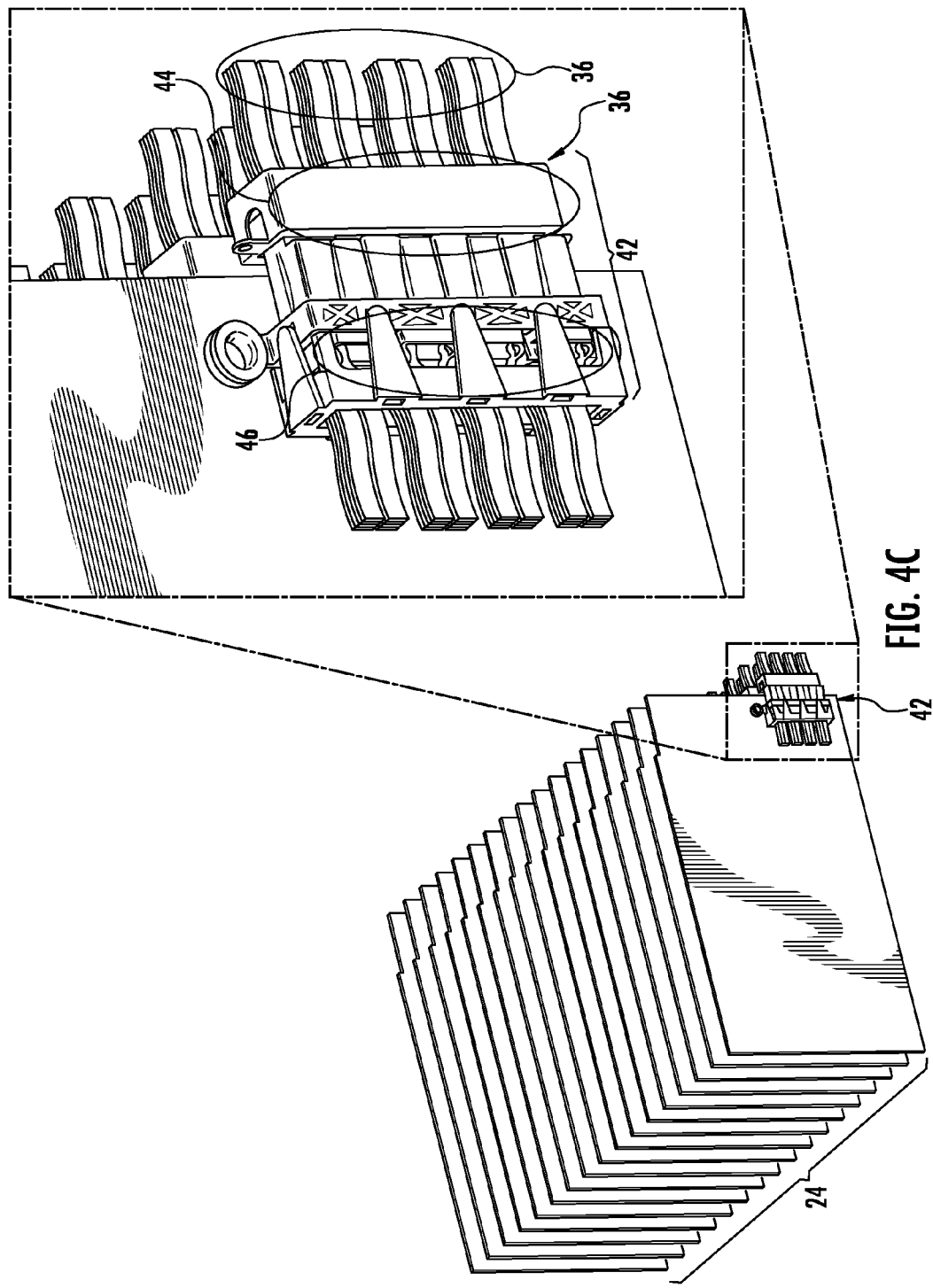
FIG. 4C is a close-up view of the dense fiber optic connector assembly in FIG. 4B.

Embodiments disclosed herein include dense fiber optic connector assemblies and related connectors and fiber optic cables suitable for establishing optical connections for optical backplanes in equipment racks. In this regard, FIG. 4A illustrates a right side perspective view of the optical backplane extension module 28 in FIG. 2B directly optically connected in the rear of the rack module housing 26 to the information processing modules 24. FIGS. 4B and 4C are right side perspective views of the information processing modules 24 with the rack module housing 26 removed for clarity purposes. As illustrated in FIG. 4B and the close-up view in FIG. 4C, an exemplary dense fiber optic connector assembly 42 is illustrated and provided to facilitate direct optical connections to the information processing modules 24 through the optical backplane extension module 28 in FIGS. 2A-3. A dense fiber optic connector assembly or related component is one in which a large number of optical fibers are supported to provide larger fiber optic connections in a dense area. Providing dense fiber optic connections can provide greater data throughput. For example, the dense fiber optic connector assembly 42 in FIGS. 4B and 4C support any suitable number of fiber optic connections such as sixty-four (64), one-hundred and twenty-eight (128), two hundred fifty six (256) optical fibers or more for providing the desired number of fiber optic connections.

With continuing reference to FIGS. 4A-4C, and as will be described in greater detail below, the dense fiber optic connector assembly 42 is comprised of one or more fiber optic connectors, which are backplane fiber optic plugs 44 in this embodiment. The backplane fiber optic plugs 44 are configured to be disposed through the rear side 38 of the extension module housing 35 (see FIG. 3). By the term "backplane," it refers to disposition in the optical backplane extension module 28. The dense fiber optic connector assembly 42 also comprises one or more blade fiber optic connectors, which are blade fiber optic receptacles 46 in this embodiment, mounted on the information processing modules 24. By the term "blade," it is meant to refer to a card, board, or other carrier used to provide the components of an information processing module 24 that is mechanically received in the rack module housing 26. The blade fiber optic connectors 46 are connected to components in the information processing modules 24 to facilitate transfer of data from these components. Thus, when the backplane fiber optic plugs 44 are mated to the blade fiber optic receptacles 46, optical connections are established to the information processing modules 24. These optical connections can be routed through the fiber optic cables 32 connected to the backplane fiber optic plugs 44 (see FIG. 3) to other information processing modules 24 through intraconnections in the optical backplane extension module 38 and/or interconnections through the optical interconnection ports 40.

Figure 5:
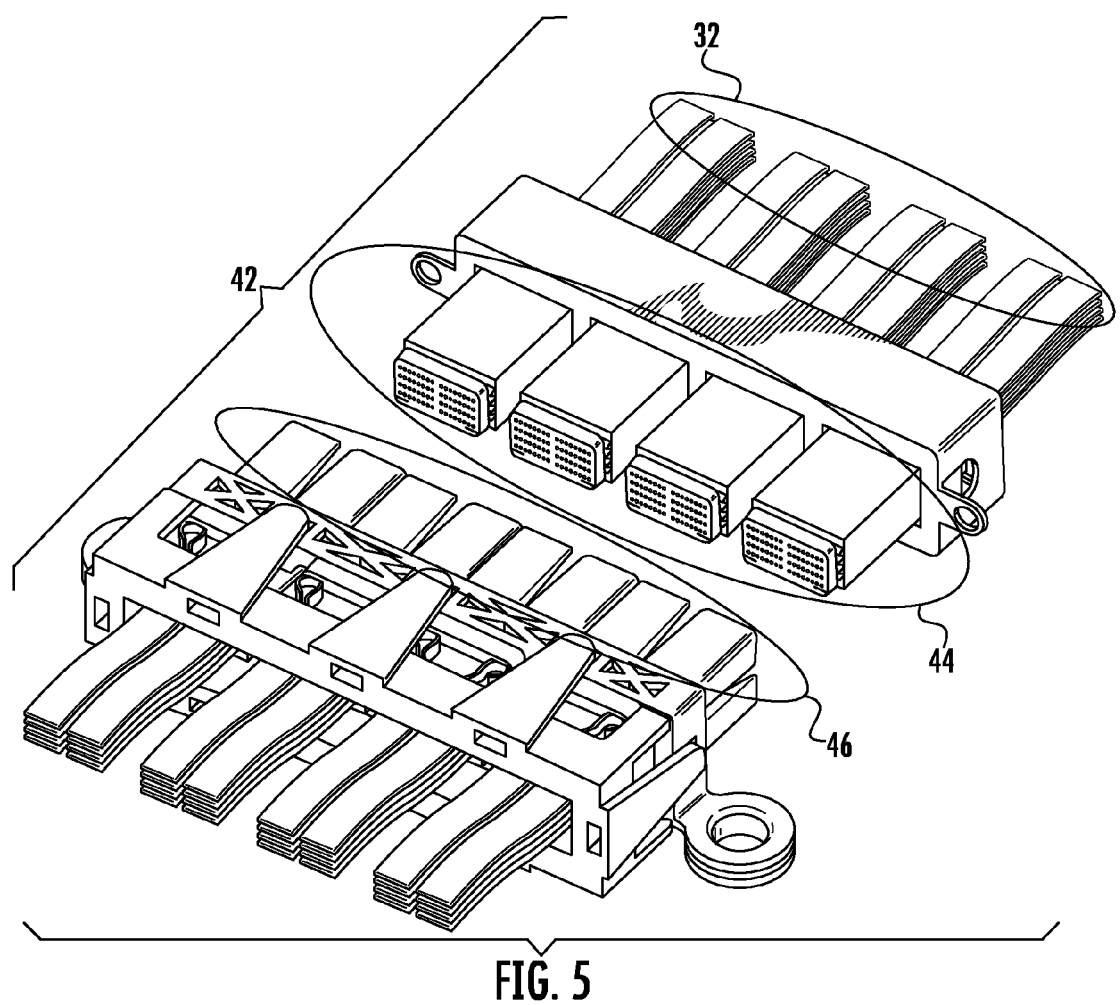
FIG. 5 is a perspective view of the dense fiber optic connector assembly in FIG. 4B comprised of dense information processing module fiber optic receptacles ("blade fiber optic receptacles") configured to receive and optically connect to dense optical backplane extension module fiber optic plugs ("backplane fiber optic plugs")

FIG. 5 is a close-up perspective view of the dense fiber optic connector assembly 42 in FIGS. 4B and 4C. In this example, the dense fiber optic connector assembly 42 is comprised of dense information processing module fiber optic receptacles ("blade fiber optic receptacles 46") configured to receive and directly optically connect to dense optical backplane extension module fiber optic plugs ("backplane fiber optic plugs 44"). FIG. 6A is a close-up perspective view of the backplane fiber optic plugs 44 in FIG. 5. FIG. 6B is a close-up perspective view of the blade fiber optic receptacles 46 in FIG. 5. Note that the dense fiber optic connector assembly 42 is not limited to this connector configuration. For example, the blade fiber optic receptacles 46 could be configured as plugs, and the backplane fiber optic plugs 44 could be configured as receptacles.

Figure 7A:
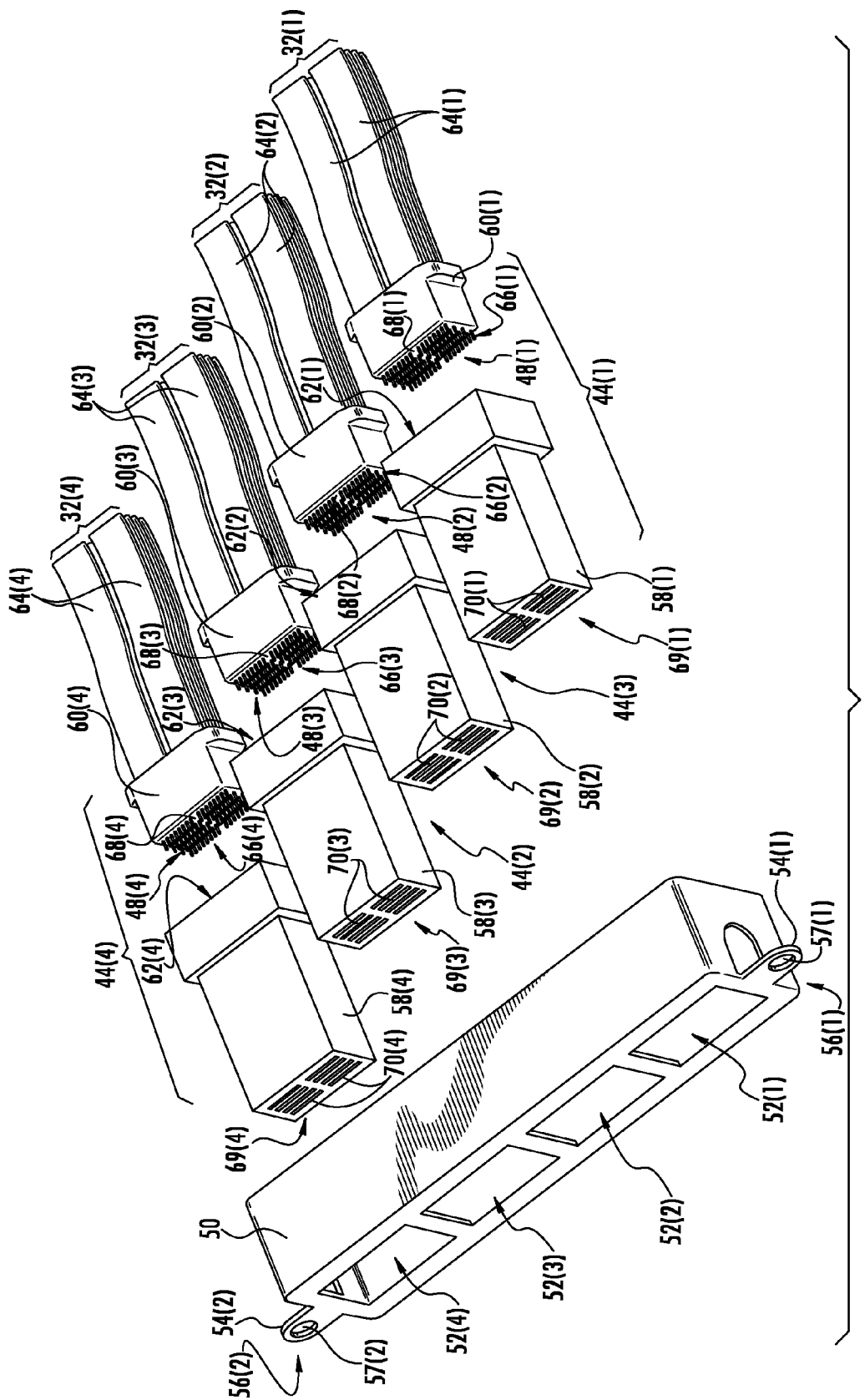
FIG. 7A is a perspective exploded view of the backplane fiber optic plugs in FIGS. 5 and 6A.

FIG. 7A is a perspective exploded view of the backplane fiber optic plugs 44 in FIGS. 5 and 6A. With reference to FIGS. 5, 6A, and 7, the backplane fiber optic plugs 44 are comprised of four (4) backplane fiber optic plugs 44(1)-44(4) in this embodiment. Each backplane fiber optic plug 44 supports sixty-four (64) optical fibers 48(1)-48(4). As will be described in more detailed below, the backplane fiber optic plugs 44(1)-44(4) are configured to support multiple fiber optic cables 32(1)-32(4) to provide a high density optical fiber count in the backplane fiber optic plugs 44(1)-44(4). In this embodiment, the fiber optic cables 32(1)-32(4) are each comprised of a plurality of ribbonized fiber optic cables; however, other embodiments may use optical fibers without cable such as optical fibers that are ribbonized or not. Providing backplane fiber optic plugs 44(1)-44(4) that are configured to receive ribbonized fiber optic cables is one method of allowing the backplane fiber optic plugs 44(1)-44(4) to support high density optical fiber count since ribbonized fiber optic cables are flat and efficient in terms of optical fiber count versus space. Further in this embodiment, each of the fiber optic cables 32(1)-32(4) are comprised of a plurality of ribbonized cables which allows flexibility in providing intraconnections and interconnections facilitated by the optical backplane extension module 28. Each fiber optic cable 32(1)-32(4) does not have to be intraconnected or interconnected to the same fiber optic connector depending on the design.

With continuing reference to FIGS. 6A and 7, each of the backplane fiber optic plugs 44(1)-44(4) are disposed in a backplane connector frame 50 to group the backplane fiber optic plugs 44(1)-44(4) together. The backplane connector frame 50 may be comprised of a plastic member that is molded or stamped, as non-limiting examples. The backplane connector frame 50 contains a plurality of openings 52(1)-52 (4) configured to receive the backplane fiber optic plugs 44(1)-44(4). The backplane connector frame 50 also contains a suitable number of mounting features such as two tabs 54(1), 54(2) extending from ends 56(1), 56(2) of the connector frame 50 for mounting the backplane connector frame 50 to the rear side 38 of the extension module housing 35 (see FIG. 3). Each mounting tab 54(1), 54(2) contains an opening 57(1), 57(2) that is configured to receive a fastener to secure the backplane connector frame 50 with the backplane fiber optic plugs 44(1)-44(4) to the extension module housing 35 (see FIG. 3) to form an optical backplane for connection to the blade fiber optic receptacles 46(1)-46(4).

Figure 7B:
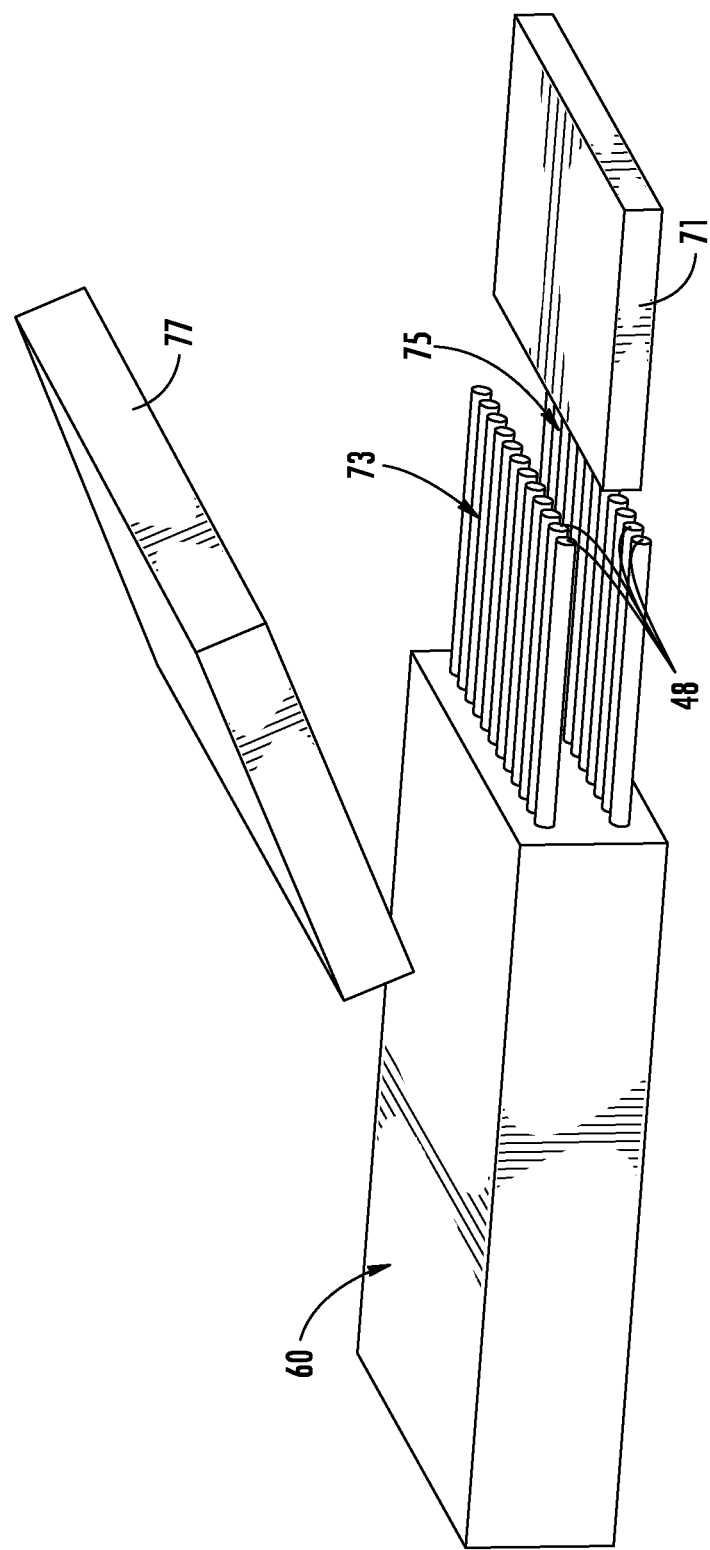
FIG. 7B schematically depicts a method for laser processing a plurality of optical fibers disposed in the backplane fiber optic plugs in FIG. 7A using a protection element disposed between a first row and a second row of optical fibers.

FIG. 7A also illustrates more detail of the backplane fiber optic plugs 44(1)-44(4). Each backplane fiber optic plug 44(1)-44(4) is comprised of a fiber optic connector body in the form of a fiber optic plug bodies 58(1)-58(4) and a fiber optic ferrule in the form of a fiber optic plug ferrules 60(1)-60(4). The fiber optic plug ferrules 60(1)-60(4) are configured to be disposed through first ends 62(1)-62(4) of the fiber optic plug bodies 58(1)-58(4) and disposed in internal chambers in the fiber optic plug bodies 58(1)-58(4). Optical fibers 48(1)-48(4) may be exposed and prepared from the sheaths 64(1)-64(4) of the fiber optic cables 32(1)-32(4) if necessary are aligned with fiber openings 66(1)-66(4) disposed in end faces 68(1)-68(4) of the fiber optic plug ferrules 60(1)-60(4). The second ends 69(1)-69(4) of the fiber optic plug bodies 58(1)-58(4) contain lenses 70(1)-70(4) are configured to be aligned with the fiber openings 66(1)-66(4) of the fiber optic plug ferrules 60(1)-60(4). The lenses 70(1)-70(4) allow for optical connections to be made to the optical fibers 48(1)-48(4) when the backplane fiber optic plugs 44(1)-44(4) are mated to the blade fiber optic receptacles 46(1)-46(4). With continuing reference to FIG. 7A, the purpose of the fiber optic plug ferrules 60(1)-60(4) is to hold the optical fibers 48(1)-48(4) together during fiber processing and during their insertion into the fiber optic plug bodies 58(1)-58(4). Laser processing of the optical fibers 48(1)-48(4) can provide a quick and efficient method for producing a high-quality end face on the optical fibers 48(1)-48(4) for termination. Examples of laser processing that can be provided to the optical fibers 48(1)-48 (4) are described in U.S. patent application Ser. No. 13/028, 799 filed on Feb. 16, 2011 and titled "METHODS FOR LASER PROCESSING ARRAYED OPTICAL FIBERS ALONG WITH SPLICING CONNECTORS". In this regard, FIG. 7B depicts a first method for laser processing the plurality of optical fibers 48 using a protection element 71. Protection element 71 is used for protecting the optical fibers 48 in the array that are not intended for laser processing since they are located at a further distance from the laser than the optical fibers optical fibers 48 intended for processing. By way of example, the fiber optic plug ferrules 60 have the optical fibers 48 disposed in a first row 73 at a first distance and a second row 75 at a second distance so that the laser could not be focused for both distances. More or fewer rows can be provided as desired. As shown, the first row 73 and second row 75 of the optical fibers 48 are schematically shown disposed within the fiber optic plug ferrules 60. The protection element 71 can reflect, absorb and/or disperse the laser energy after it passes the optical fibers being processed depending on the type of material used for the same. For instance, if the protection element 71 is a material that has a smooth surface such as a machined aluminum, stainless steel, etc. it will have a high-degree of reflection. On the other hand, if the protection element 71 is formed from a mica, carbon, ceramic plate or other similar porous material it will have a high-degree of absorption. Still further, the degree of dispersion caused by protection element 71 can depend on the surface finish. In other words, the rougher the surface, the greater the dispersion. Examples of surface finishes on protection element 71 that can create dispersion are grooves, knurling, etc.

With continued reference to FIG. 7B, the protection element 71 has a smooth surface that has a relatively high degree of reflection of the laser energy that impinges on the same. The protection element 71 allows the laser energy to reach the optical fibers being processed, but inhibits the laser energy from damaging the optical fibers not being processed, other portions of structure 30, or from creating a safety issue, but the protection element 71 may also absorb and/or disperse a portion of the energy depending on the material used. This laser process method also uses an optional laser absorption element 77 to contain the reflected laser energy. As shown in FIG. 7B, the protection element 71 is positioned near the ends of the optical fibers 48, and the absorption element 77 is disposed above the first row 73 of optical fibers 48 to inhibit the travel of any reflected laser energy from the protection element 71.

With reference back to FIG. 7A, the fiber optic plug bodies 58(1)-58(4) can be configured to provide optical transmission to the optical fibers 48(1)-48(4) disposed through the fiber optic plug ferrules 60(1)-60(4) through lenses that are molded-in, GRIN lenses or other suitable lenses disposed in the fiber optic plug bodies 58(1)-58(4). If molded-in lenses are used, the fiber optic plug bodies 58(1)-58(4) is preferably manufactured of a light transmission material to provide blind holes internal to the fiber optic plug bodies 58(1)-58(4) with lenses that extend to the second ends 69(1)-69(4) of the fiber optic plug bodies 58(1)-58(4).

Figure 8:
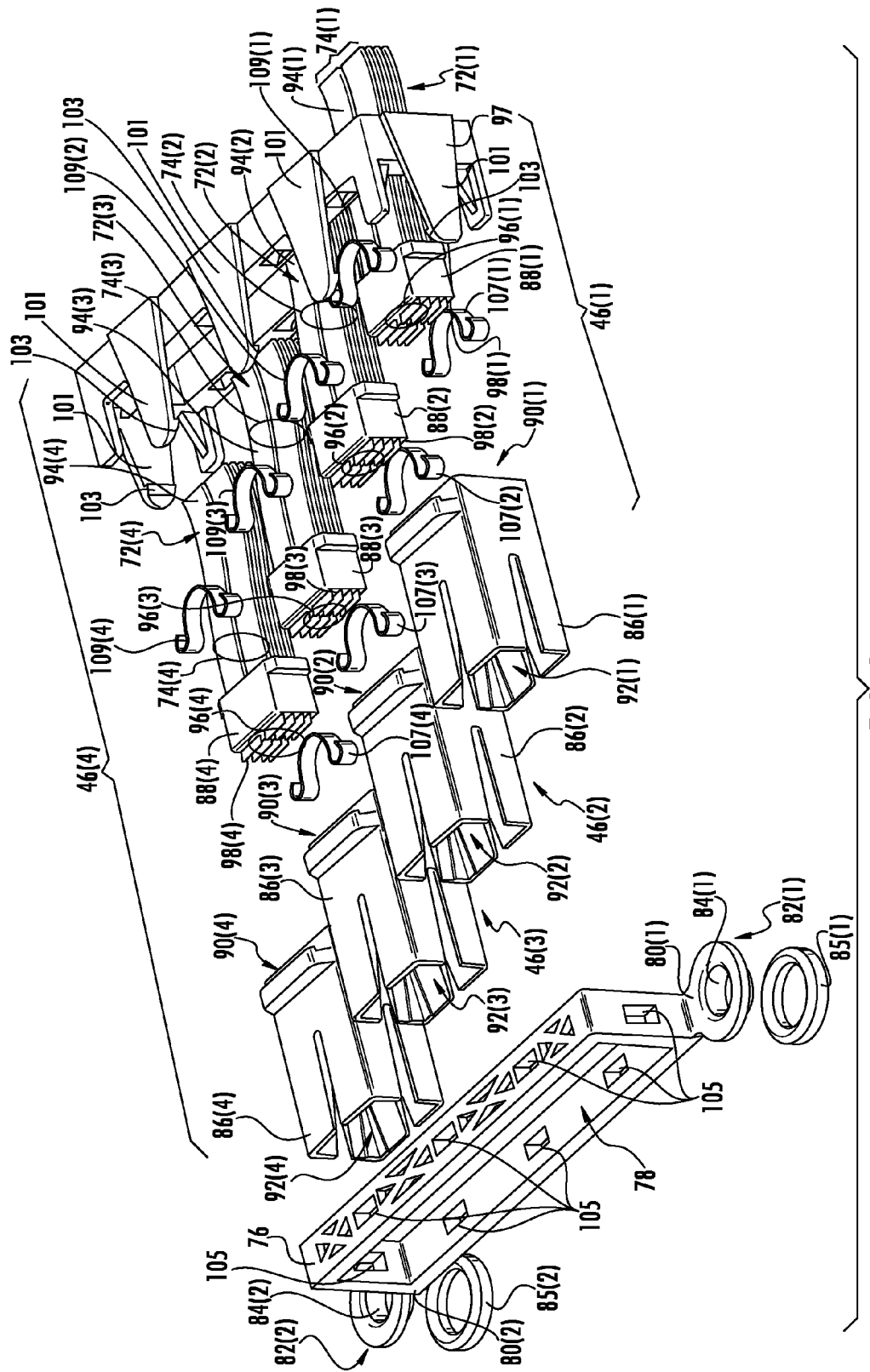
FIG. 8 is a perspective exploded view of the blade fiber optic receptacles in FIGS. 5 and 6B.

FIG. 8 is a perspective exploded view of the blade fiber optic receptacles 46 in FIGS. 5 and 6B. With reference to FIGS. 5, 6B and 8, the blade fiber optic receptacles 46 are comprised of four (4) blade fiber optic receptacles 46(1)-46 (4) in this embodiment. Each blade fiber optic receptacle 46(1)-46(4) supports sixty-four (64) optical fibers 72(1)-72 (4). As will be described in more detailed below, the blade fiber optic receptacles 46(1)-46(4) are configured to support multiple fiber optic cables 74(1)-74(4) to provide the a high optical fiber count in the blade fiber optic receptacles 46(1)-46(4). In this embodiment, the fiber optic cables 74(1)-74(4) are each comprised of a plurality of ribbonized fiber optic cables. Providing blade fiber optic receptacles 46(1)-46(4) that are configured to receive ribbonized fiber optic cables is one method of allowing the blade fiber optic receptacles 46(1)-46(4) to support high density optical fiber count since ribbonized fiber optic cables are flat and efficient in terms of optical fiber count versus space. Further in this embodiment, each of the fiber optic cables 74(1)-74(4) are comprised of a plurality of ribbonized cables which allows flexibility in providing fiber optic connections to different component and/or to different areas on the information processing modules 24.

With continuing reference to FIGS. 6B and 8, each of the backplane fiber optic receptacles 46(1)-46(4) are disposed in a blade connector frame 76 to group the blade fiber optic receptacles 46(1)-46(4) together when disposed on the information processing module 24. The blade connector frame 76 may be comprised of a plastic member that is molded or stamped as examples. The blade connector frame 76 contains an opening 78 configured to receive the blade fiber optic receptacles 46(1)-46(4). The blade connector frame 76 also includes suitable mounting features such as two tabs 80(1), 80(2) extending from ends 82(1), 82(2) of the blade connector frame 76 for mounting the blade connector frame 76 to a surface of the information processing module 24 (see FIG. 3). Each mounting tab 80(1), 80(2) contains an opening 84(1), 84(2) that is configured to receive a fastener to secure the blade connector frame 76 with the blade fiber optic receptacles 46(1)-46(4) to the information processing module 24 (see FIG. 3) for optical connections. Washers or spacers 85(1), 85(2) may be provided and disposed between the surface of the information processing module 24 and the blade connector frame 76. The spacers 85(1), 85(2) may be elastomeric elements that are intended to allow resilient coupling of the blade fiber optic receptacle 46 with the backplane fiber optic plug 44. By the spacers 85(1), 85(2) being elastomeric elements, when the backplane fiber optic plug 44 starts to mate with the blade fiber optic receptacle 46, the spacers 85(1), 85(2) allow the blade fiber optic receptacle 46 to be flexible and move slightly to allow for the backplane fiber optic plug 44 to properly mate with the blade fiber optic receptacles 44 in the event that the backplane fiber optic plug 46 and the blade fiber optic receptacles 44 are not perfectly aligned.

FIG. 8 also illustrates more detail of the blade fiber optic receptacles 46(1)-46(4). Each blade fiber optic receptacle 46(1)-46(4) is comprised of a fiber optic connector housing in the form of fiber optic receptacle bodies 86(1)-86(4) and a fiber optic ferrule in the form of fiber optic receptacle ferrules 88(1)-88(4). The fiber optic receptacle ferrules 88(1)-88(4) are configured to be disposed through first ends 90(1)-90(4) of the fiber optic receptacle bodies 86(1)-86(4) and disposed in internal chambers 92(1)-92(4) in the fiber optic receptacle bodies 86(1)-86(4). Optical fibers 72(1)-72(4) that are exposed and prepared from the sheaths 94(1)-94(4) of the fiber optic cables 74(1)-74(4) are aligned with fiber openings 96(1)-96(4) disposed in end faces 98(1)-98(4) of the fiber optic receptacle ferrules 88(1)-88(4). Optical connections to the optical fibers 72(1)-72(4) disposed in the fiber optic receptacle ferrules 88(1)-88(4) are made when the backplane fiber optic plugs 44(1)-44(4) are inserted into the internal chambers 92(1)-92(4) of the fiber optic receptacle bodies 86(1)-86(4). The fiber optic receptacle bodies 86(1)-86(4) align the fiber optic plug bodies 58(1)-58(4) (FIG. 7A) and their lenses 70(1)-70(4) with the fiber openings 96(1)-96(4) in the end faces 98(1)-98(4) of the fiber optic receptacle ferrules 88(1)-88(4).

With continuing reference to FIG. 8, the fiber optic receptacle ferrules 88(1)-88(4) can be configured to provide optical transmission to the optical fibers 72(1)-72(4) disposed therein through lenses such as molded-in lenses, GRIN lenses, or the like disposed in the fiber optic receptacle ferrules 88(1)-88 (4). By way of example, fiber optic receptacle ferrules 88(1)-88(4) may support GRIN lenses in bores. In this regard, FIG. 9A is a perspective quarter cut view of the blade fiber optic receptacles 46(1)-46(4) in FIGS. 5, 6B, and 8, wherein the fiber optic connector bodies 86(1)-86(4) are configured to support GRIN lenses.

To assemble the blade fiber optic receptacles 46(1)-46(4), the blade fiber optic receptacles 46(1)-46(4) are disposed through the blade connector frame 76. The fiber optic receptacle ferrules 88(1)-88(4) are disposed through a rear blade connector frame 97. The blade connector frame 76 and rear blade connector frame 97 are secured to each other by latches 101 that contain protrusions 103 configured to engage with openings 105 disposed in the back connector frame 76. Springs 107(1)-107(4), 109(1)-109(4) are included to provide spring loading of the blade fiber optic receptacles 46(1)-46(4) to the blade connector frame 76 and rear blade connector frame 97 to allow for movement, when needed, to be connected to the backplane fiber optic plugs 44(1)-44(4).

As illustrated in FIG. 9A, a fiber optic receptacle sub-carrier 99(1) of the fiber optic receptacle body 86(1) is configured to receive the fiber optic receptacle ferrule 88(1). In this embodiment, the fiber optic receptacle sub-carrier 99(1) is comprised of GRIN lens internal chambers 100(1) aligned with GRIN lens openings 95(1). The GRIN lens internal chambers 100(1) are configured to support GRIN lenses whose end portions are disposed at the end face 98(1) through the GRIN lens openings 95(1). The fiber optic receptacle sub-carrier 99(1) is also comprised of internal fiber chambers 102(1) to support the optical fibers 72(1) and align the optical fibers 72(1) with the GRIN lens internal chambers 100(1) to align the optical fibers 72(1) with GRIN lenses. The internal fiber chambers 102(1) are comprised of a coated fiber chamber 102A(1) and a bare fiber chamber 102B(1) to securely support the coated portions 72A(1) and bare portions 72B(1) of the optical fibers 72(1) to avoid movement of the optical fibers 72(1) in the fiber optic receptacle sub-carrier 99(1). Note that although only the fiber optic receptacle sub-carrier 99(1) and fiber optic receptacle ferrule 88(1) are discussed with regard to FIG. 9A, the discussion of FIG. 9A is equally applicable to the other fiber optic receptacle ferrules 88(2)-88(4) and their fiber optic receptacle sub-carriers 99(2)-99 (4).

Alternatively, the fiber optic receptacle bodies 86(1)-86(4) can be manufactured of a light transmission material having molded-in lenses at the end of blind holes for receiving optical fibers for optical transmissions at the interface. In this regard, FIG. 9B is a perspective cross-section view of the fiber optic receptacle body 86(1) providing a blind hole lens holder that may be employed in the blade fiber optic receptacles 46(1)-46(4) in FIGS. 5, 6B, and 8.

Figure 9B:
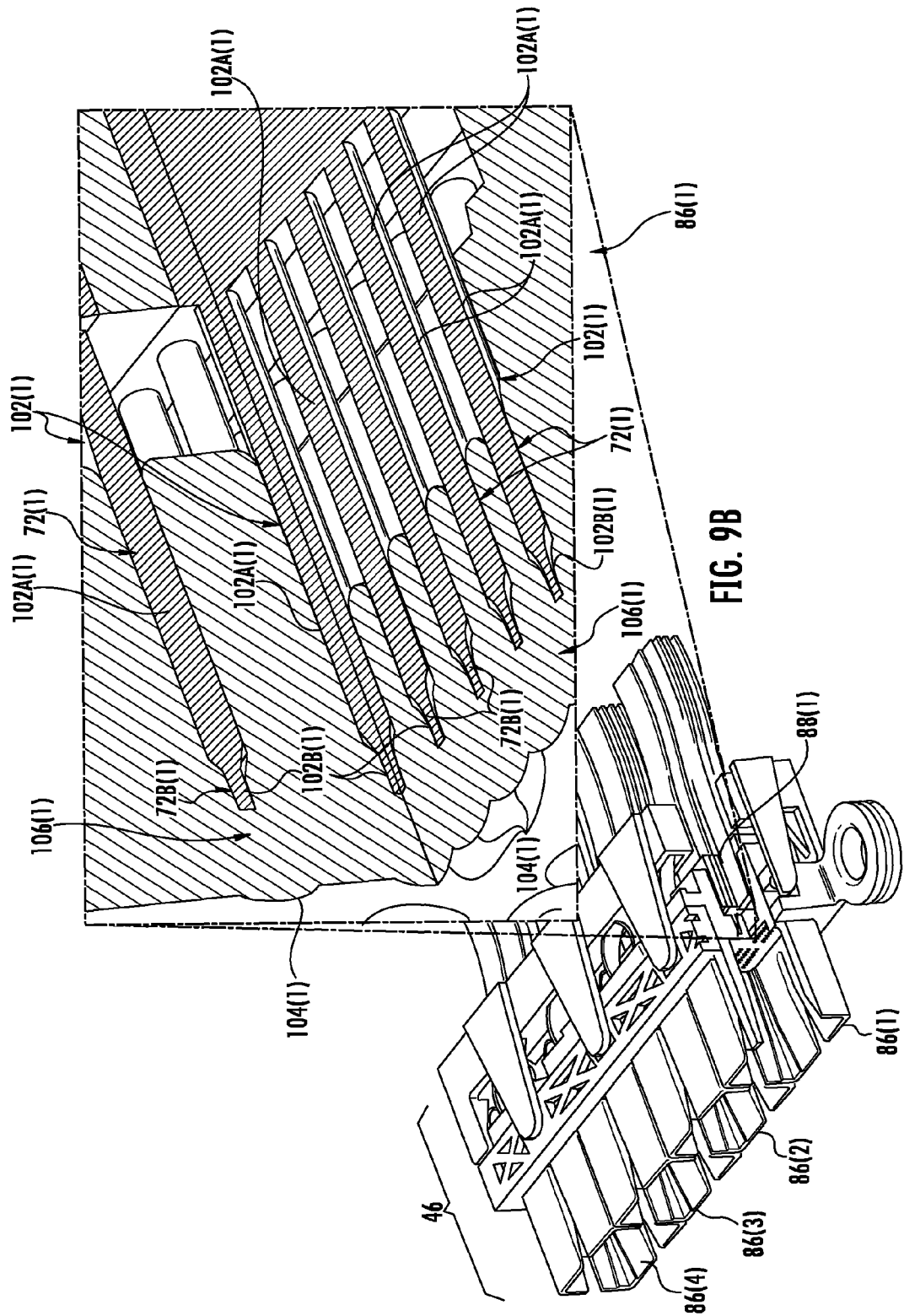
FIG. 9B is a perspective cross-section view of an exemplary dense fiber optic connector assembly supporting blind holes and lenses that may be employed in the blade fiber optic receptacles in FIGS. 5, 6B, and 8.

As illustrated in FIG. 9B, in this embodiment, a fiber optic receptacle sub-carrier is not employed. The fiber optic receptacle body 86(1) in this embodiment is comprised of blind hole lenses 104(1). The blind hole lenses 104(1) are disposed in the fiber optic receptacle body 86(1). The fiber optic receptacle body 86(1) is comprised of a light transmissive material forming blind holes 106(1) that allow light from the optical fibers 72(1) to be transmitted through the light transmissive material and through the blind hole lenses 104(1). The fiber optic receptacle body 86(1) is comprised of internal fiber chambers 102(1), like in FIG. 9A, to support the optical fibers 72(1) and align the optical fibers 72(1) with the blind hole lenses 104(1). The internal fiber chambers 102(1) are comprised of a coated fiber chamber 102A(1) and a bare fiber chamber 102B(1) to securely support the coated portions 72A(1) and bare portions 72B(1) of the optical fibers 72(1) to avoid movement of the optical fibers 72(1) in the fiber optic receptacle body 86(1). Note that although only the fiber optic receptacle body 86(1) is discussed with regard to FIG. 9B, the features of FIG. 9B can be applicable to the other fiber optic receptacle bodies 86(2)-86(4).

As will be described in more detail below with regard to FIGS. 10A-15B, the lenses 70(1)-70(4) can be shuttered. Shuttering allows for the optical fibers 48(1)-48(4) to not be exposed through the lenses 70(1)-70(4) when the backplane fiber optic plugs 44(1)-44(4) are not mated to prevent debris from entering the fiber optic plug bodies 58(1)-58(4) and affecting optical transmissions when the backplane fiber optic plugs 44(1)-44(4) are not mated. When the backplane fiber optic plugs 44(1)-44(4) are mated, the shutter exposes the optical transmission paths to the optical fibers 48(1)-48(4) through the lenses 70(1)-70(4).

Debris entering the fiber optic plug bodies 58(1)-58(4) and entering through the GRIN lens openings 95(1)-95(4) or blind hole lenses 104(1)-104(4), as the case may be, can attenuate optical transmissions. As will be described in more detail below with regard to FIGS. 10A-15B, the GRIN lens openings 95(1)-95(4) or blind hole lenses 104(1)-104(4), as the case may be, can be shuttered. Shuttering for the dense fiber optic connections can be provided in the backplane fiber optic plugs 44(1)-44(4) and the blade fiber optic receptacles 46(1)-46(4) when not mated to prevent debris from entering and affecting optical transmissions. When the backplane fiber optic plugs 44(1)-44(4) and blade fiber optic receptacles 46(1)-46(4) are mated, the shutter can be designed to be actuated to expose the optical transmission paths.

Figure 11A:
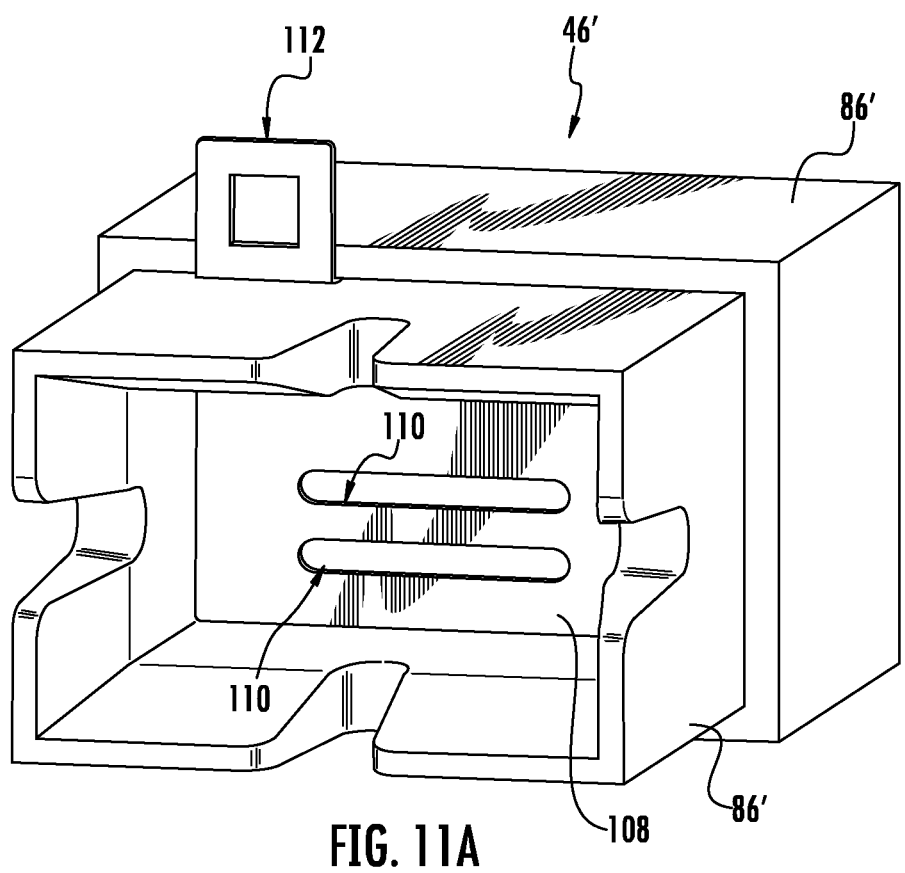
FIGS. 11A and 11B are rear perspective views of another exemplary shuttered fiber optic receptacle that can be employed as the blade fiber optic receptacles in FIGS. 5, 6B, and 8 with the slideable shutter disposed in closed and open positions, respectively.
Figure 11B:
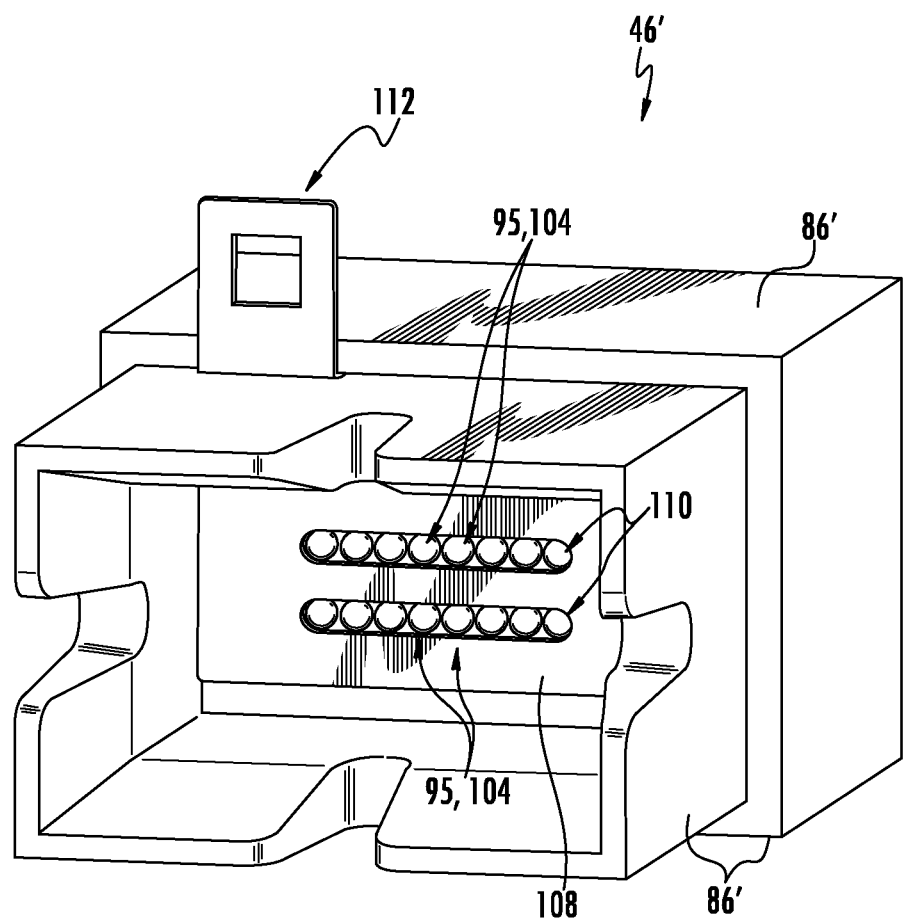
Figure 12A:
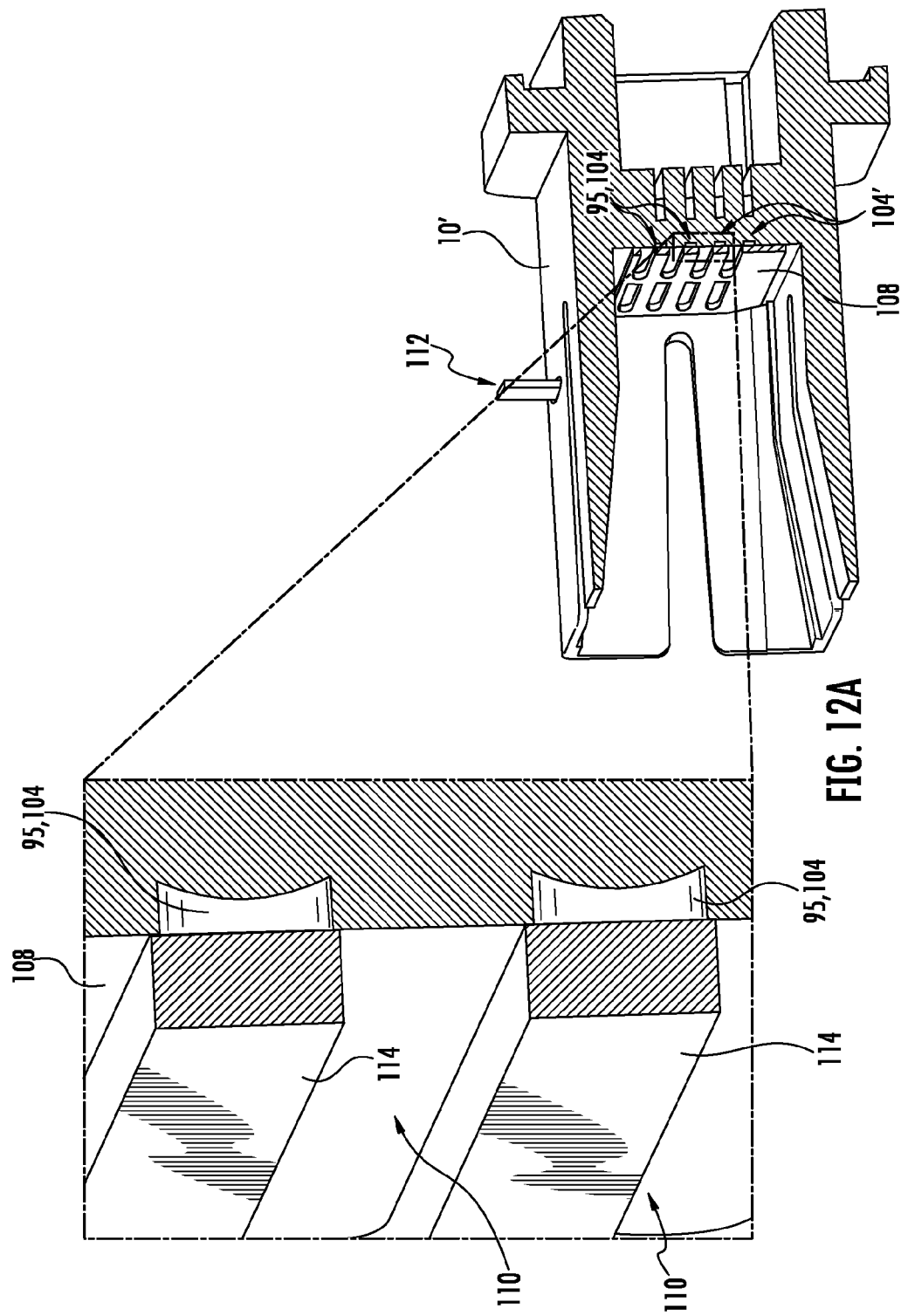

FIGS. 10A and 10B are right side perspective views of shuttered blade fiber optic receptacles 46'(1)-46'(4) that can be employed as the blade fiber optic receptacles 46(1)-46(4) in FIGS. 5, 6B, and 8 with slideable shutters 108(1)-108(4) disposed in open and closed positions, respectively. FIGS. 11A and 11B are rear perspective views of an exemplary shuttered fiber optic receptacle 46' that can be employed as the blade fiber optic receptacles 46(1)-46(4) in FIGS. 5, 6B, and 8 with the slideable shutter 108 disposed in closed and open positions, respectively. FIGS. 12A and 12B are side cross-sectional views of the shuttered fiber optic receptacle housing 86' in FIGS. 11A, and 11B, respectively, illustrating the slideable shutter 108 disposed in closed and open positions, respectively.

With reference to FIGS. 10A-12B, the shuttered fiber optic receptacle body 86' may be a dense fiber optic receptacle housing. The slideable shutter 108 is disposed in the optical transmission paths of the GRIN lens openings 95(1)-95(4) or blind hole lenses 104(1)-104(4), as the case may be, of the fiber optic receptacle body 86'. The slideable shutter 108 has openings 110 configured to be aligned with the GRIN lens openings 95(1)-95(4) or blind hole lenses 104(1)-104(4), as the case may be, in the fiber optic receptacle body 86' in an open position, as illustrated in FIG. 11B. The openings 110 of the slideable shutter 108 is also configured to block access to lenses disposed in the GRIN lens openings 95(1)-95(4) or blind hole lenses 104(1)-104(4), as the case may be, in a closed position, as illustrated in FIG. 11A. As illustrated in FIGS. 11A and 11B, an actuation member 112 is coupled to the slideable shutter 108. The actuation member 112 is configured to move the slideable shutter 108 from the closed position in FIG. 11A to the open position in FIG. 11B. The actuation member 112 may be a linear action actuation member configured to be linearly moved to linearly move the slideable shutter 108. By way of example, the slideable shutter is movable in a plane that is generally perpendicular to the optical axis of the fiber optic connector.

In this embodiment, because high density fiber count is supported by the fiber optic receptacle ferrule 88', a low actuation distance is provided. The slideable shutter 108 can be configured to move at least the distance of the inner diameter of the GRIN lens openings 95(1)-95(4) or blind hole lenses 104(1)-104(4), as the case may be, to achieve dust sealing and/or eye safety. The slideable shutter 108 is planar, thin, and requires little actuation distance. It can be actuated in a linear fashion with no rotation by the actuation member 112, as will be described in more detail below. The slideable shutter 108 can be use in collimated beam paths.

For example, as illustrated in FIG. 12A, when the actuation member 112 is not pressed down as is provided in FIG. 12B, the slideable shutter 108 is not in an open position. Solid sections 114 adjacent the openings 110 in the slideable shutter 108 are aligned with the GRIN lens openings 95(1)-95(4) or blind hole lenses 104(1)-104(4), as the case may be, in a closed position, and thus block light transmission in FIG. 12A. In FIG. 12B, the solid sections 114 of the slideable shutter 108 are offset from the GRIN lens openings 95(1)-95(4) or blind hole lenses 104(1)-104(4), as the case may be, and the openings 110 are aligned with the GRIN lens openings 95(1)-95(4) or blind hole lenses 104(1)-104(4), as the case may be, in an open position, and thus light transmission is not blocked.

Figure 13A:
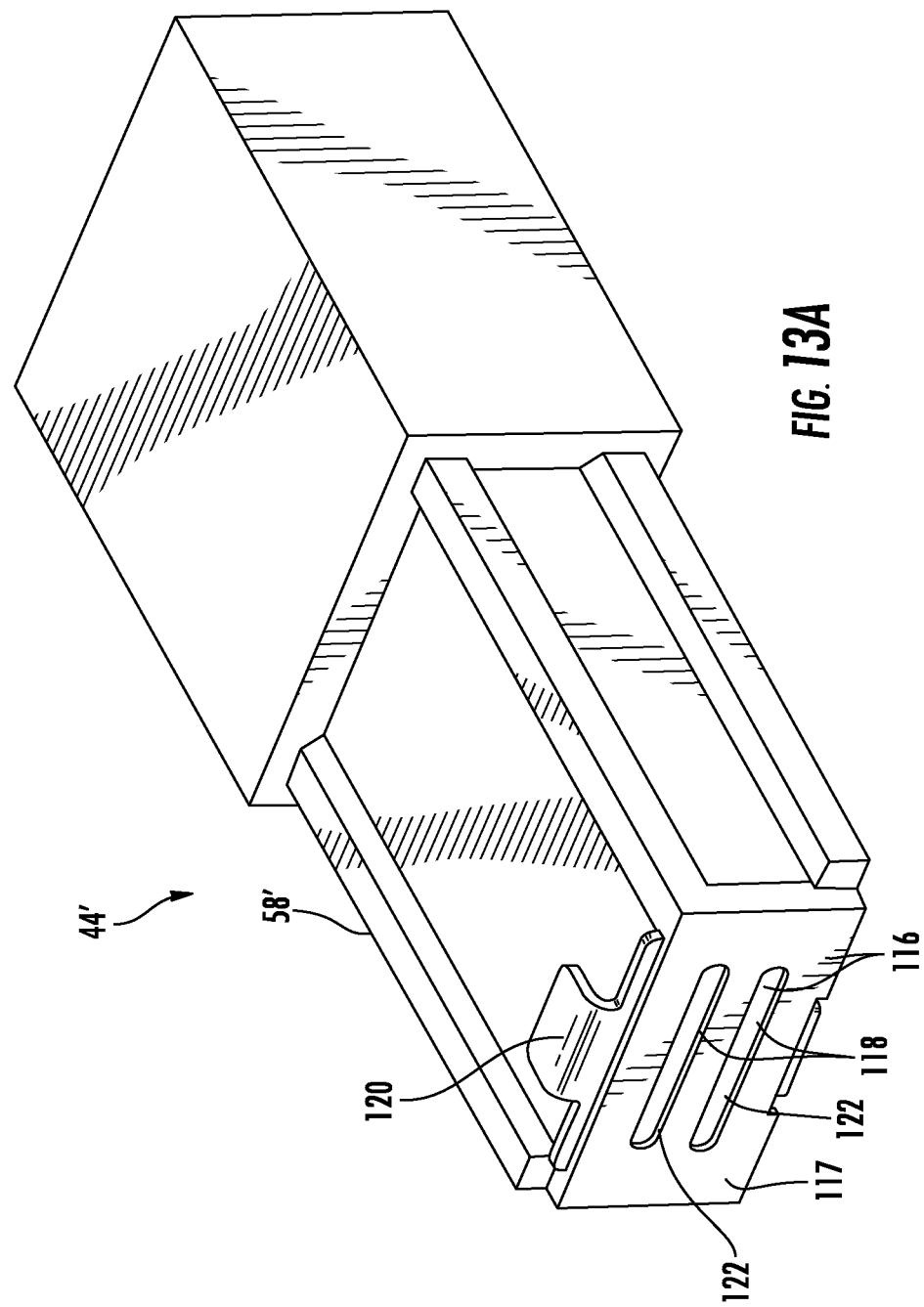
FIG. 13A is a rear perspective view of an exemplary shuttered fiber optic plug that can be employed as the backplane fiber optic plug in FIGS. 5, 6A, and 7 with the slideable shutter disposed in a closed position.
Figure 14:
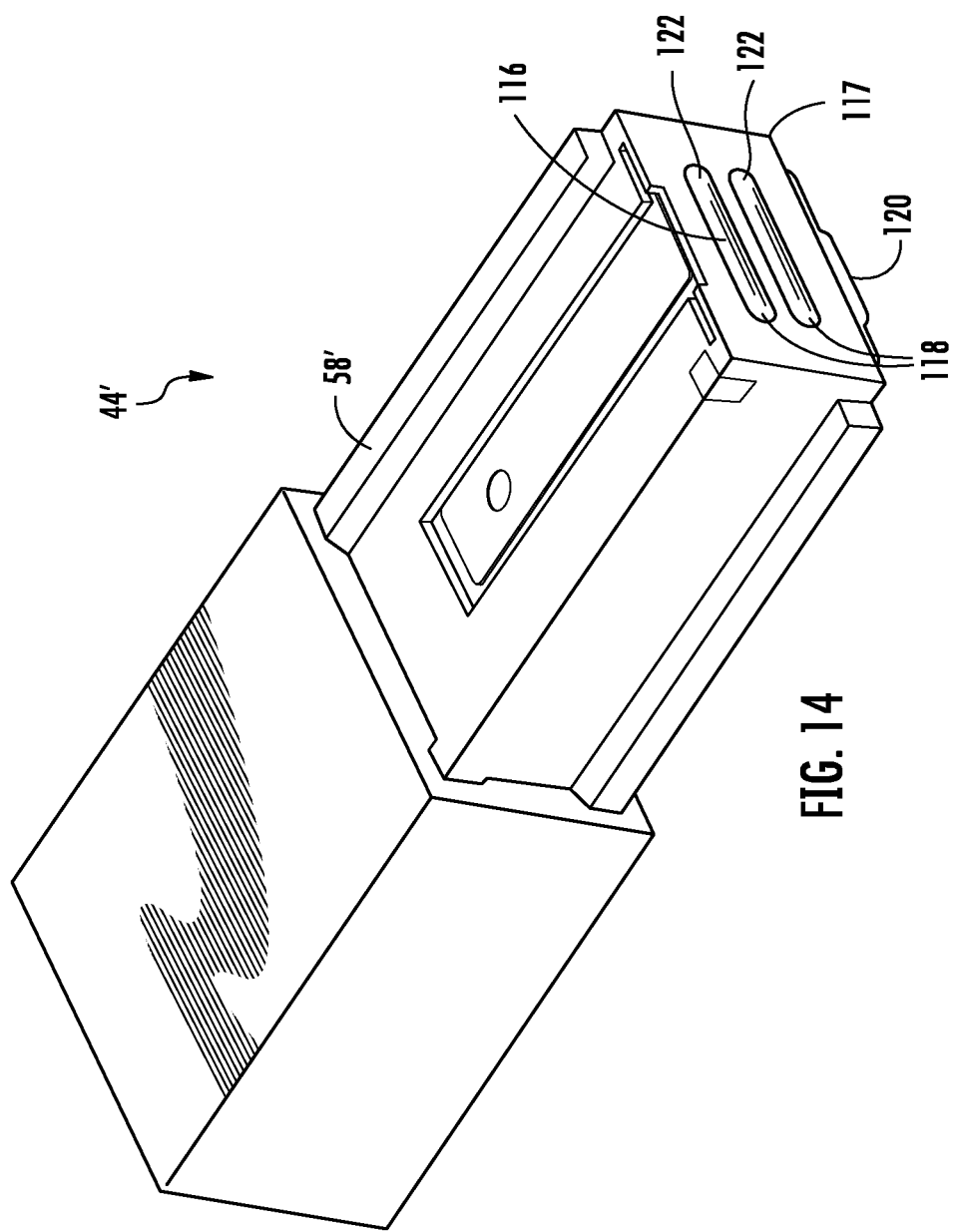
FIG. 14 is a rear perspective view of the shuttered fiber optic plug illustrated in FIG. 13A.

FIGS. 13A and 13B are perspective views of an exemplary shuttered backplane fiber optic plug 44' that can be employed as the backplane fiber optic plug 44 in FIGS. 5, 6A, and 7, with a slideable shutter 116 disposed in a closed and open position, respectively. FIG. 13C is a close-up view of FIG. 13B illustrating the slideable shutter in an open position. The slideable shutter 116 is an optical path of the lenses 70 disposed in the fiber optic plug ferrule 60' (see FIG. 7A). FIG. 14 is a bottom perspective view of the shuttered fiber optic plug 44' illustrated in FIG. 13A. The shuttered backplane fiber optic plug 44' may be a dense backplane fiber optic plug. The slideable shutter 116 has openings 118 configured to be aligned with the lenses 70 in the fiber optic plug ferrule 60 in an open position, as illustrated in FIGS. 13B and 13C. The slideable shutter 116 in this embodiment is protected behind a face plate 117 that is configured with openings 119 having the same geometry as openings 118, but the face plate 117 is optional. The openings 118 of the slideable shutter 116 are also configured to block access to the lenses 70 in a closed position, as illustrated in FIG. 13A. As illustrated in FIGS. 13A-13C, an actuation member 120 is coupled to the slideable shutter 116. The actuation member 120 is configured to move the slideable shutter 116 from the closed position in FIG. 13A to the open position in FIGS. 13B and 13C.

For example, as illustrated in FIG. 13A, when the actuation member 120 is not pressed down as is provided in FIGS. 13B and 13C, the slideable shutter 116 is not in an open position. Solid sections 122 adjacent the openings 118 in the slideable shutter 116 are aligned with the lenses 70 in a closed position, and thus block light transmission in FIGS. 13A and 14. In FIGS. 13B and 13C, the solid sections 122 of the slideable shutter 116 are offset from the GRIN lens openings 95(1)-95(4) or blind hole lenses 104(1)-104(4), as the case may be, and the openings 118 are aligned with the lenses 70 in an open position, and thus light transmission is not blocked.

FIG. 15A is a side perspective view of the shuttered fiber optic receptacle body 86' in FIGS. 11A and 11B with the actuation members 112, 120 unactuated to place the slideable shutters 108, 116 in closed positions before the shuttered fiber optic receptacle body 86' receipt of the fiber optic plug body 58' in FIGS. 13A-14. FIG. 15B is a side perspective view of the shuttered fiber optic receptacle body 86' in FIGS. 11A and 11B with the actuation members 112, 120 actuated to place the slideable shutters 108, 116 in open positions as the shuttered fiber optic receptacle body 86' receives and is mated with the fiber optic plug body 58' in FIGS. 13A-14.

With continuing reference to FIGS. 15A and 15B, the fiber optic plug body 58' contains a mating actuation member 124. The mating actuation member 124 is comprised of a mount 126 supporting an actuation arm 128. The actuation arm 128 is configured to engage the fiber optic receptacle actuation member 112 when the fiber optic plug body 58' is received by the fiber optic receptacle body 86'. The actuation arm 128 contains a protrusion 130 disposed on a distal end 132 of the actuation arm 128. As the fiber optic plug body 58' is received in the blade fiber optic receptacle 46', an end portion 134 of the actuation arm 128 is disposed in an engagement orifice 136 wherein the protrusion 130 will cause a lifting force to be disposed in the engagement orifice 136 to move the slideable shutter 108 in the blade fiber optic receptacle 46' from a closed to an open position. As the backplane fiber optic plug 44' penetrates the blade fiber optic receptacle 46', the actuation member 120 is indexed to open the slideable shutter 116 disposed in the backplane fiber optic plug 44' to an open position.

Other embodiments of dense fiber optic connector assemblies and related connectors and fiber optic cables suitable for establishing optical connections for optical backplanes in equipment racks are possible and disclosed herein. In this regard, FIG. 16A illustrates rack module housing 26 with information processing modules 24 disposed therein. FIG. 16B is a perspective view of the information processing modules 24 with the rack module housing 26 removed. As illustrated in FIG. 16B, another exemplary dense fiber optic connector assembly 131 is illustrated and provided to facilitate direct optical connections to the information processing modules 24 through the optical backplane extension module 28 illustrated previously in FIGS. 2A-3. As non-limiting examples, the dense fiber optic connector assembly 131 in FIG. 16B can support sixty-four (64), one-hundred and twenty-eight (128), or two hundred fifty six (256) optical fibers or more to provide sixty-four (64), one-hundred and twenty-eight (128), two-hundred and fifty-six (256) or more fiber optic connections, respectively.

Figure 17A:
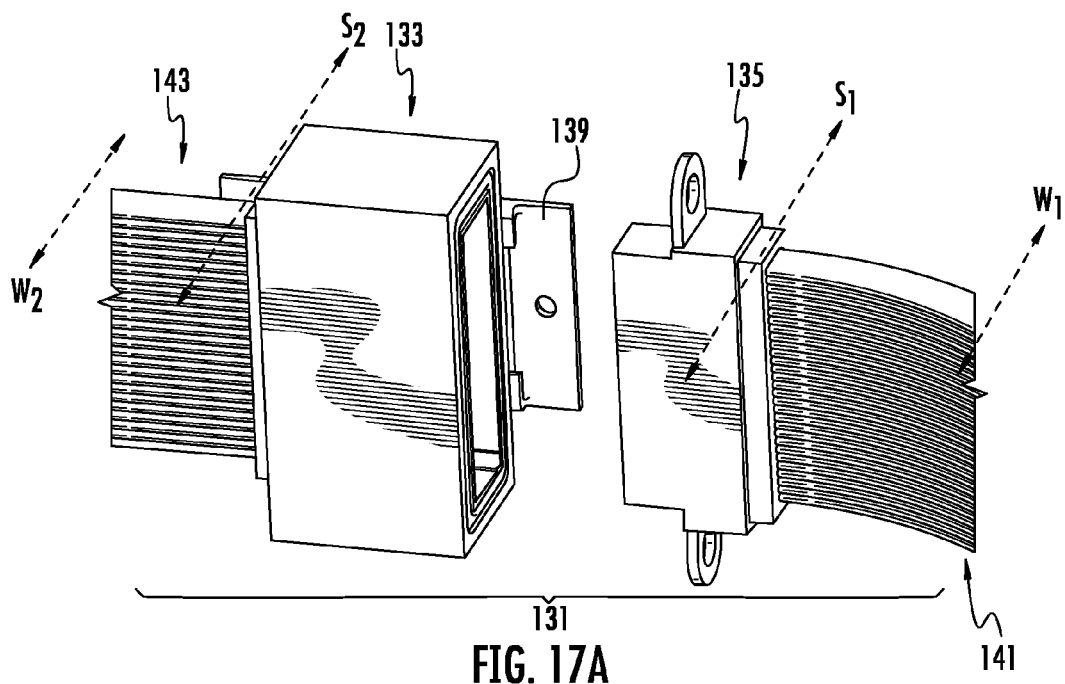
FIG. 17A is a side perspective view of the dense fiber optic connector assembly in FIG. 16B comprising a blade fiber optic plug configured to receive a backplane fiber optic plug.
Figure 17B:
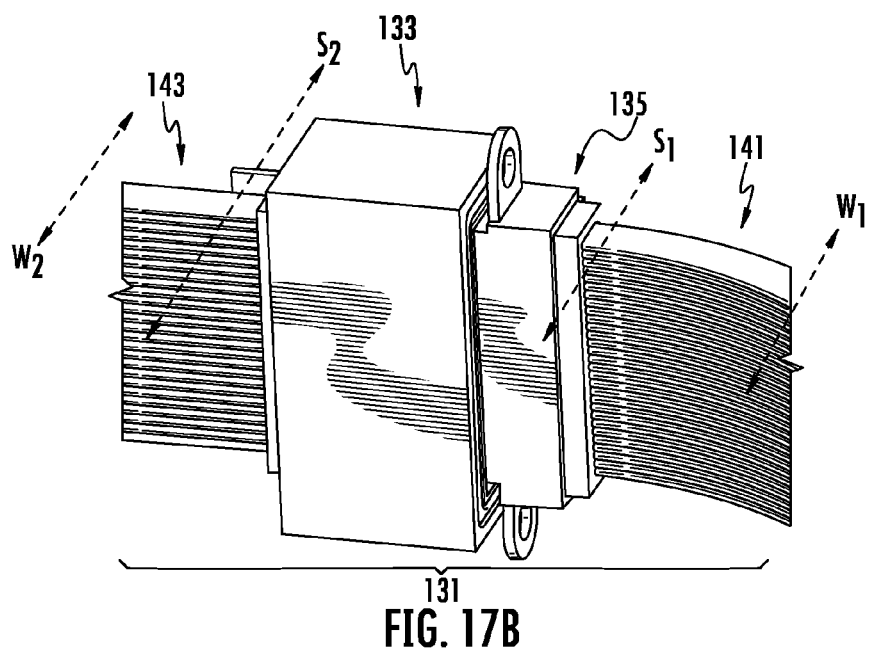
FIG. 17B is a side perspective view of the dense fiber optic connector assembly in FIG. 16B with the blade fiber optic plug receiving the backplane fiber optic plug.

FIG. 17A is a side perspective view of the dense fiber optic connector assembly 131 in FIG. 16B comprising a blade fiber optic receptacle 133 configured to receive a backplane fiber optic plug 135. FIG. 17B is a side perspective view of the dense fiber optic connector assembly 133 in FIG. 16B with the blade fiber optic receptacle 133 receiving the backplane fiber optic plug 135 to establish an optical connection between information processing modules 24 and the optical backplane extension module 28 illustrated previously in FIGS. 2A-3.

With continuing reference to FIGS. 16B-17B, the fiber optic connector assembly 131 is comprised of one or more the backplane fiber optic plugs 135 configured to be disposed through the rear side 38 of the extension module housing 35 (see FIG. 3). As illustrated in FIG. 17A, the backplane fiber optic plug 135 is configured to receive a plurality of fiber optic cables 138 or optical fibers. In this embodiment, the fiber optic cables 138 are ribbon cables that are stacked on top of each other with their wide axis $W_1$ disposed along the short axis $S_1$ of the backplane fiber optic plug 135. This arrangement allows the backplane fiber optic plug 135 to support a high fiber count and thus provide a dense backplane fiber optic plug 135.

With continuing reference to FIGS. 16B-17B, the fiber optic connector assembly 131 also comprises one or more blade fiber optic receptacles 133 mounted on the information processing modules 24. The blade fiber optic receptacles 133 are connected to components in the information processing modules 24 to facilitate transfer of data from these components. As illustrated in FIG. 17A, the blade fiber optic receptacle 133 is configured to receive a plurality of fiber optic cables 143 or optical fibers that may be ribbonized. In this embodiment, the fiber optic cables 143 are ribbon cables that are stacked on top of each other with their wide axis $W_2$ disposed along the short axis $S_2$ of the blade fiber optic receptacle 135. This arrangement allows the blade fiber optic receptacle 135 to support a high fiber count and thus provide a dense blade fiber optic receptacle 135.

When the backplane fiber optic plugs 135 are mated to the blade fiber optic receptacles 133, optical connections are established to the information processing modules 24. These optical connections can be routed through the fiber optic cables 32 connected to the backplane fiber optic plugs 135 (see FIG. 3) to other information processing modules 24 through intraconnections in the optical backplane extension module 28 and/or interconnections through the optical interconnection ports 40 (see FIG. 3). The blade fiber optic receptacle 133 include a mounting structure 139 that may be spring loaded to allow the blade fiber optic receptacles 133 to move when mounted on information processing modules 24 to assist in axis alignment and connection to the backplane fiber optic plug 135.

Figure 18A:
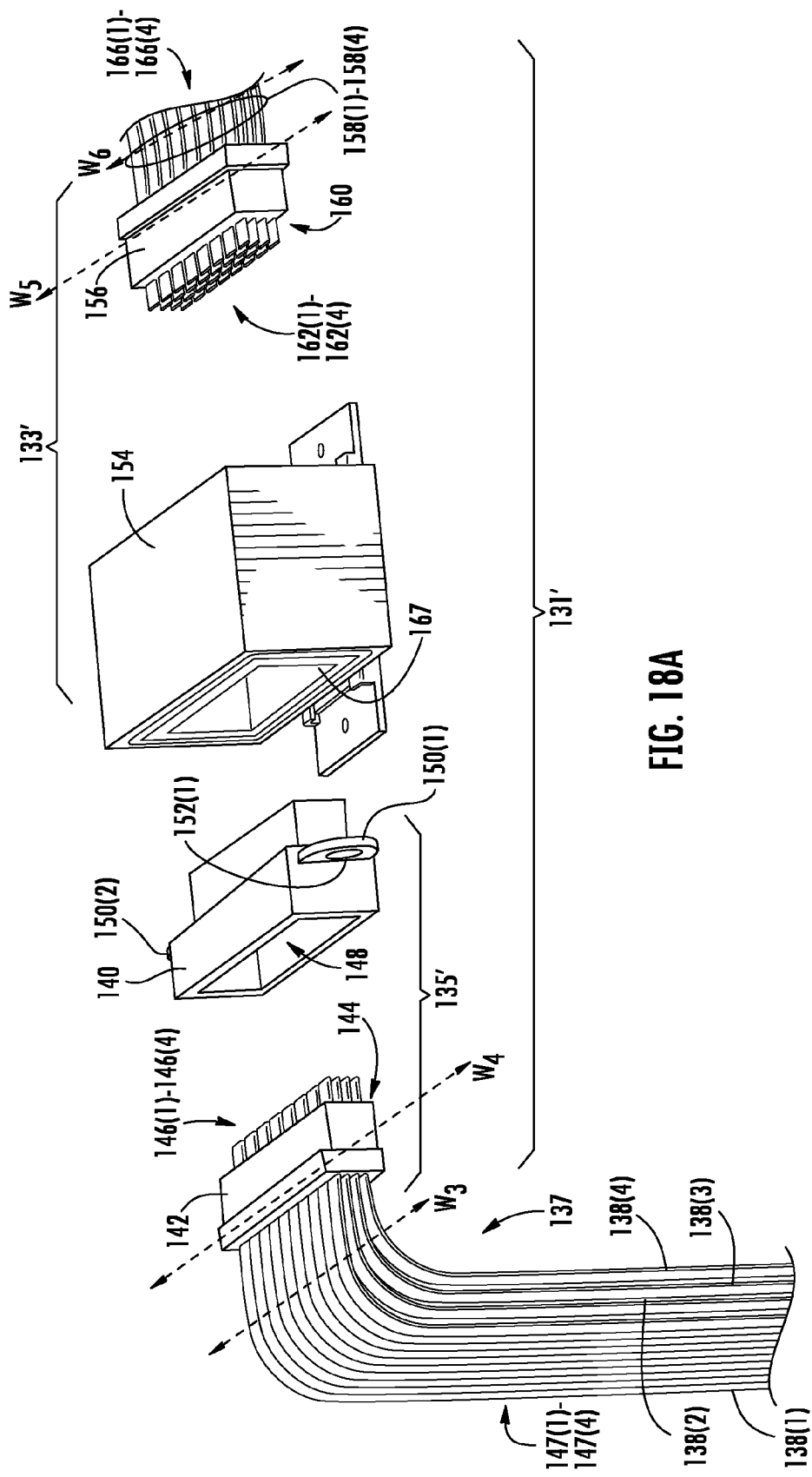
FIG. 18A is a side perspective, exploded view of another exemplary blade fiber optic receptacle and backplane fiber optic plug of a dense fiber optic connector assembly.
Figure 18B:
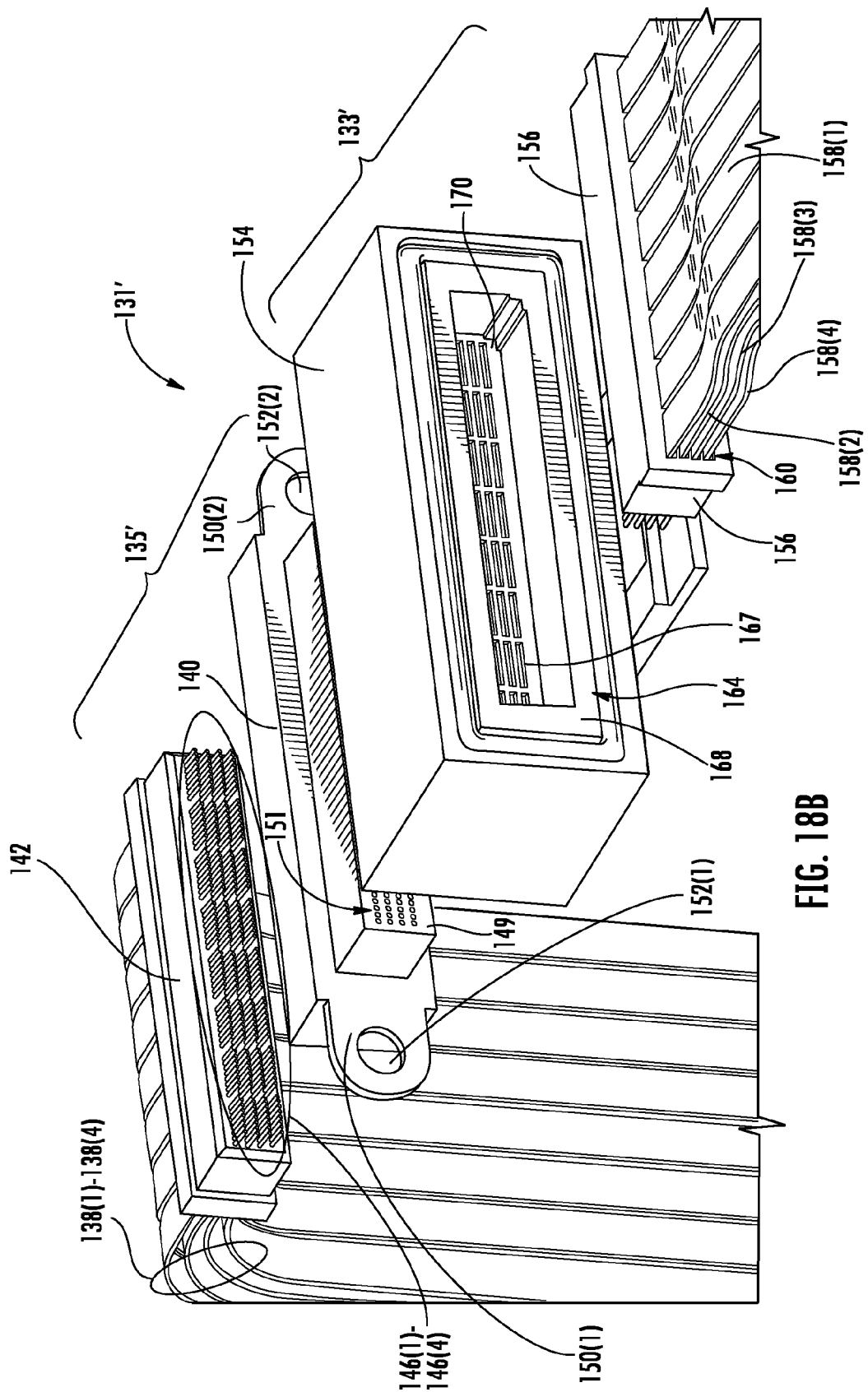
FIG. 18B is another close-up perspective, exploded view of the blade fiber optic receptacle and backplane fiber optic plug of the dense fiber optic connector assembly in FIG. 18A.
Figure 19:
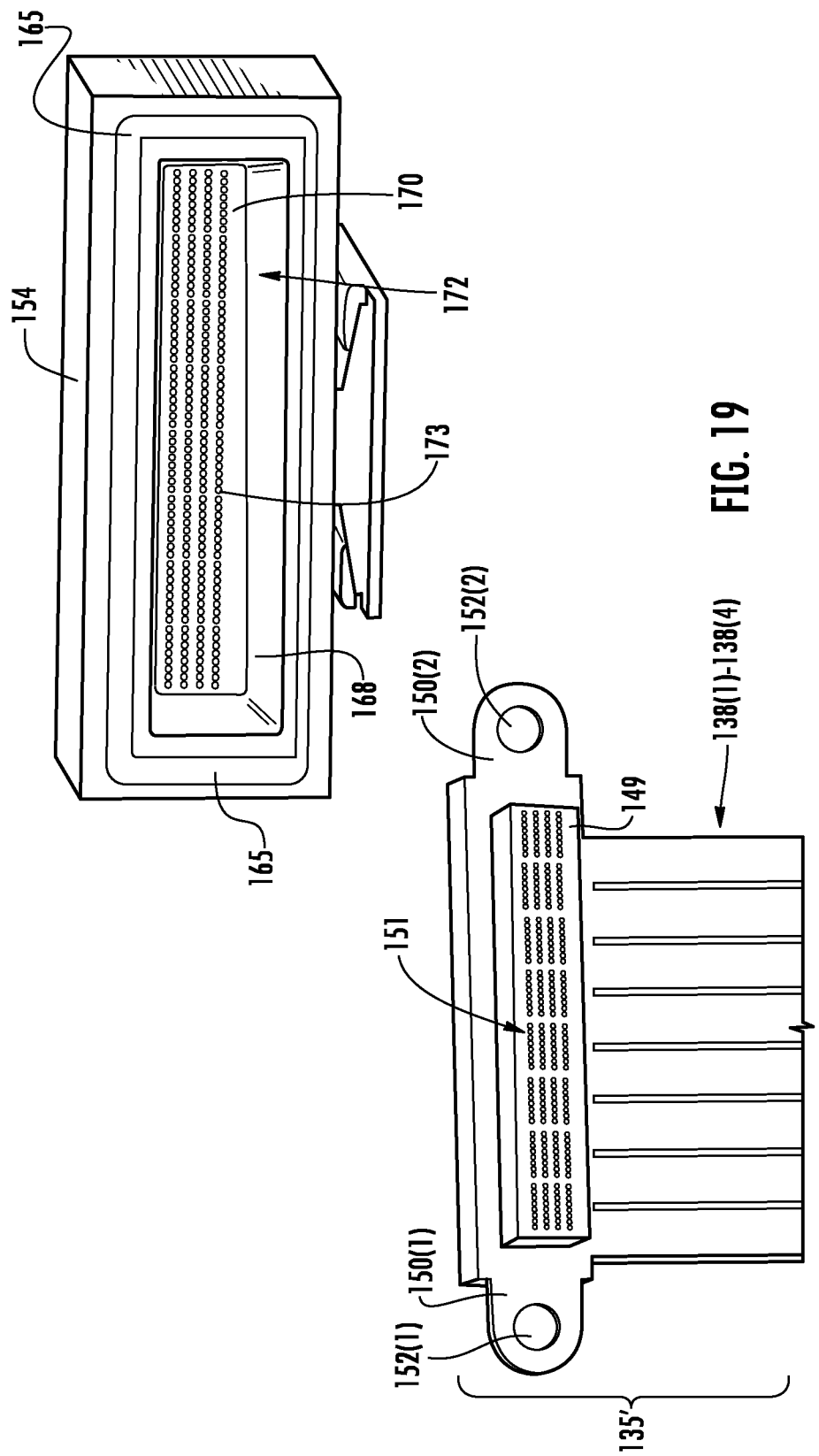
FIG. 19 is another close-up view of the blade fiber optic receptacle and backplane fiber optic plug of the dense fiber optic connector assembly in FIGS. 18A and 18B.

Another exemplary dense fiber optic connector assembly 131' is illustrated in FIGS. 18A-19B. FIG. 18A is a side perspective, exploded view of a blade fiber optic receptacle 133' and backplane fiber optic plug 135' of a dense fiber optic connector assembly 131'. FIG. 18B is another close-up perspective, exploded view of the blade fiber optic receptacle 133' and backplane fiber optic plug 135' of the dense fiber optic connector assembly 131' in FIG. 18A. FIG. 19 is another close-up view of the blade fiber optic receptacle 133' and backplane fiber optic plug 135' of the dense fiber optic connector assembly 131' in FIGS. 18A and 18B. The dense fiber optic connector assembly 131' in FIGS. 18A-19 is similar to the dense fiber optic connector assembly 131 in FIGS. 16B-17B. However, as will be discussed below in more detail, the dense fiber optic connector assembly 131' in FIGS. 18A-19 includes organizer ferrules that allow wider, higher fiber count, ribbonized fiber optic cables to be stacked and organized along their wide axis to be supported in the blade fiber optic receptacle 133' and the backplane fiber optic plug 135' to support a dense fiber count.

With reference to FIGS. 18A and 18B, the backplane fiber optic plug 135' supports up to two-hundred and fifty-six (256) or more optical fibers 137 in a single connector form factor. As will be described in more detailed below, the backplane fiber optic plug 135' is configured to support multiple stacked fiber optic cables 138(1)-138(4) or optical fibers for providing a high optical fiber count in the backplane fiber optic plug 135'. In this embodiment, the fiber optic cables 138(1)-138(4)

are each comprised of a plurality of ribbonized fiber optic cables. As illustrated in FIG. 18A, the fiber optic cables 138(1)-138(4) are stacked along their wide axis $W_3$. Providing a backplane fiber optic plug 135' that is configured to receive ribbonized fiber optic cables is one method of allowing the backplane fiber optic plug 135' to support high density optical fiber count since ribbonized fiber optic cables are flat and efficient in terms of optical fiber count versus space. Further in this embodiment, each of the fiber optic cables 138(1)-138(4) are each comprised of a plurality of ribbonized cables which allows flexibility in providing intraconnections and interconnections facilitated by the optical backplane extension module 28 (see FIG. 3). Each fiber optic cable 138(1)-138(4) does not have to be intraconnected or interconnected to the same fiber optic connector depending on the design.

With continuing reference to FIGS. 18A and 18B, the backplane fiber optic plug 135' is comprised of a fiber optic plug body 140. The fiber optic plug body 140 may be a ferrule body. The fiber optic plug body 140 is configured to receive an organizer ferrule 142 that receives the fiber optic cables 138 (1)-138(4) in an opening 144 disposed in the organizer ferrule 142. The organizer ferrule 142 is particularly well suited to facilitate ribbonization and insure that optical fibers engage the connector body 154 in an array structure. In this manner, the organizer ferrule 142 disposes end portions 146(1)-146(4) of the fiber optic cables 138(1)-138(4) in a compacted high density to be disposed in an opening 148 in the fiber optic plug body 140. The organizer ferrule 142 also facilitates pre-insertion laser processing of massed optical fibers exposed from the fiber optic cables 138(1)-138(4) for laser processing, including, without limitation, using the laser processing examples discussed above. In this embodiment, the fiber optic cables 138(1)-138(4) are disposed in the organizer ferrule 142 along the wide axis $W_4$ of the ferrule organizer 142. An adhesive may be provided to secure the organizer ferrule 142 in the fiber optic plug body 140 during assembly. The fiber optic plug body 140 and organizer ferrule 142 may be comprised of a plastic member that is molded or stamped, as examples. As illustrated in FIGS. 18B and 19, the fiber optic plug body 140 has an end face 149 that has a plurality of lenses 151 disposed therein to provide an optical transmission path to the end portions 146(1)-146(4) of optical fibers 147 (1)-147(4) exposed from the fiber optic cables 138(1)-138(4).

With continuing reference to FIGS. 18A-19, the fiber optic plug body 140 also contains two tabs 150(1), 150(2) extending from the fiber optic plug body 140 for mounting the backplane fiber optic plug 135' to the rear side 38 of the extension module housing 35 (see FIG. 3). Each mounting tab 150(1), 150(2) contains an opening 152(1), 152(2) (FIG. 18B) that is configured to receive a fastener to secure the backplane connector frame 50 with the backplane fiber optic plugs 44(1)-44(4) to the extension module housing 35 (see FIG. 3) to form an optical backplane for connection to the blade fiber optic receptacles 46(1)-46(4).

FIGS. 18A and 18B illustrate details regarding the components of the blade fiber optic receptacle 133'. The blade fiber optic receptacle 133' includes a fiber optic receptacle body 154 and an organizer ferrule 156. The fiber optic receptacle body 154 is configured to receive the organizer ferrule 156, which then receives fiber optic cables 158(1)-158(4) from the information processing module 24 in an opening 160 disposed in the organizer ferrule 156. In this manner, the organizer ferrule 156 disposes end portions 162(1)-162(4) of the fiber optic cables 158(1)-158(4) in a compacted high density to form to be disposed in an opening 164 (FIG. 18B) in the fiber optic receptacle body 154. As illustrated in FIG. 18A, in this embodiment, the wide axis $W_5$ of the fiber optic cables 138(1)-138(4) are disposed in the organizer ferrule 142 along the wide axis $W_6$ of the ferrule organizer 142. An adhesive may be provided to secure the organizer ferrule 156 in the fiber optic receptacle body 154 during assembly. A soft elastomer 165 may be disposed in the fiber optic receptacle body 154 as illustrated in FIG. 19 to enable small movements of the organizer ferrule 156 in the connection direction axis. The fiber optic receptacle body 154 and organizer ferrule 156 may be comprised of a plastic member that is molded or stamped, as examples.

As illustrated in FIG. 18B, the fiber optic receptacle body 154 has an end face 167 disposed in a lens block 168 that has a plurality of lenses 170 disposed therein to provide an optical transmission path to end portions 162(1)-162(4) of the optical fibers 166(1)-166(4) (FIG. 18A) exposed from the fiber optic cables 158(1)-158(4). As illustrated in FIG. 19, the lens block 168 also has a plurality of lenses 172 disposed on an end face 173 of the fiber optic plug body 140 side of the fiber optic receptacle body 154 that are configured to be aligned with the end portions 146(1)-146(1) of the fiber optic cables 138(1)-138(4). In this manner, the lens block 168 is configured to provide a transmission path between the lenses 170, 172 to optically connect the end portions 146(1)-146(4) of the optical fibers 147(1)-147(1) disposed in the backplane fiber optic plug 135' to the end portions 162(1)-162(4) of the optical fibers 166(1)-166(4) disposed in the blade fiber optic receptacle 133'.

Figure 20A:
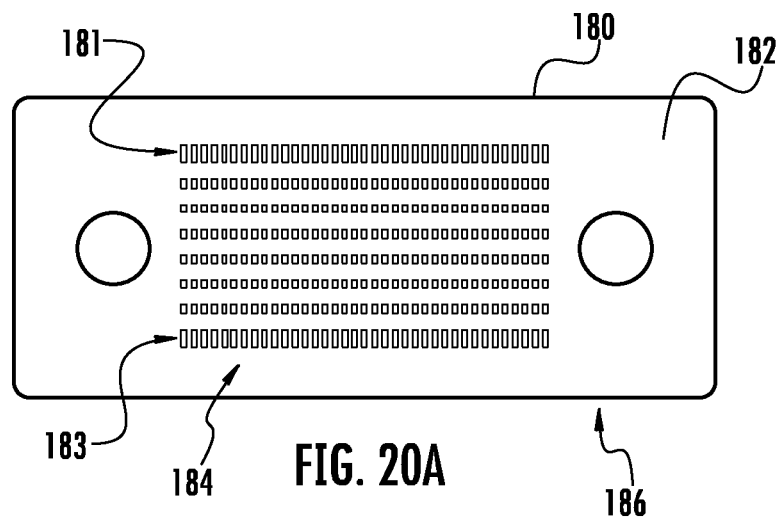
FIGS. 20A and 20B are front and rear views, respectively, of an exemplary molded fiber optic plug body that may be employed in a dense fiber optic connector assembly.
Figure 20B:
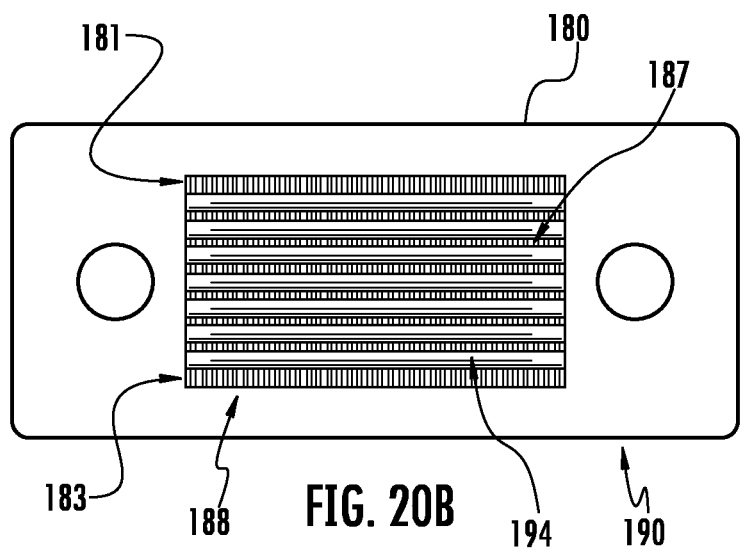
Figure 21A:
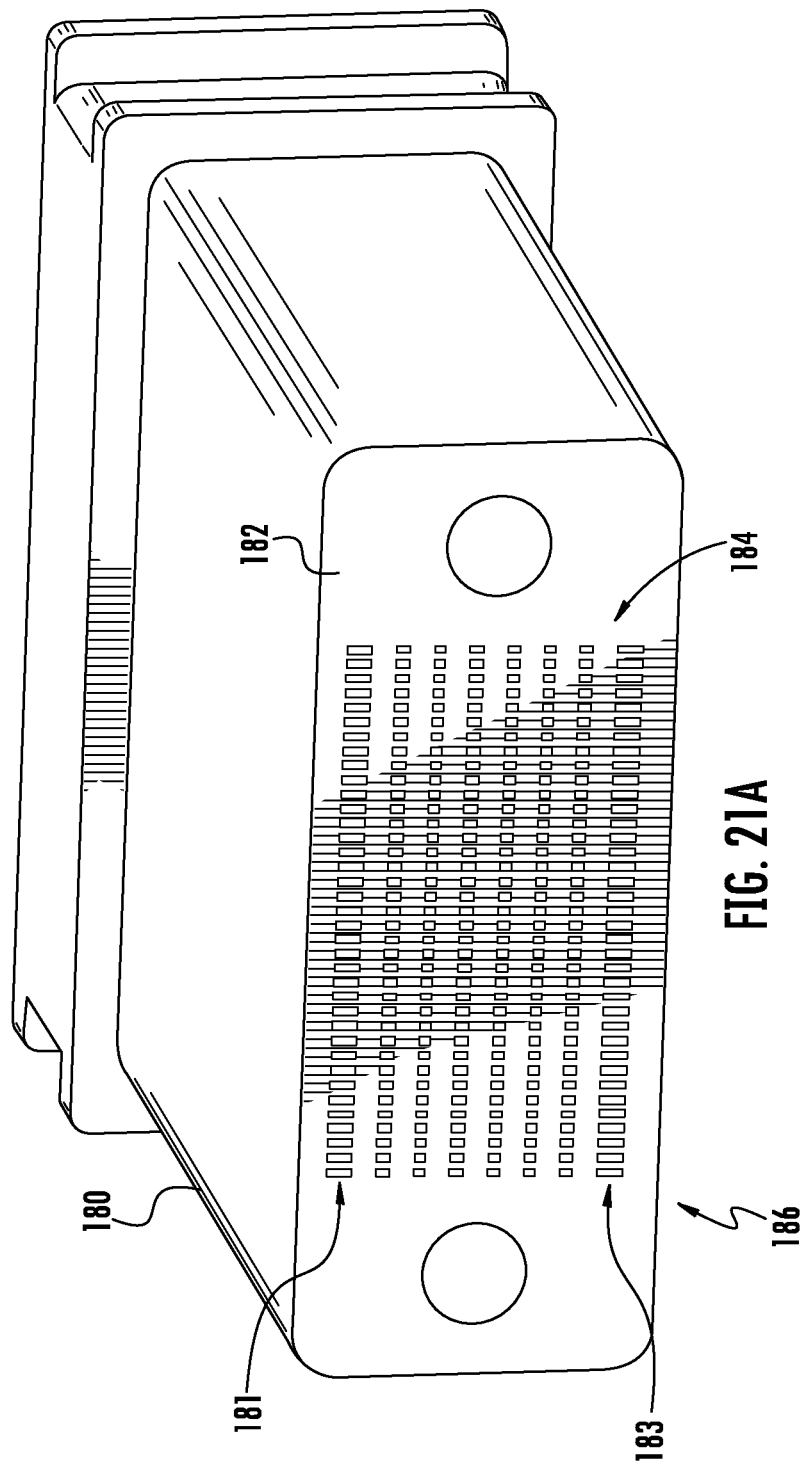
FIGS. 21A and 21B are front and rear perspective views, respectively, of the molded fiber optic plug body in FIGS. 20A and 20B, respectively.
Figure 21B:
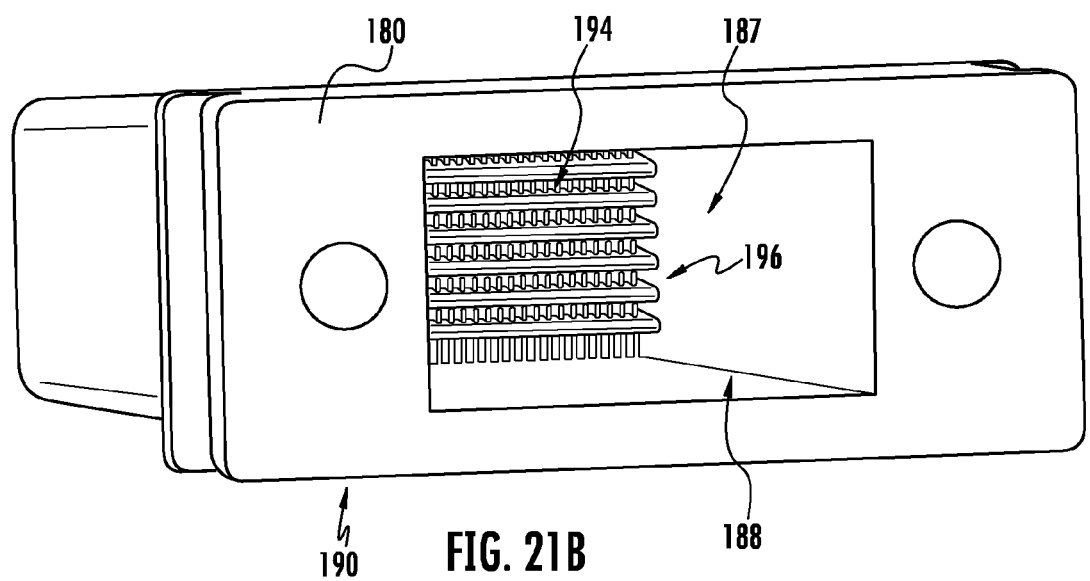

To provide the dense fiber optic connector disclosed herein, the dense fiber optic connectors may be molded. In this regard, FIGS. 20A and 20B are front and rear views, respectively, of an exemplary molded fiber optic plug body 180 that may be employed in a dense fiber optic connector assembly. FIGS. 21A and 21B are front and rear perspective views, respectively, of the molded fiber optic plug body 180 in FIGS. 20A and 20B. The molded fiber optic plug body 180 may be employed either as a blade fiber optic connector or a backplane fiber optic connector.

As illustrated in FIGS. 20A and 21A, the molded fiber optic plug body 180 has an end face 182 that includes fiber openings 184 disposed at a first end 186 to provide optical transmission paths to end portions of optical fibers disposed in the molded fiber optic plug body 180. The fiber openings 184 may be formed by curvatures formed in the end face 182 of the molded fiber optic plug body 180 wherein the molded fiber optic plug body 180 is formed from transmissive material having molded-in lenses, as previously described. Alternatively, the fiber openings 184 may receive GRIN lenses disposed in the molded fiber optic plug body 180 and end portions of the GRIN lenses disposed through the openings, as previously described. The top row 181 and the bottom row 183 of fiber openings disposed in the molded fiber optic plug body 180 are provided by the mold in this embodiment for mold robustness only, for example so that another strong material such as steel, can be inserted therein.

Figure 22A:
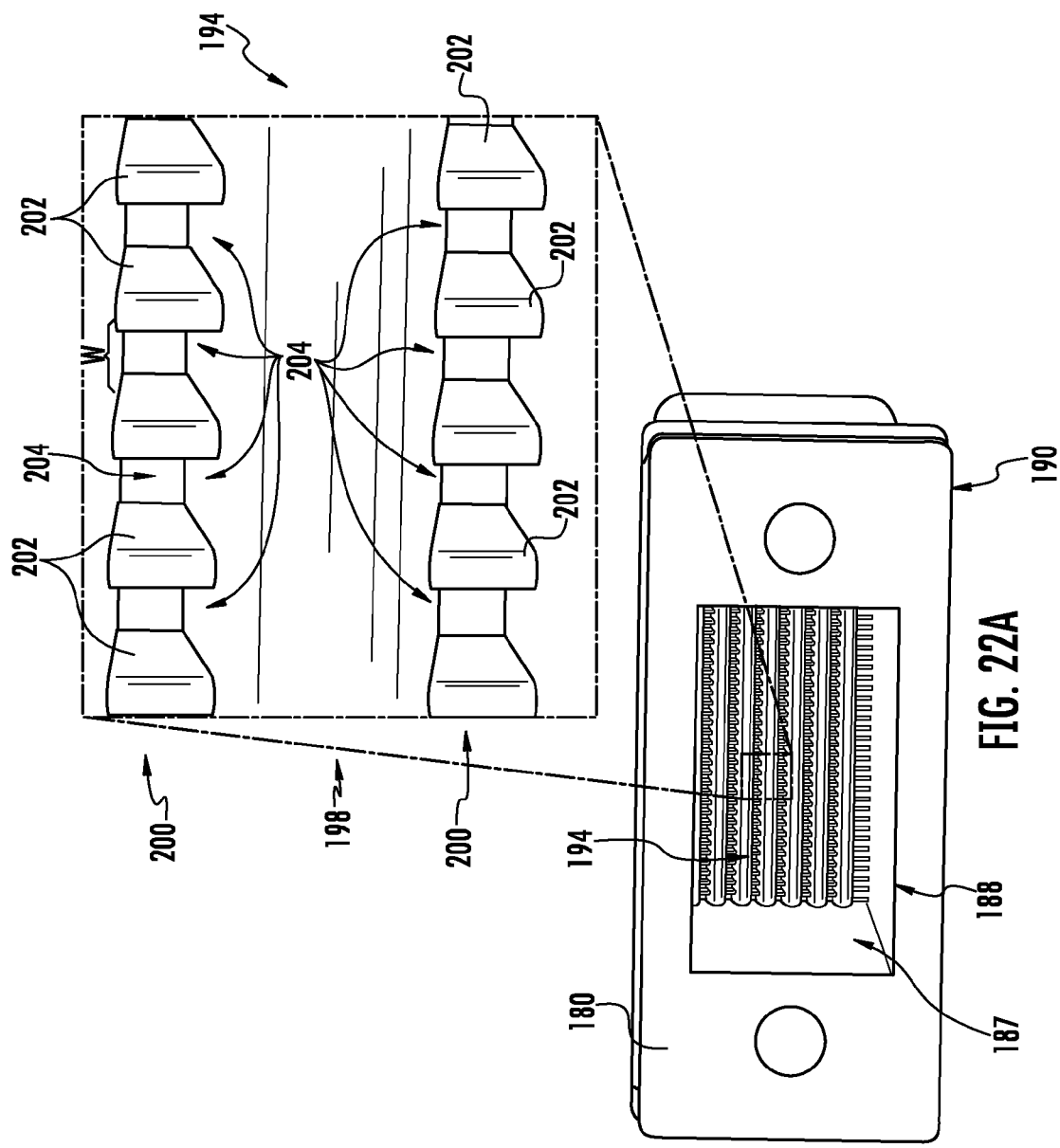
FIG. 22A is a close-up view of the rear perspective view of lead-in detail of the molded fiber optic plug body in FIGS. 20A and 20B.
Figure 22B:
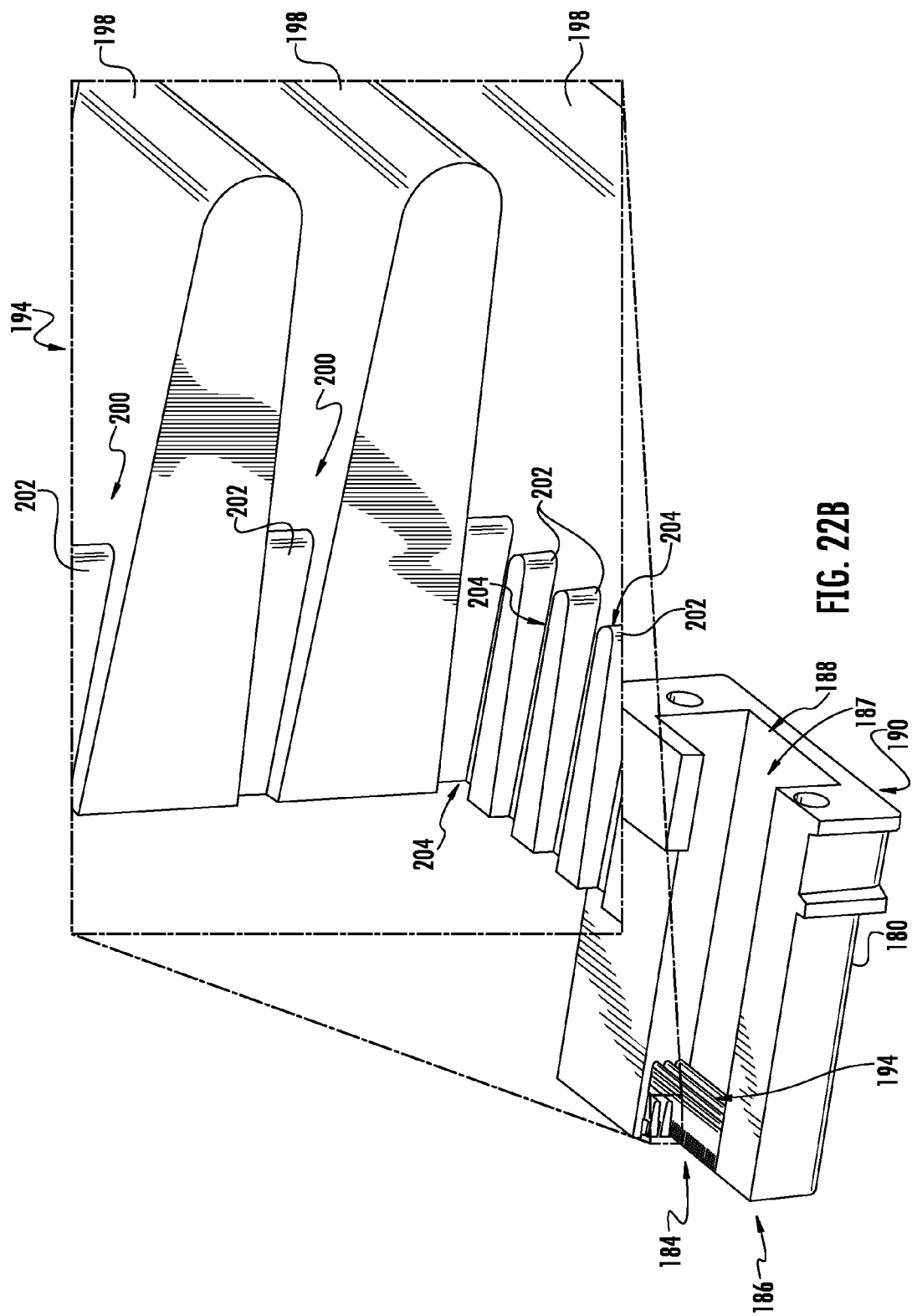
FIG. 22B is a close-up cutaway view of the lead-in detail of the molded fiber optic plug body in FIGS. 20A and 20B.

As illustrated in FIGS. 20B and 21B, an internal chamber 187 forming an opening 188 is molded into fiber optic plug body 180 on a second end 190. The opening 188 is configured to receive an organizer ferrule 192 illustrated in FIGS. 23A-23C and described below. A fiber lead-in structure 194 is disposed in the rear 196 of the internal chamber 187 to receive end portions of optical fibers disposed through the organizer ferrule 192. FIG. 22A is a close-up view of the rear perspective view of fiber lead-in structure 194 as a detail of the molded fiber optic plug body 180. As illustrated therein and in FIG. 22B, the fiber lead-in structure 194 is formed as part of the mold forming the internal chamber 187. The fiber lead-in structure 194 is comprised of row structures 198 with intermediate fiber lead-in areas 200 disposed therebetween. Vertical members 202 are disposed between the row structures 198 and spaced apart by width W to form openings 204 for receiving end portions of optical fibers. The number of row structures 198 and vertical members 202 and the width W between the vertical members 202 determine the number of optical fibers that can be supported by the molded fiber optic plug body 180. As an example, the outer diameter of the intermediate fiber lead-in areas 200 may be fifty (50) micrometers (μm) or more to support a high density of optical fibers in molded fiber optic plug body 180. MT technology or wire EDM may be leveraged to form intermediate fiber lead-in areas 200. The use of wire EDM to form the molded fiber optic plug body 180 can provide the fiber lead-in structure 194. For example, for a target one hundred (100) μm fiber coating, a ten to fifteen (10-15) μm "window" on either side of the square intermediate fiber lead-in areas 200 is available for fiber centering.

Figure 23A:
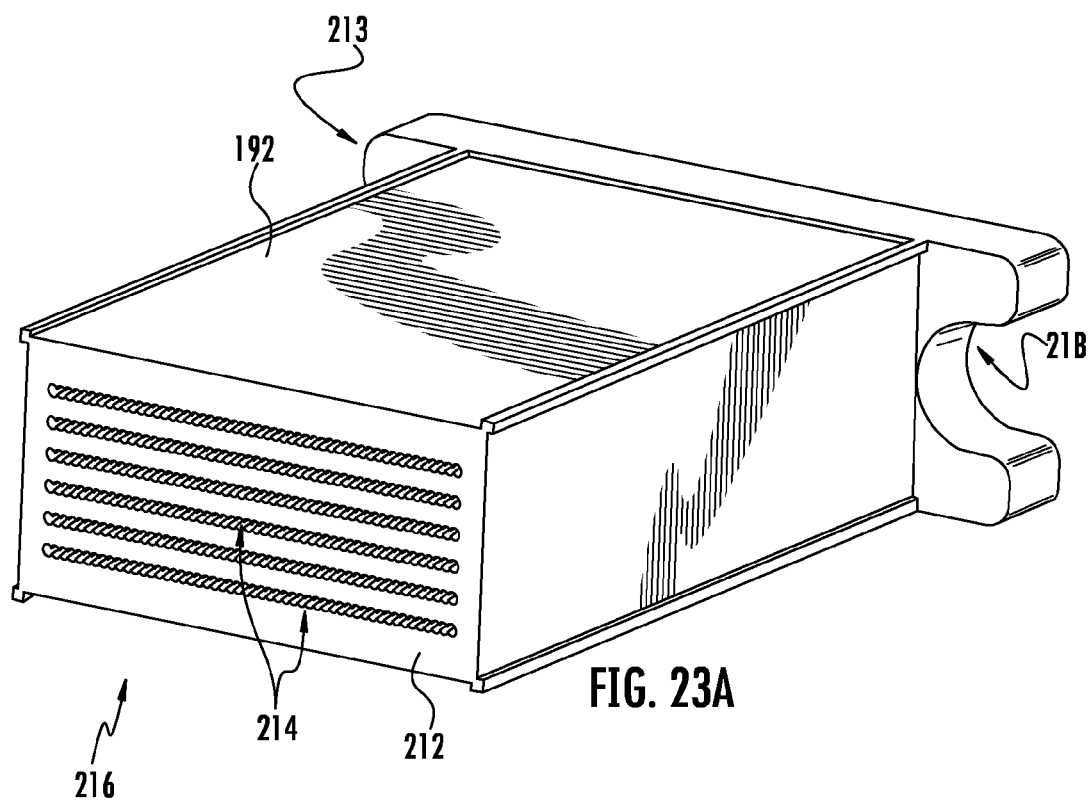
FIG. 23A is a front perspective view of an intermediate organizer ferrule configured to facilitate fiber ribbonization and be disposed in the molded fiber optic plug body in FIGS. 20A and 20B.
Figure 23B:
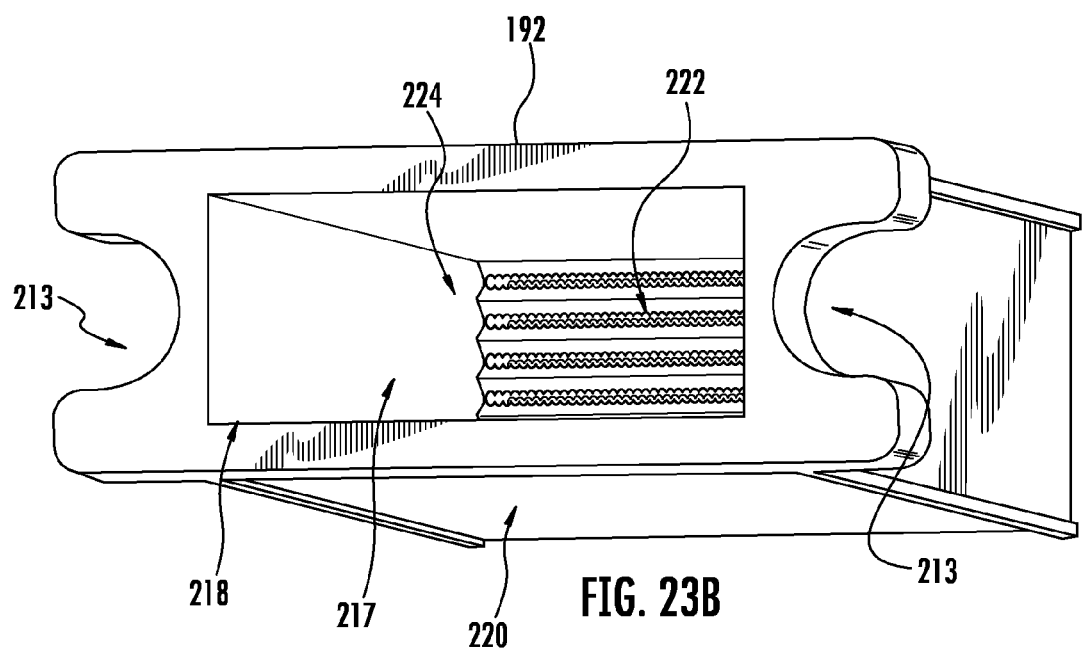
FIG. 23B is a rear perspective view of the organizer ferrule in FIG. 23A.
Figure 23C:
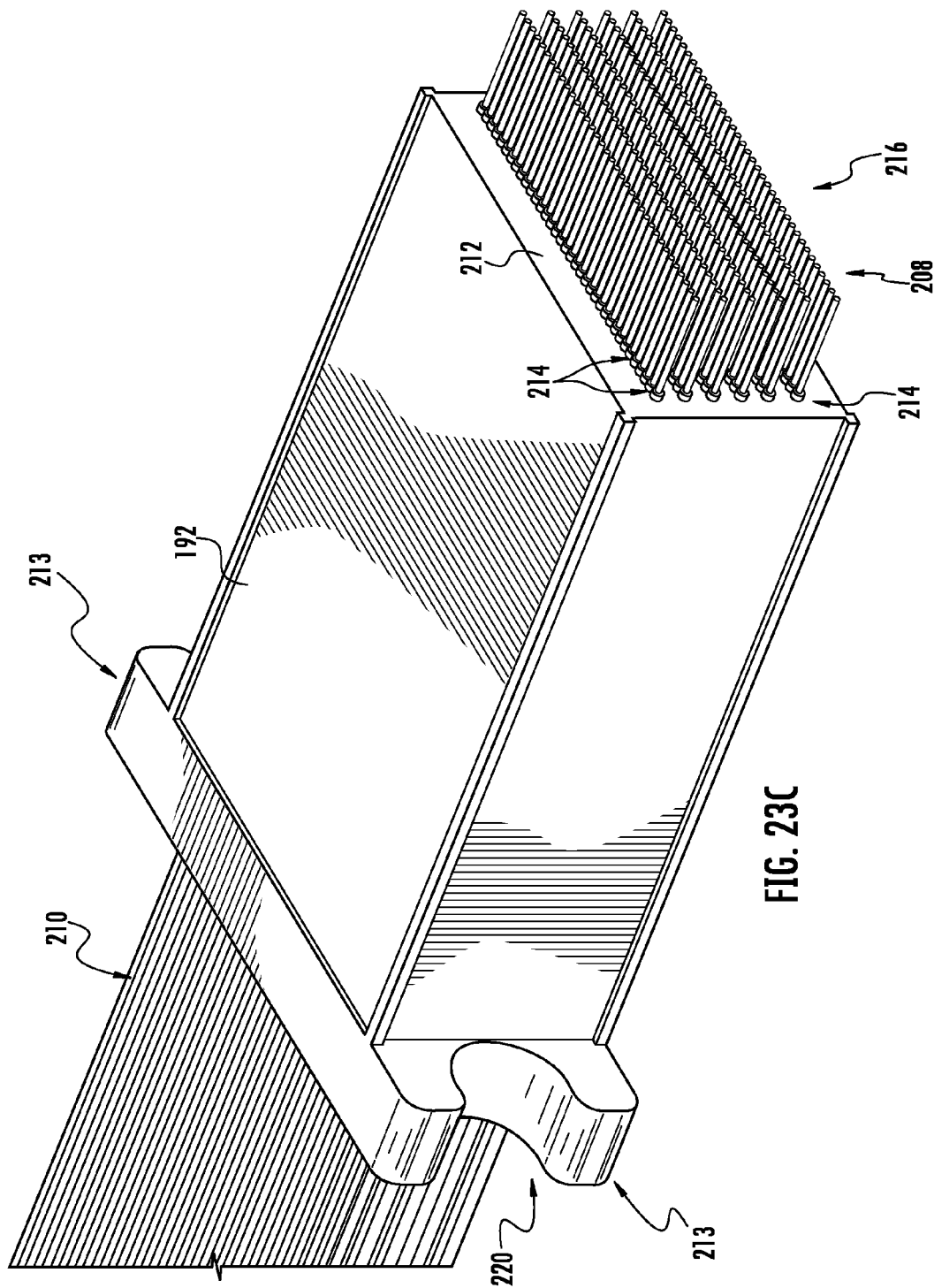
FIG. 23C is the organizer ferrule in FIGS. 23A and 23B receiving optical fibers.
Figure 24A:
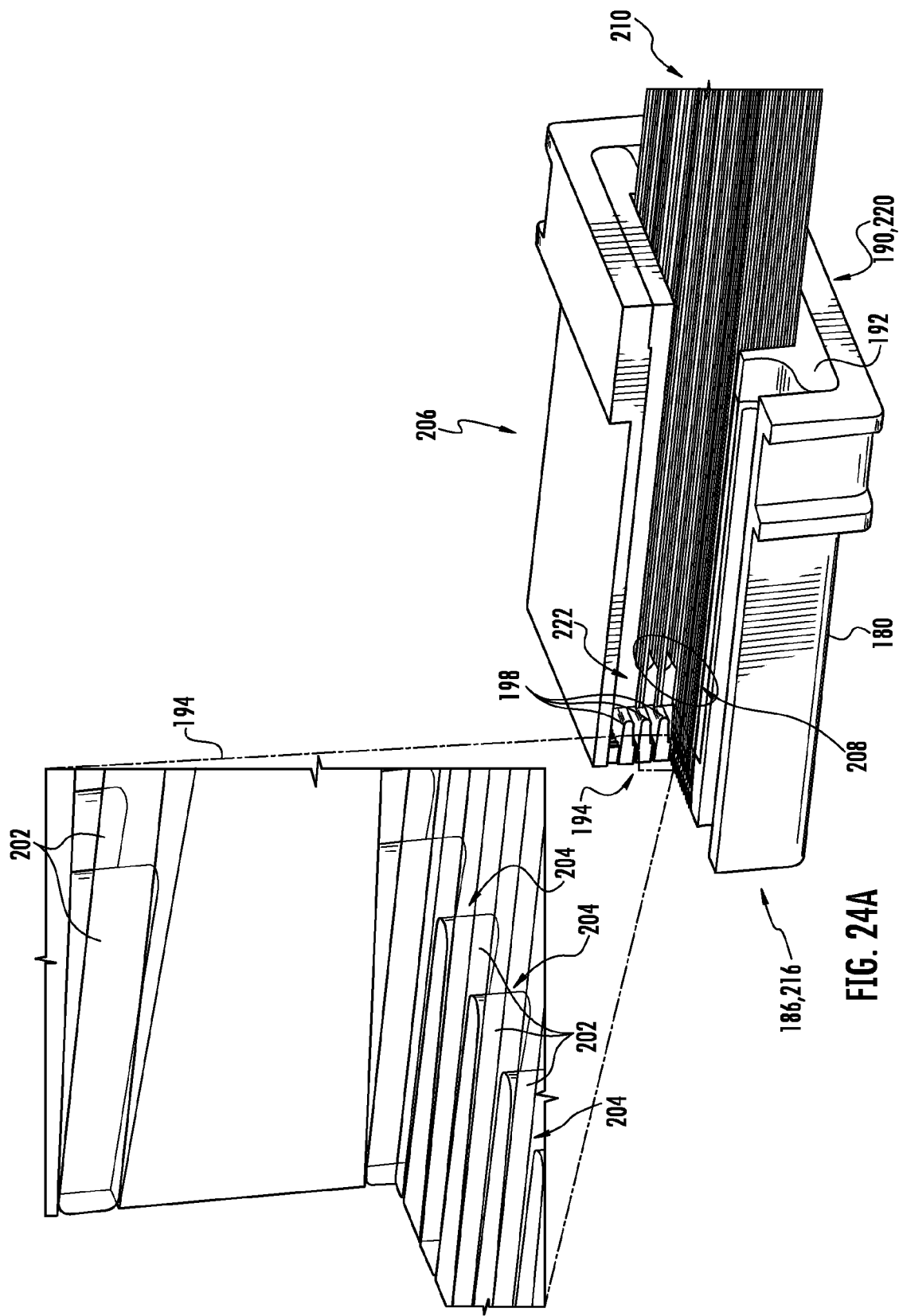
FIG. 24A is a rear perspective cutaway view of the organizer ferrule in FIGS. 23A-23C received in the molded fiber optic plug body in FIGS. 20A and 20B.

FIG. 23A is a front perspective view of the molded intermediate organizer ferrule 192 configured to facilitate optical fiber ribbonization and be disposed in the molded fiber optic plug body 180 in FIGS. 20A and 20B to form a dense fiber optic plug 206 in FIG. 24A. FIG. 23B is a rear perspective view of the organizer ferrule 192 in FIG. 23A. FIG. 23C is the organizer ferrule 192 receiving end portions 208 of optical fibers 210. As illustrated in FIG. 23A, the molded organizer ferrule 192 has an end face 212 that includes openings 214 disposed at a first end 216 to receive the end portions 208 of the optical fibers 210 disposed in the organizer ferrule 192, as illustrated in FIGS. 23C-24B. Note the inclusion of corner ribs 213 in the organizer ferrule 192 to allow high centering accuracy while still allowing draft, whether a ribbon, loose tube, or collection of small ribbon fibers are used.

Figure 24B:
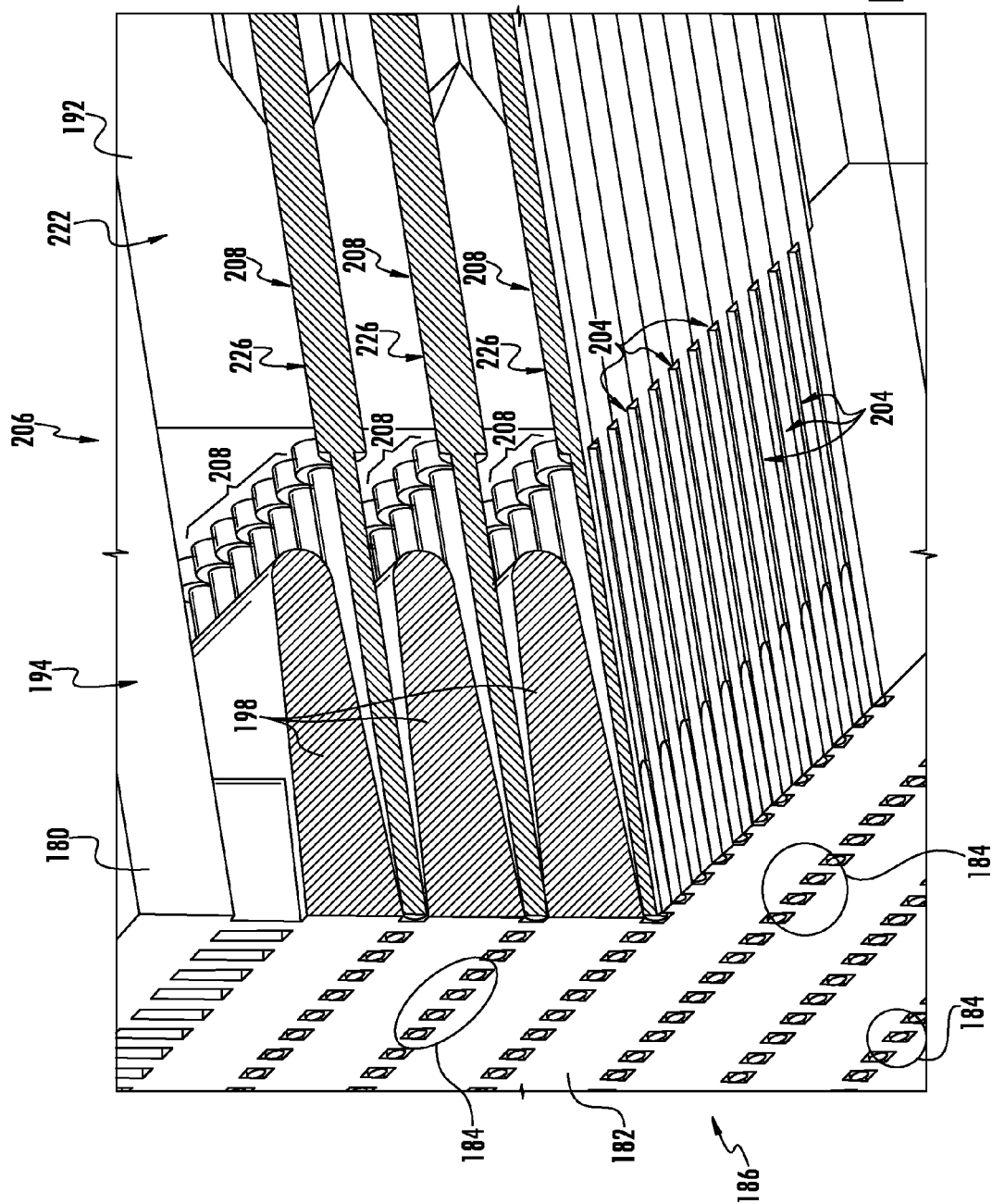
FIG. 24B is a close-up cutaway view of FIG. 24A.

As illustrated in FIG. 23B, an internal chamber 217 forming an opening 218 is molded into organizer ferrule 192 on a second end 220. The opening 218 is configured to receive the end portions 208 of the optical fibers 210 as illustrated in FIGS. 23C-24B and described below. A fiber lead-in structure 222 is disposed in the rear 224 of the internal chamber 217 to receive the end portions 208 of the optical fibers 210 disposed through the organizer ferrule 192. FIG. 24B is a close-up view of the rear perspective view of fiber lead-in structure 222 of the first end 216 of the organizer ferrule 192 interfaced with the fiber lead-in structure 194 of the molded fiber optic plug body 180. As illustrated therein and in FIG. 23B, the fiber lead-in structure 222 is formed as part of the mold forming the internal chamber 217. The fiber lead-in structure 222 is comprised of a plurality of the through holes 226 disposed in the rear 224 of the molded organizer ferrule 192 that form the openings 214 in the end face 212, as illustrated in FIG. 24B. The number of through holes 226 determines the number of optical fibers that can be supported by the organizer ferrule 192.

Figure 25A:
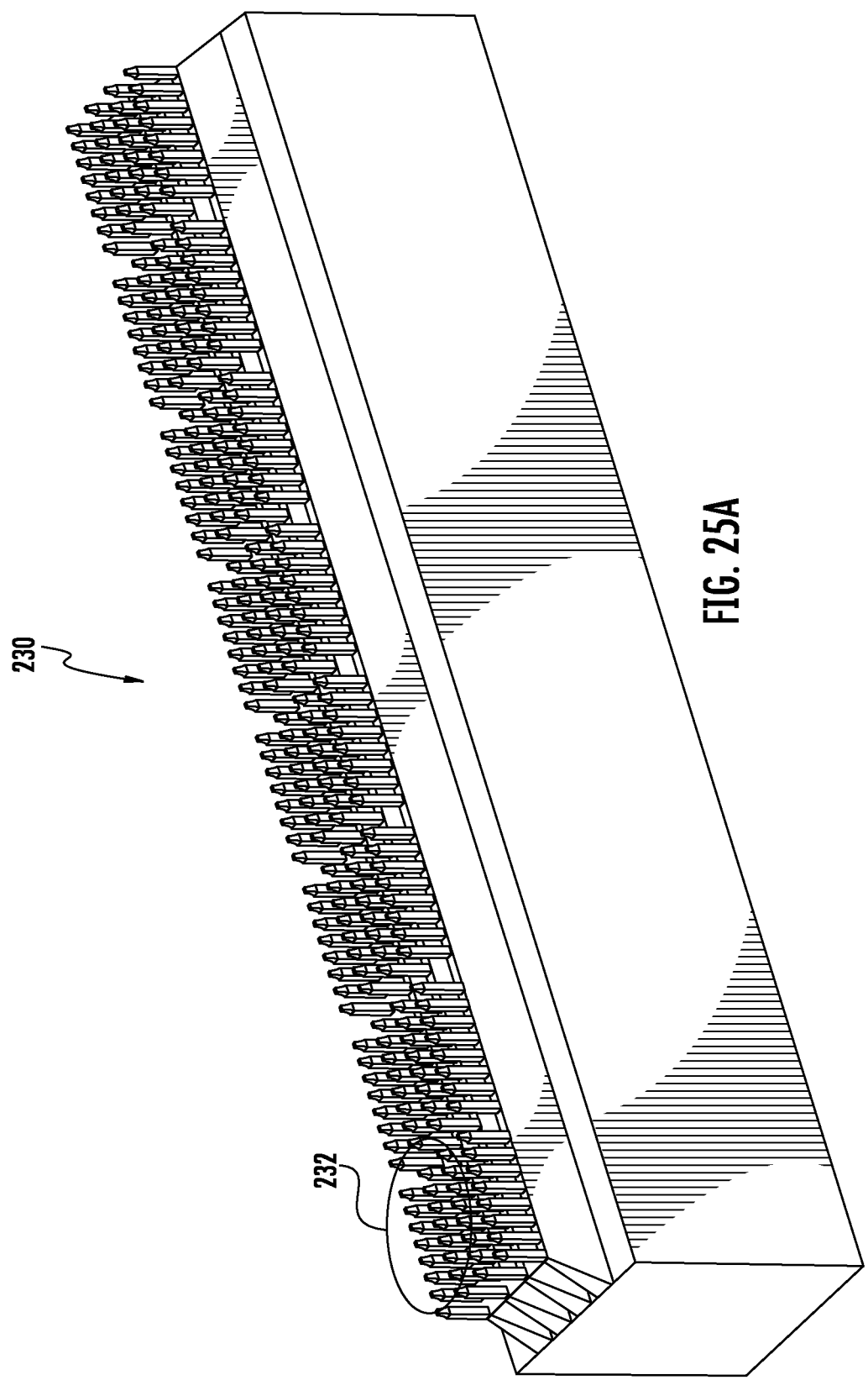
FIG. 25A is a perspective view of a projected fiber guide mold element that may be used to mold the fiber lead-in structure of the fiber optic plug body in FIGS. 21A-22B and organizer ferrule in FIGS. 23A-23C, respectfully.
Figure 25B:
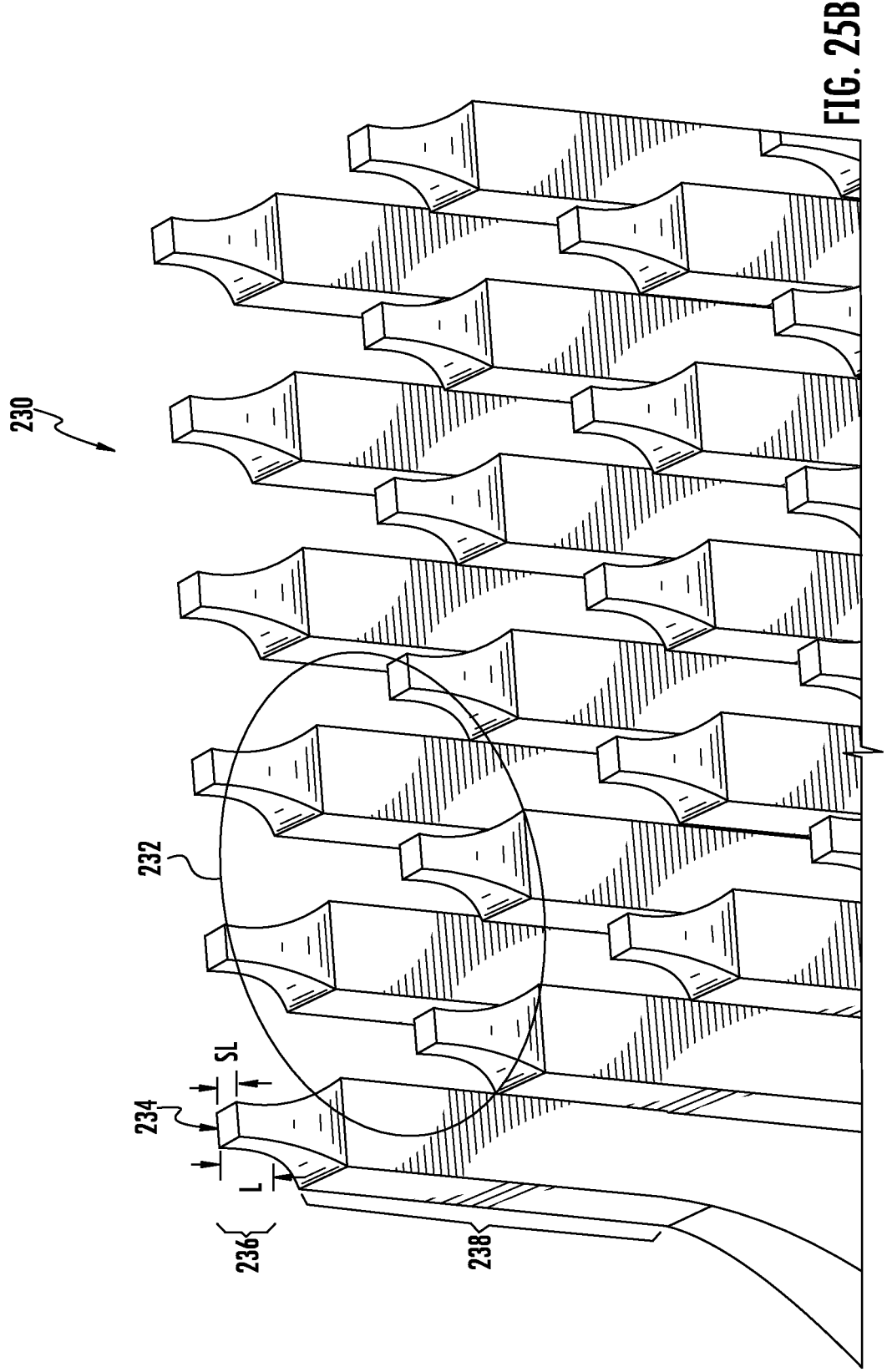
FIG. 25B is a perspective close-up view of the tips of the projected fiber guide mold element in FIG. 25A.

FIG. 25A is a perspective view of a projected fiber guide mold element 230 that may be used to mold the internal chambers 187, 217 and fiber lead-in structures 194, 222 in the fiber optic plug body 180 in FIGS. 21A-22B and the organizer ferrule 192 in FIGS. 23A-23C, respectfully. FIG. 25B is a perspective close-up view of the fiber lead-in mold tips 232 of the projected fiber guide mold element 230 in FIG. 25A. The projected fiber guide mold elements 230 may be constructed out of a suitable steel. As illustrated in FIGS. 25A and 25B, the fiber lead-in mold tips 232 of the projected fiber guide mold element 230 form the negative of the fiber lead-in structures 194, 222. The number of fiber lead-in mold tips 232 dictates the number of optical fibers supported. As illustrated in FIGS. 25A and 25B, there are up to two-hundred and fifty-six (256) fiber lead-in mold tips 232 or more to support up to two-hundred and fifty-six (256) optical fibers or more.

As illustrated in FIG. 25B, the intermediate members 238 are square-shaped to form square-shaped passages when molding using the projected fiber guide mold element 230. Square-shaped passages can provide stronger mold elements as opposed to circular-shaped passages. Square-shaped passages also allow easier optical fiber insertion to reduce friction on the optical fiber and to provide additional space to support epoxy placing less sheer force on the optical fibers inserted therein. The end portions 234 of the fiber lead-in mold tips 232 are also square-shaped.

One purpose of the design of the mass array of the fiber lead-in mold tips 232 was to allow them to be brought against or adjacent to a planar mold surface. This may simplify the projected fiber guide mold element 230 by eliminating the need for a female side in which the fiber lead-in mold tips 232 are inserted into. In one embodiment, the array of fiber lead-in mold tips 232 could be brought into contact with a planar surface and open up the square-shaped members end portions 234 by a brushing or grinding operation. As an example, the fiber lead-in mold tips 232 of the projected fiber guide mold element 230 can be brought proximate to a planar surface in the mold. A secondary operation can be provided to open up the internal chambers 187, 217 formed by the fiber lead-in mold tips 232. The projected fiber guide mold element 230 used in a mold where the projected fiber guide mold element 230 is brought up against a planar mold surface such that the fiber lead-in mold tips 232 seal off.

With continuing reference to FIG. 25B, the side length or width of the tips 232 is SL (e.g., 100 um). The end portions 234 of the tips 232 are formed at the end of a length L of end sections 236 of the tips 232. The end section 236 is designed to provide a lead-in for a bare optical fiber and is sized appropriately. The intermediate member 238 is designed to provide a lead-in for a coated optical fiber and thus is sized larger than the end section 236. In one embodiment, the length L of the end sections 236 of the tips 232 is approximately one to three times the length of the side length SL of the end portions 234 of tips 232. This sizing is provided to provide an angled lead-in for the optical fiber as it is disposed in a lead-in formed by the fiber lead-in mold tip 232. If the ratio of length L of the end sections 236 of the tips 232 to the length of the side length SL of the end portions 234 of tips 232 is less than one (1), suppression of angular error may not be accomplished introducing optical attenuation.

Also disclosed is a method of molding a fiber optic connector component, comprising the steps of providing a mold body having a plurality of fiber lead-in mold tips disposed in row and column disposed in the mold body, wherein the plurality of fiber lead-in mold tips each comprising a squared-shaped member having a first end disposed adjacent the mold body and a second end, the square-shaped member configured to provide a molded fiber lead-in for an end portion of an optical fiber, and injecting a material into a mold to form a fiber optic connector component.

More detail regarding the optical backplane extension module 28 illustrated in FIGS. 2A-3 will now be described. In this regard, FIGS. 26 and 27 are front and rear perspective views, respectively, of the optical backplane extension module 28. The optical backplane extension module 28 comprises the interior space 34 defined by the extension module housing 35 for maintaining and routing of the fiber optic cables 32 (see FIG. 3). The optical backplane extension module 28 support a plurality of backplane fiber optic connectors 36 attached to the fiber optic cables 32, which in this embodiment are backplane fiber optic plugs 44 described above.

As illustrated in FIGS. 26-28, the optical backplane extension module 28 supports disposing the fiber optic connectors 36 through a rear side 38 of the extension module housing 35 to form an optical backplane 240. The fiber optic connectors 36 are disposed through the rear side 38 of the extension module housing 35 along longitudinal axis $A_1$. The optical backplane 240 is provided to allow the backplane fiber optic connectors 36 to be directly optically connected to blade fiber optic connectors disposed in information processing modules 24. The backplane fiber optic connectors 36 may be comprised of different types of fiber optic connectors supporting different numbers of optical fibers. For example, as illustrated in FIGS. 26 and 27, the backplane fiber optic connector 36A is configured to be connected to a blade switch fiber optic connector. As an example, the switch fiber optic connector could be a monolithic connector that has enough fiber count to support connections to the other backplane fiber optic connectors 36B, with the fiber count being multiple of the number of other backplane fiber optic connectors 36B. The backplane fiber optic connectors 36B are configured to be connected to a server or data storage information processing modules 24.

With continuing reference to FIG. 26, the extension module housing 35 defines the interior space 34 by a base 242, a left side 244 disposed on a left end 245 of the base 242, and a right side 246 disposed on a right end 247 of the base 242. The rear side 38 is disposed on a rear end 248 of the base 242. A top side 250 is disposed on a top end 252 of the base 242. The base 242, left side 244, right side 246, rear side 38, and top side 250 form the extension module housing 35. A door 254 is hinged to base 242 to allow the internal chamber 34 to be closed off and opened for access.

Figure 29:
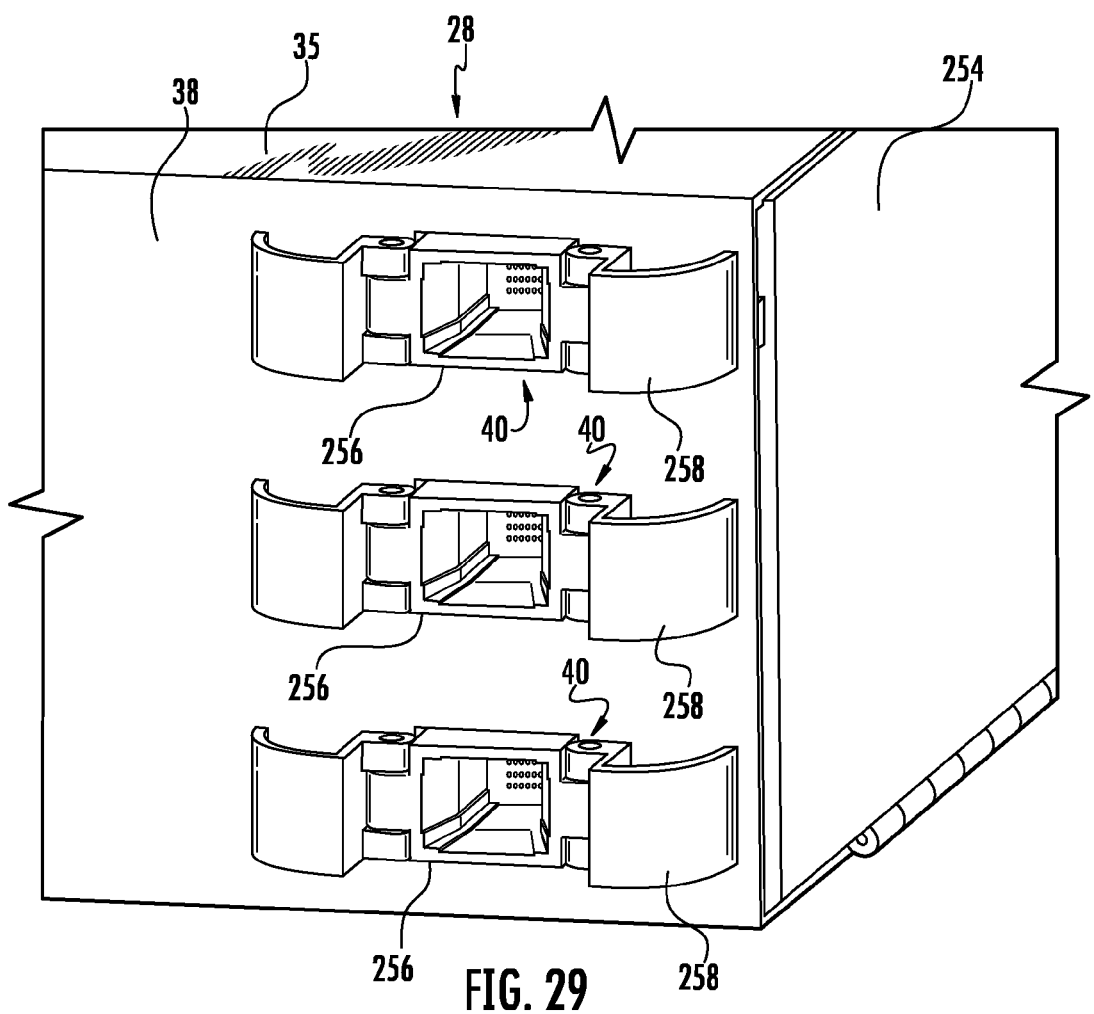
FIG. 29 is a close-up view of the interconnection fiber optic adapters disposed through interconnection ports in the side of the optical backplane extension module.

The optical interconnection ports 40 are illustrated in more detail in FIGS. 28 and 29. The optical interconnection ports 40 are disposed through the extension module housing 35 to allow fiber optic interconnections between the backplane fiber optic connectors 36 forming the optical backplane 240 and backplane fiber optic connectors 36 located outside of the extension module housing 35. For example, it may be desirable to optically connect one or more backplane fiber optic connectors 36 to other information processing modules 24 not optically connected to the backplane extension module 28 and/or other backplane extension modules 28 located in other areas of an equipment rack. Otherwise, the door 254 could not be fully closed on the backplane extension module 28 if fiber optic interconnections are desired. In this regard, fiber optic adapters 256 can be disposed in the optical interconnection ports 40 to allow for fiber optic interconnections in the backplane extension module 28. Debris shutters 258 may be provided as part of the fiber optic adapters 256 to prevent debris from entering the fiber optic adapters 256 when not in use. FIG. 28 shows the debris shutters 258 closed, and FIG. 29 shows the debris shutters 258 open.

Figure 30A:
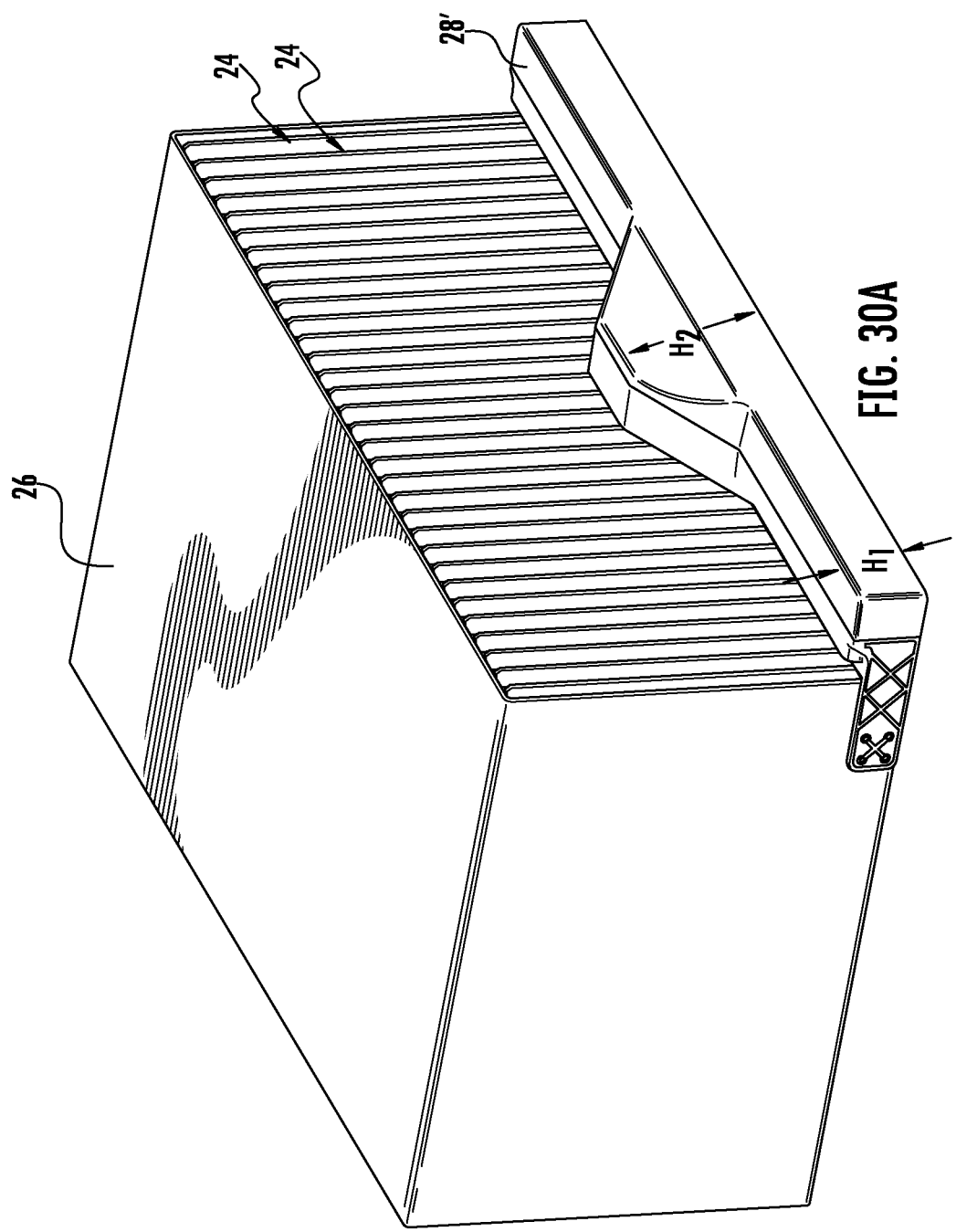

Other forms of the backplane extension module are possible. For example, FIGS. 30A and 30B are rear and front perspective views, respectively, of another backplane extension module 28' attached to a rack module housing 26. The rack module housing 26 supports information processing modules 24 as previously described. In this embodiment, the backplane extension module 28' includes an extension module housing 35' that is not rectangular and does not have the same height along the optical backplane. The extension module housing 35' is configured with different minimum height $H_1$ and maximum height $H_2$ to improve air flow from the information processing modules 24 in the rack module housing 26. This is because the fiber optic connectors disposed in the extension module housing 35' are not the same height, as illustrated in FIGS. 31A and 31B discussed below. Thus, the height of the extension module housing 35' can be tailored to avoid unnecessarily reducing air flow.

FIGS. 31A and 31B are front and rear perspective views, respectively, of the optical backplane extension module 28' in FIGS. 30A and 30B. As illustrated in FIG. 31B, a number of backplane fiber optic connectors 36' are disposed through a rear side 38' of the extension module housing 35' to provide an optical backplane 41 similar to that described above with respect to the optical backplane extension module 28. As illustrated, some of the backplane fiber optic connectors 36A' are less in height than other backplane fiber optic connectors 36B'. Thus, the height of the extension module housing 35' is provided as a non-planar height to avoid the height of the extension module housing 35' being greater than needed to support the backplane fiber optic connectors 36A' and backplane fiber optic connectors 36B' forming the optical backplane 41. This will reduce the surface area of the rear side 38' that is abutted adjacent to the rack module housing 26 when the extension module housing 35' is installed to reduce blocking air flow. Also, the backplane fiber optic connectors 36A' and 36B' are provided in pairs for redundant fiber optic connections in this embodiment.

Figure 32A:
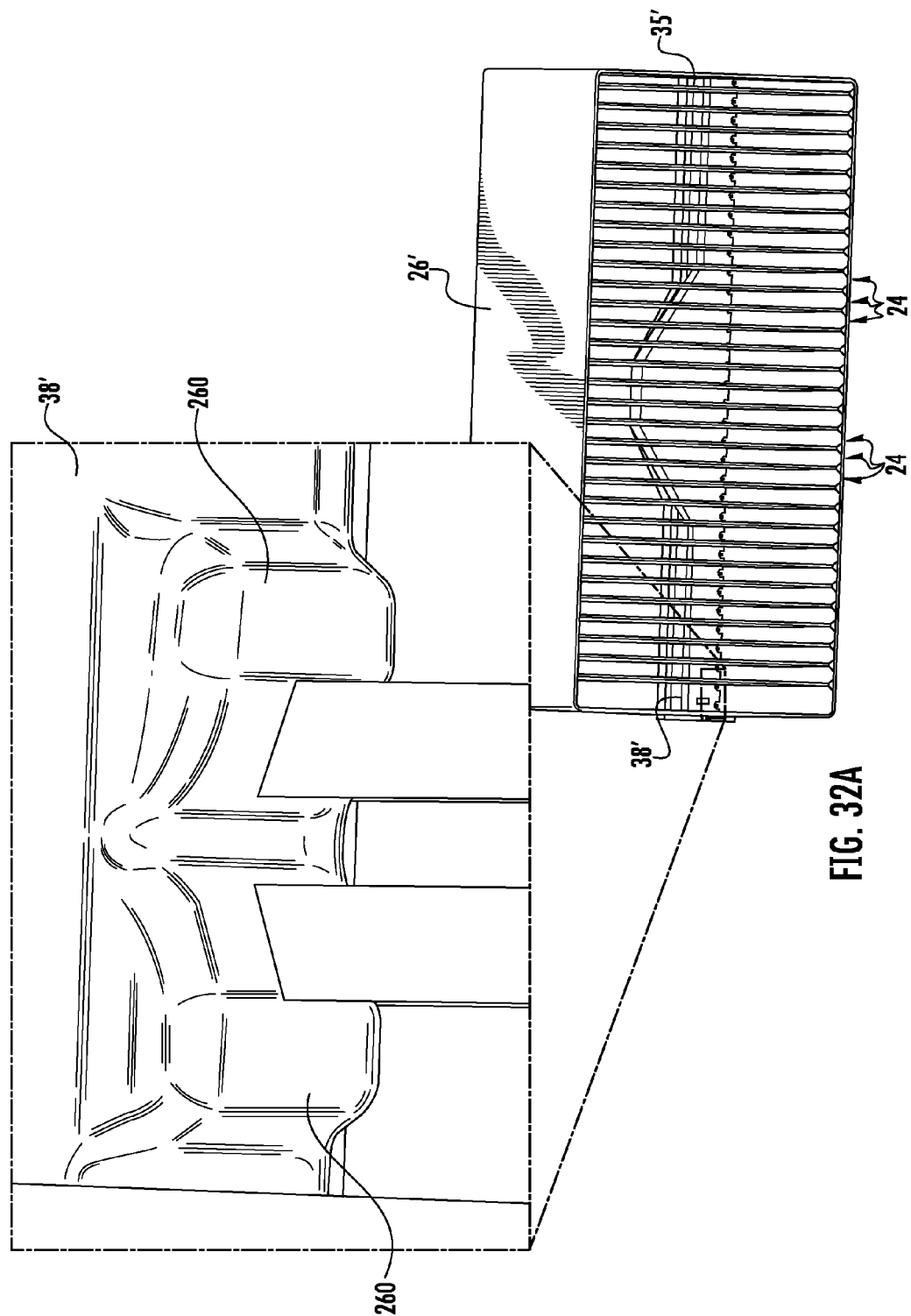
FIG. 32A is a close-up view of alignment members disposed in the optical backplane extension module to align the optical backplane extension module with the information processing modules disposed in a rack module housing.

When installing the optical backplane extension module 28' to a rack module housing 28, it is important to align the optical backplane 41 with the fiber optic connectors disposed on the information processing modules 24 for proper connection. Any alignment errors increase among stacked rack module housings 28. In this regard, FIG. 32A is a close-up view of alignment members 260 disposed in the rear side 38' of the optical backplane extension module 28' to align the optical backplane extension module 28' with the information processing modules 24 disposed in a rack module housing 26. FIG. 32B is a close-up perspective view of backplane fiber optic connectors 36 disposed between alignment members 260 in the optical backplane extension module 28'. The alignment members 260 are disposed on the exterior side of the rear side 38' of the extension module housing 35'.

With reference to FIGS. 32A and 32B, the alignment members 260 are configured to engage with a complementary alignment member disposed in the rack module housing 26 to align the plurality of backplane fiber optic connectors 36 with the plurality of blade fiber optic connectors. The intent of providing the alignment members 260 is to provide a more accurate rack module housing 26 for optical information processing modules 24, which may in turn allow simplified fiber optic connectors to be employed.

With continuing reference to FIGS. 32A and 32B, in this embodiment, the alignment members 260 are formed from a non-planar surface 262 disposed in the rear side 38' of the extension module housing 35'. The non-planar surface 262 is comprised of a plurality of protrusions 264 forming a plurality of grooves 266 each formed between adjacent protrusions 264 among the plurality of protrusions 264. Because the backplane fiber optic connectors 36' are disposed through the rear side 38' of the extension module housing 35' in a fixed, known location, the backplane fiber optic connectors 36 are located in known fixed location with respect to the alignment members 260. When the alignment members 260 mate with complementary grooves and alignment members 260 in the rack module housing 26, an alignment is forced to the extension module housing 35' that will assist in proper connection between the backplane fiber optic connectors 36' and the blade fiber optic connectors. The alignment members 260 may be disposed in the optical backplane extension module 28 in FIGS. 2A-3 as well.

It may also be desired to provide for the base member 267 in which the alignment members 260 are disposed to extend out beyond the rear side 38' of the backplane extension housing 35' to extend into the rack module housing 26. In this manner, the information processing modules 24 can be disposed on their bottom ends with the base member 267 and register with the base member 267 through a registration means. In this case, since both the information processing modules 24 and the backplane fiber optic connectors 36' would be fixedly disposed in the base member 267, alignment is forced to exist between the backplane fiber optic connectors 36' and the blade fiber optic connectors 46 (see FIG. 4B).

Even with alignment of backplane fiber optic connectors 36, 36' aligned with the rack module housing 26, the information processing modules 24 can be aligned and provided in known locations in the rack module housing 26. In this manner, alignment of an optical backplane extension module 28, 28' with the rack module housing 26 will ensure an alignment between the backplane fiber optic connectors 36, 36' and the blade fiber optic connectors. It may be desired to provide both vertical and horizontal alignment of the information processing modules 24 in the rack module housing 26.

Figure 33:
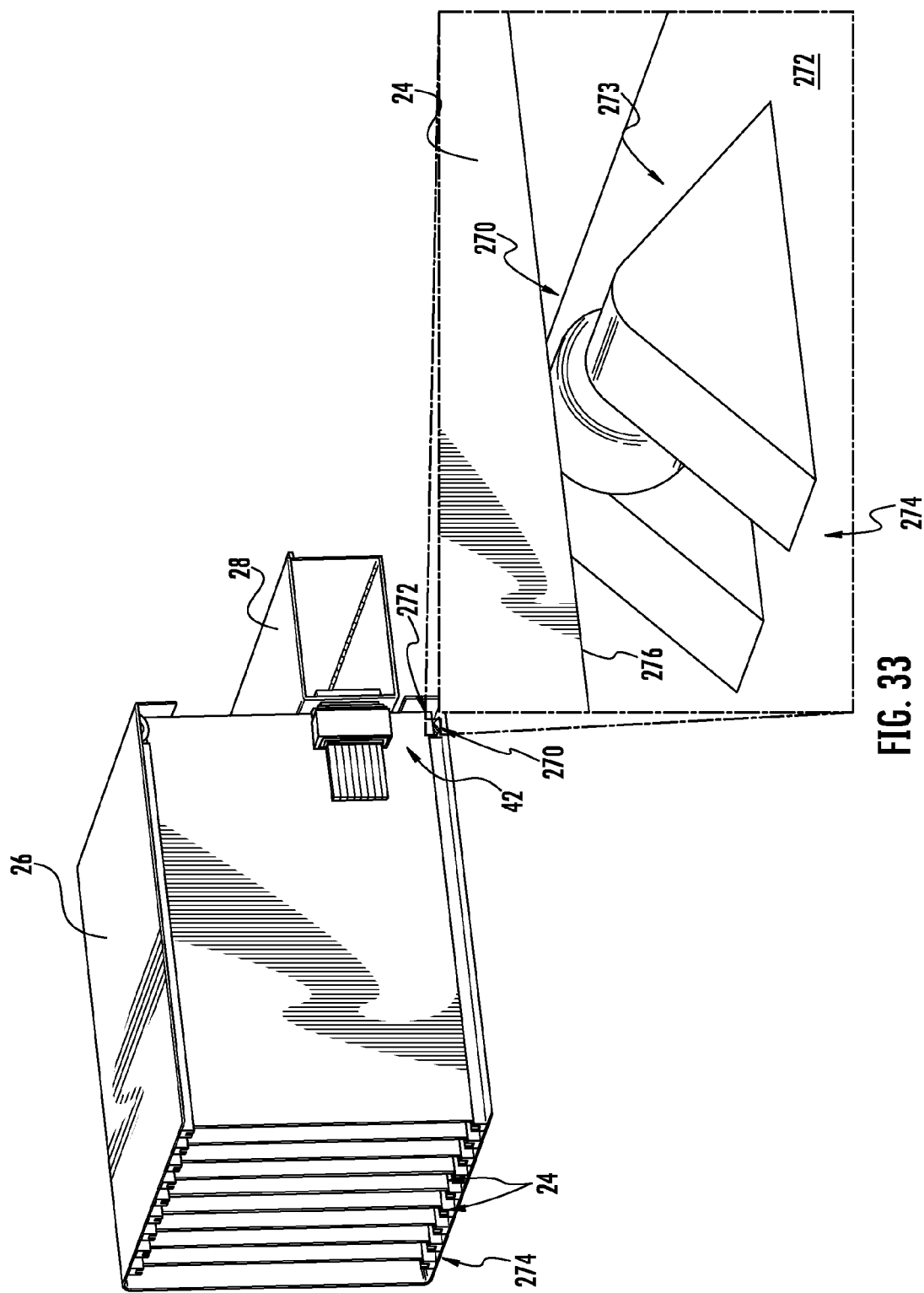
FIG. 33 is a side perspective view and close-up view of bias wheels that provides a lower datum for the information processing modules disposed in the rack module housing.

In this regard, FIG. 33 is a side perspective view and close-up view of bias wheels 270 that provides a lower datum for the information processing modules 24 disposed in the rack module housing 26. Only one bias wheel 270 is shown, but a plurality of bias wheels 270 can be provided, including one for each information processing module 24. The bias wheel 270 is mounted to a mounting structure 273. The bias wheel 270 is allowed to rotate in the mounting structure 273. As illustrated in FIG. 33, the bias wheel 270 is disposed in an interior space 272 on a base 274 of the rack module housing 26 in alignment with an insertion slot for an information processing module 24. For example, the base 274 may be the base member 267 in which the alignment members 260 are disposed to extend out beyond the rear side 38' of the backplane extension housing 35' to extend into the rack module housing 26. When the information processing module 24 is inserted in rack module housing 26, a bottom 276 of the information processing module 24 will engage the bias wheel 270. The bias wheel 270 will ensure the information processing module 24 is disposed in a fixed, known vertical location with the rack module housing 26 for vertical alignment.

To provide an upper datum for horizontal alignment of information processing modules 24 disposed in the rack module housing 26, FIG. 34 is provided. FIG. 34 illustrates a side perspective view and close-up view of spring-loaded biasing members 280. A spring-loaded biasing member 280 may be provided for each slot in the rack module housing 26 that can accept an information processing module 24. The spring-loaded biasing member 280 is installed at the top interior side 282 of the rack module housing 26 to be disposed above an information processing module 24 when installed in the rack module housing 26. The spring-loaded biasing member 280 comprises an alignment member 284 configured with a slot 286 to receive a spring 288. The spring 288 abuts the top interior side 282 of the rack module housing 26. When an information processing module 24 is inserted into the rack module housing 26, the top interior side 282 of the information processing module 24 is configured to abut and the alignment member 284 is configured push down against information processing module 24 to form an upper datum. Along with the lower datum provided by the bias wheels 270 in FIG. 33, the spring-loaded biasing member 280 assists in vertical alignment of the information processing module 24 disposed in the rack module housing 26.

Further, as used herein, it is intended that terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. The optical fibers disclosed herein can be single mode or multi-mode optical fibers. Likewise, other types of suitable optical fibers include bend-insensitive optical fibers, or any other expedient of a medium for transmitting light signals. An example of a bend-insensitive, or bend resistant, optical fiber is ClearCurve® Multimode fiber commercially available from Corning Incorporated. Suitable fibers of this type are disclosed, for example, in U.S. Patent Application Publication Nos. 2008/0166094 and 2009/0169163, the disclosures of which are incorporated herein by reference in their entireties.

Many modifications and other embodiments of the embodiments set forth herein will come to mind to one skilled in the art to which the embodiments pertain having the benefit of the teachings presented in the foregoing descriptions and the associated drawings. For example, embodiments provide for fiber optic plugs to be disposed on the optical backplane extension module and fiber optic receptacles to be disposed on the information processing modules, the opposite configuration could be provided and is encompassed within the scope of the disclosure and the claims. Fiber optic receptacles could be disposed in the optical backplane extension module and fiber optic plugs disposed on the information processing modules.

Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

We claim:

1. A fiber optic connector for establishing direct optical connections for optical backplanes, comprising:

at least one fiber optic connector body configured to be directly optically connected in an optical backplane, the at least one fiber optic connector body comprising a first end, a second end, an opening disposed on the first end accessing an internal chamber disposed between the first end and the second end, a fiber lead-in structure comprised of a plurality of fiber lead-ins disposed adjacent the second end, and a plurality of lenses disposed in the second end, each of the plurality of lenses optically aligned with a fiber lead-in among the plurality of fiber lead-ins for optical transmission between the plurality of fiber lead-ins and the plurality of lenses; and at least one fiber optic ferrule comprising a first end, a second end, an opening disposed on the first end accessing an internal chamber disposed between the first end and the second end, and a plurality of fiber openings disposed in the second end, the at least one fiber optic ferrule disposed through the opening of the at least one fiber optic connector body optically aligning the plurality of fiber openings of the at least one fiber optic ferrule with the plurality of lenses disposed in the at least one fiber optic connector body.

2. The fiber optic connector of claim 1, wherein the plurality of fiber lead-ins are arranged in a plurality of rows disposed on the second end of the at least one fiber optic ferrule.

3. The fiber optic connector of claim 1, further comprising end portions of a plurality of optical fibers disposed in the plurality of fiber openings of the at least one fiber optic ferrule and the plurality of fiber lead-ins of the at least one fiber optic connector body.

4. The fiber optic connector of claim 3, wherein the plurality of optical fibers are disposed in a plurality of ribbon fiber optic cables stacked onto each other and disposed in the at least one fiber optic ferrule.

5. The fiber optic connector of claim 3, wherein the plurality of optical fibers are disposed in a first plurality of ribbon fiber optic cables stacked onto each other and disposed adjacent a first side of the at least one fiber optic ferrule and disposed in a second plurality of ribbon fiber optic cables stacked onto each other and disposed adjacent a second side of the at least one fiber optic ferrule.

6. The fiber optic connector of claim 1, wherein the plurality of fiber lead-ins comprises at least sixty-four (64) of the plurality of fiber lead-ins, and the plurality of fiber openings comprises at least sixty-four (64) of the plurality of fiber openings.

7. The fiber optic connector of claim 1, wherein the plurality of fiber lead-ins comprises at least one hundred twenty eight (128) of the plurality of fiber lead-ins, and the plurality of fiber openings comprises at least one hundred twenty eight (128) of the plurality of fiber openings.

8. The fiber optic connector of claim 1, wherein the plurality of fiber-lead ins disposed in the at least one fiber optic connector body are comprised of a plurality of blind holes.

9. The fiber optic connector of claim 1, wherein the at least one fiber optic connector body is comprised of a light transmissive material.

10. The fiber optic connector of claim 1, further comprising a plurality of GRIN lenses disposed in the plurality of fiber lead-ins in the at least one fiber optic connector body, an end portion of the plurality of GRIN lenses extending to an end face of the second end of the at least one fiber optic connector body.

11. The fiber optic connector of claim 1, wherein the at least one fiber optic ferrule is comprised of:
at least one fiber optic ferrule body of the at least one fiber optic ferrule having a first end, a second end, an opening disposed on the first end accessing an internal chamber disposed between the first end and the second end, wherein the plurality of fiber openings are disposed in the second end; and
at least one ferrule organizer configured to receive and organize the end portions of the plurality of fiber optic cables,
the at least one ferrule organizer secured through the first end into the opening of the at least one fiber optic ferrule body to dispose the end portions of the plurality of fiber optic cables though the plurality of fiber openings.

12. The fiber optic connector of claim 1, wherein the fiber lead-in structure is comprised of a plurality of row structures each separated by a plurality of vertical members to provide the plurality of fiber lead-ins in voids between the plurality of row structures and plurality of vertical members.

13. The fiber optic connector of claim 1, wherein the at least one fiber optic connector body comprises at least one molded fiber optic connector body, and the at least one fiber optic ferrule comprises at least one molded fiber optic ferrule.

14. The fiber optic connector of claim 1, further comprising a connector frame, the connector frame comprising at least one opening receiving the second end of the at least one fiber optic connector body.

15. The fiber optic connector of claim 14, further comprising a second connector frame, the second connector frame comprising at least one opening securing the at least one fiber optic ferrule, the connector frame and the second connector frame configured to be secured together to secure the at least one fiber optic connector body and at least one fiber optic ferrule between the connector frame and the second connector frame.

16. The fiber optic connector of claim 15, spring-loaded with at least one spring disposed between the connector frame and the second connector frame.

17. The fiber optic connector of claim 14, further comprising at least one mounting tab disposed in the connector frame configured to mount the connector frame to a surface.

18. The fiber optic connector of claim 1, wherein the at least one fiber optic connector body is comprised of at least one fiber optic plug body, and the at least one fiber optic ferrule is comprised of at least one fiber optic plug ferrule.

19. The fiber optic connector of claim 1, wherein the at least one fiber optic connector body is comprised of at least one fiber optic receptacle body, and the at least one fiber optic ferrule is comprised of at least one fiber optic receptacle ferrule.

20. The fiber optic connector of claim 1, comprised of an optical backplane fiber optic connector.

21. The fiber optic connector of claim 1, comprised of a blade fiber optic connector.

22. The fiber optic connector of claim 1, comprised of an optical backplane fiber optic connector.

23. A fiber optic connector assembly for establishing direct optical connections for optical backplanes, comprising:
at least one backplane fiber optic connector configured to be directly optically connected in an optical backplane, comprising:
at least one backplane fiber optic connector body having a first end, a second end, an opening disposed on the first end accessing an internal chamber disposed between the first end and the second end, a fiber lead-in structure comprised of a plurality of fiber lead-ins disposed adjacent the second end, and a plurality of lenses disposed in the second end, each of the plurality of lenses optically aligned with a fiber lead-in among the plurality of fiber lead-ins for optical transmission between the plurality of fiber lead-ins and the plurality of lenses;
at least one backplane fiber optic ferrule having a first end, a second end, an opening disposed on the first end accessing an internal chamber disposed between the first end and the second end, and a plurality of fiber openings disposed in the second end,
the at least one backplane fiber optic ferrule disposed through the opening of the at least one backplane fiber optic connector body optically aligning the plurality of fiber openings of the at least one backplane fiber optic ferrule with the plurality of lenses disposed in the at least one backplane fiber optic connector body; and
at least one blade fiber optic connector configured to be directly optically connected in the optical backplane, comprising:
at least one blade fiber optic connector body having a first end, a second end, an opening disposed on the first end accessing an internal chamber disposed between the first end and the second end, a fiber lead-in structure comprised of a plurality of fiber lead-ins disposed adjacent the second end, and a plurality of lenses disposed in the second end, each of the plurality of lenses optically aligned with a fiber lead-in among the plurality of fiber lead-ins for optical transmission between the plurality of fiber lead-ins and the plurality of lenses; and at least one blade fiber optic ferrule having a first end, a second end, an opening disposed on the first end accessing an internal chamber disposed between the first end and the second end, and a plurality of fiber openings disposed in the second end, the at least one blade fiber optic ferrule disposed through the opening of the at least one blade fiber optic connector body optically aligning the plurality of fiber openings of the at least one blade fiber optic ferrule with the plurality of lenses disposed in the at least one blade fiber optic connector body.

24. A method of molding a fiber optic connector component, comprising:

providing a mold body having a plurality of fiber lead-in mold tips disposed in row and column disposed in the mold body, wherein the plurality of fiber lead-in mold tips each comprising a squared-shaped member having a first end disposed adjacent the mold body and a second end, the square-shaped member configured to provide a molded fiber lead-in for an end portion of an optical fiber;

injecting a material into a mold to make a fiber optic connector component.

25. The method of claim 24, wherein the square-shaped members are each configured to provide a molded-lead in for a coated portion of the end portion of the optical fiber.

26. The method of claim 24, further comprising a tip disposed at the second end of each of the square-shaped members, the tip configured to provide a molded-lead in for a bare portion of the end portion of the optical fiber.

27. The method of claim 26, wherein the end section is configured to reduce in width from the first width at the second end of the intermediate section to a second width smaller than the first width.

28. The method of claim 27, wherein length of the end section is equal to or greater than the second width.

29. The method of claim 27, wherein length of the end section is between one (1) and three (3) times the second width.

* * * * *